(12) United States Patent
Sudhakara Murthy et al.

(10) Patent No.: US 12,725,036 B2
(45) Date of Patent: Sep. 1, 2026

(54) EXPLAINABLE DEEP INTERPOLATION OF MISSING PIXELS VIA NON-CONTIGUOUS INTERPOLATION NEIGHBORHOODS

(71) Applicant: GE Precision Healthcare LLC, Wauwatosa, WI (US)

(72) Inventors: Prasad Sudhakara Murthy, Bengaluru (IN); Utkarsh Agrawal, Bengaluru (IN); Bipul Das, Chennai (IN)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 961 days.

(21) Appl. No.: 18/055,648

(22) Filed: Nov. 15, 2022

(65) Prior Publication Data

US 2024/0160915 A1 May 16, 2024

(51) Int. Cl.
*G06N 3/08* (2023.01)

(52) U.S. Cl.
CPC .................................... *G06N 3/08* (2013.01)

(58) Field of Classification Search
CPC ........... G06N 3/08; G06N 3/084; G06N 3/045
See application file for complete search history.

(56) References Cited

U.S. PATENT DOCUMENTS 11,039,805 B2 6/2021 De Man et al.
2019/0328348 A1* 10/2019 De Man ................ G16H 50/20
2021/0183022 A1 6/2021 Wang et al.

FOREIGN PATENT DOCUMENTS

WO 2021/093620 A1 5/2021

OTHER PUBLICATIONS

Zhang T, Fu Y, Li C. Deep spatial adaptive network for real image demosaicing. InProceedings of the AAAI Conference on Artificial Intelligence Jun. 28, 2022 (vol. 36, No. 3, pp. 3326-3334). (Year: 2022).*

Niklaus S, Mai L, Liu F. Video frame interpolation via adaptive separable convolution. InProceedings of the IEEE international conference on computer vision 2017 (pp. 261-270). (Year: 2017).*

Guo Q, Li X, Juefei-Xu F, Yu H, Liu Y, Wang S. Jpgnet: Joint predictive filtering and generative network for image inpainting. InProceedings of the 29th ACM International conference on multimedia Oct. 17, 2021 (pp. 386-394). (Year: 2021).*

Yu J, Lin Z, Yang J, Shen X, Lu X, Huang TS. Generative image inpainting with contextual attention. InProceedings of the IEEE conference on computer vision and pattern recognition 2018 (pp. 5505-5514). (Year: 2018).*

(Continued)

*Primary Examiner* — Kc Chen
(74) *Attorney, Agent, or Firm* — Amin, Turocy & Watson, LLP

(57) ABSTRACT

Systems/techniques that facilitate explainable deep interpolation are provided. In various embodiments, a system can access a data candidate, wherein a set of numerical elements of the data candidate are missing. In various aspects, the system can generate, via execution of a deep learning neural network on the data candidate, a set of weight maps for the set of missing numerical elements. In various instances, the system can compute the set of missing numerical elements by respectively combining, according to the set of weight maps, available interpolation neighbors of the set of missing numerical elements.

20 Claims, 28 Drawing Sheets

(56) References Cited

OTHER PUBLICATIONS

Li Y, Chen Y, Hu Y, Oukili A, Luo L, Chen W, Toumoulin C. Strategy of computed tomography sinogram inpainting based on sinusoid-like curve decomposition and eigenvector-guided interpolation. Journal of the Optical Society of America A. Dec. 23, 2011;29(1):153-63. (Year: 2011).*

* cited by examiner

Figure 26:
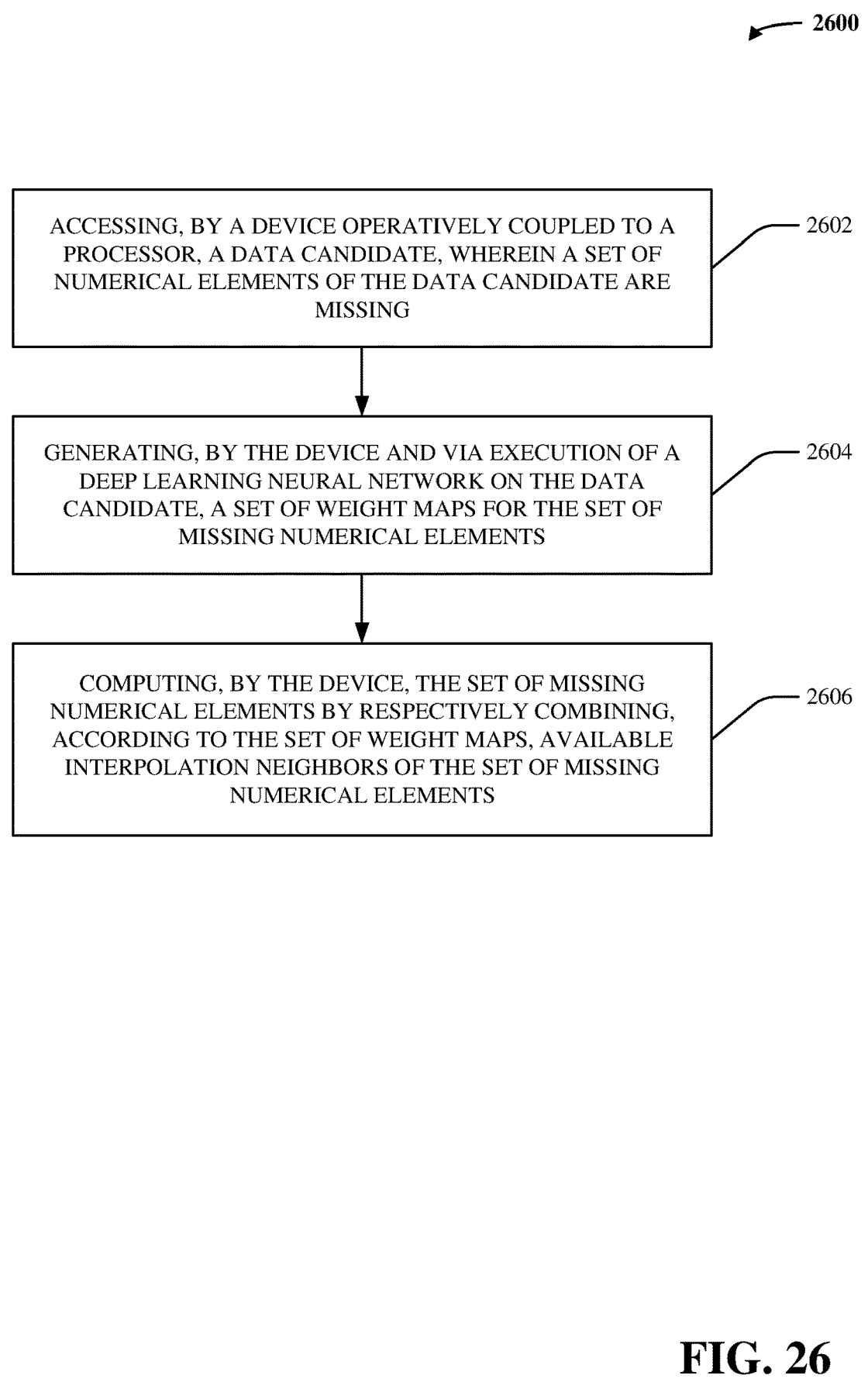

2600

ACCESSING, BY A DEVICE OPERATIVELY COUPLED TO A PROCESSOR, A DATA CANDIDATE, WHEREIN A SET OF NUMERICAL ELEMENTS OF THE DATA CANDIDATE ARE MISSING

2602

GENERATING, BY THE DEVICE AND VIA EXECUTION OF A DEEP LEARNING NEURAL NETWORK ON THE DATA CANDIDATE, A SET OF WEIGHT MAPS FOR THE SET OF MISSING NUMERICAL ELEMENTS

2604

COMPUTING, BY THE DEVICE, THE SET OF MISSING NUMERICAL ELEMENTS BY RESPECTIVELY COMBINING, ACCORDING TO THE SET OF WEIGHT MAPS, AVAILABLE INTERPOLATION NEIGHBORS OF THE SET OF MISSING NUMERICAL ELEMENTS

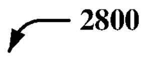
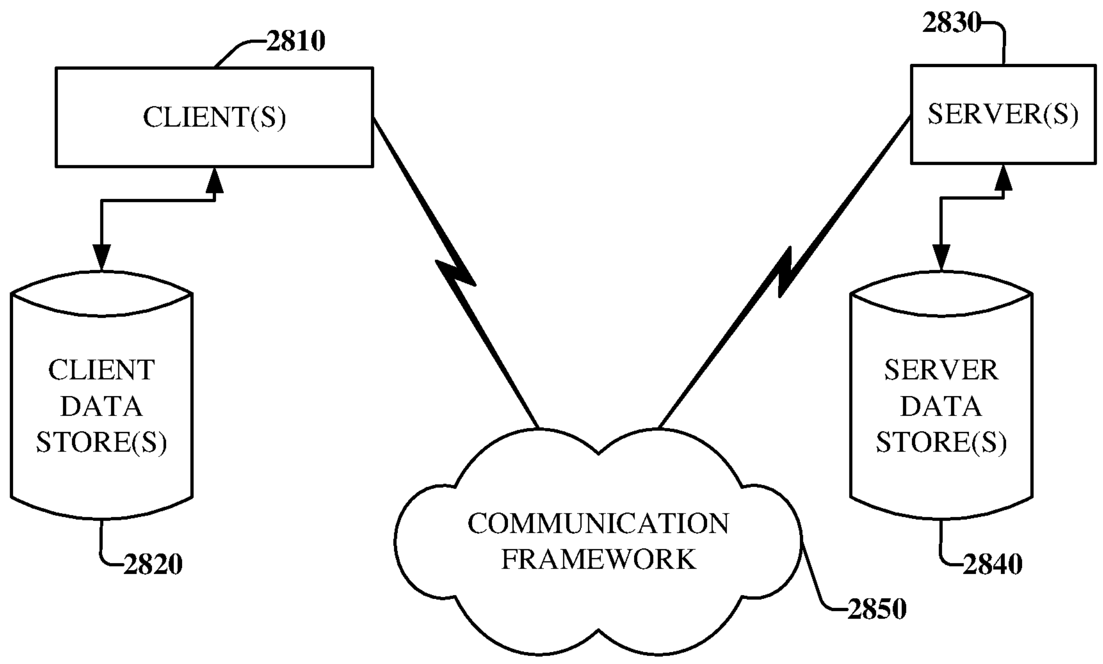
FIG. 28

EXPLAINABLE DEEP INTERPOLATION OF MISSING PIXELS VIA NON-CONTIGUOUS INTERPOLATION NEIGHBORHOODS

TECHNICAL FIELD

The subject disclosure relates generally to deep interpolation, and more specifically to explainable deep interpolation.

BACKGROUND

Interpolation can be implemented to compute missing data values. Some techniques facilitate interpolation analytically. Such techniques can be considered as transparent (e.g., having easily interpretable inner workings) but weak (e.g., not reliably applicable to complicated, high-dimensionality problems). Other techniques facilitate interpolation via deep learning. Such other techniques can be considered as strong (e.g., able to achieve high performance even for complicated, high-dimensionality problems) but opaque (e.g., lacking easily interpretable inner workings).

Systems or techniques that can facilitate interpolation in both a strong and transparent fashion can be considered as desirable.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus or computer program products that facilitate explainable deep interpolation are described.

According to one or more embodiments, a system is provided. The system can comprise a non-transitory computer-readable memory that can store computer-executable components. The system can further comprise a processor that can be operably coupled to the non-transitory computer-readable memory and that can execute the computer-executable components stored in the non-transitory computer-readable memory. In various embodiments, the computer-executable components can comprise an access component that can access a data candidate, wherein a set of numerical elements of the data candidate are missing. In various aspects, the computer-executable components can comprise an inference component that can generate, via execution of a deep learning neural network on the data candidate, a set of weight maps for the set of missing numerical elements. In various instances, the computer-executable components can comprise an interpolation component that can compute the set of missing numerical elements by respectively combining, according to the set of weight maps, available interpolation neighbors of the set of missing numerical elements.

According to one or more embodiments, the above-described system can be implemented as a computer-implemented method or a computer program product.

DESCRIPTION OF THE DRAWINGS

FIG. 26 illustrates a flow diagram of an example, non-limiting computer-implemented method that facilitates explainable deep interpolation in accordance with one or more embodiments described herein.

FIG. 28 illustrates an example networking environment operable to execute various implementations described herein.

DETAILED DESCRIPTION

Figure 1:
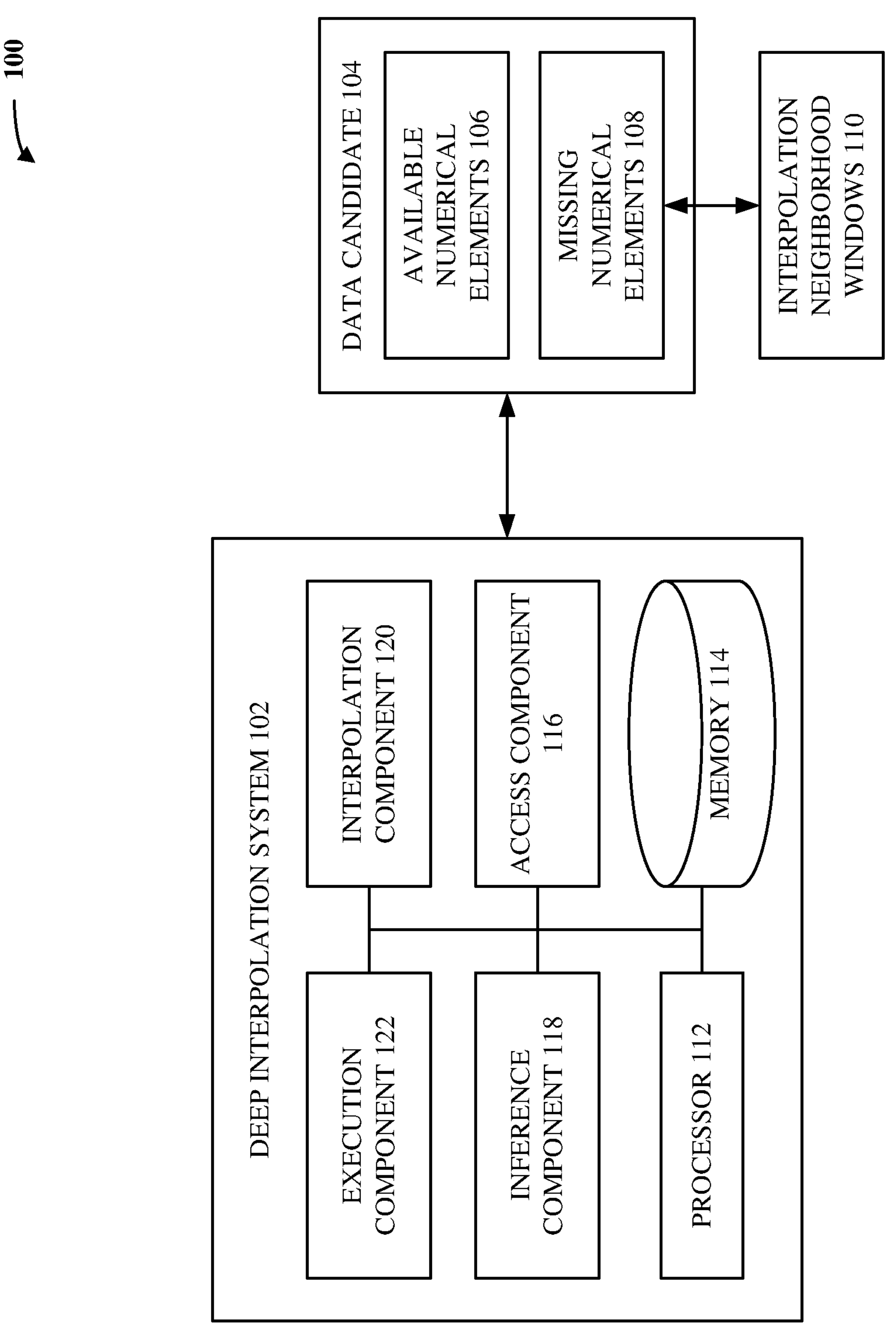
FIG. 1 illustrates a block diagram of an example, non-limiting system that facilitates explainable deep interpolation in accordance with one or more embodiments described herein.

The following detailed description is merely illustrative and is not intended to limit embodiments or application/uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Interpolation can be implemented to compute, determine, approximate, or otherwise estimate numerical values (e.g., scalars) that are missing from a given piece of electronic data (e.g., missing from a given vector, missing from a given matrix, missing from a given tensor). As a non-limiting example, interpolation can be implemented to facilitate image inpainting (e.g., to restore the content of pixels or voxels that are missing from an image). As another non-limiting example, interpolation can be implemented to facilitate audio inpainting (e.g., to restore the content of missing portions of an audio clip).

Some techniques can facilitate interpolation analytically. Various examples of such analytical interpolation techniques can include piecewise constant interpolation, linear interpolation, polynomial interpolation, spline interpolation, or mimetic interpolation. Such analytical interpolation techniques can be considered as transparent but weak. Indeed, such analytical interpolation techniques can be considered as transparent because they amount to white-box functions whose internal operations deterministically influence interpolation outputs in easily understandable, interpretable, or reviewable ways. Unfortunately, however, such analytical interpolation techniques can nevertheless be considered as weak because they suffer from restricted generalizability (e.g., analytical interpolation can be considered as useful primarily for low-dimensionality, low-complexity problems that may be of little practical interest; analytical interpolation cannot be reliably extended to high-dimensionality, high-complexity problems that may be of greater practical interest).

Other techniques can facilitate interpolation via deep learning. In other words, such other interpolation techniques involve training a deep learning neural network to receive as input a piece of data that has missing numerical elements and to estimate as output those missing numerical elements. Such deep interpolation techniques can be considered as strong but opaque. In particular, such deep interpolation techniques can be considered as strong because they exhibit more generalizability as compared to analytical interpolation techniques (e.g., deep interpolation can achieve high performance even for high-dimensionality, high-complexity problems, in contrast to analytical interpolation). However, such deep interpolation techniques can be considered as opaque because they amount to black-box functions whose internal operations influence interpolation outputs in substantially non-understandable, non-interpretable, or non-reviewable ways (e.g., a deep learning neural network can have hundreds of thousands, or even millions, of trainable internal parameters, and it is almost always unclear which of such voluminous trainable internal parameters contribute in which ways to the output of the deep learning neural network). Such lack of transparency can prevent reliable prediction or interpretation of situations in which such deep interpolation techniques suffer catastrophic failure (e.g., in which such deep interpolation techniques produce highly inaccurate results).

Accordingly, systems or techniques that can address one or more of these technical problems can be desirable.

Various embodiments described herein can address one or more of these technical problems. One or more embodiments described herein can include systems, computer-implemented methods, apparatus, or computer program products that can facilitate explainable deep interpolation. In other words, the inventors of various embodiments described herein devised various interpolation techniques that can exhibit the performance/generalizability of deep interpolation while also exhibiting the transparency/interpretability of analytical interpolation. In still other words, the present inventors devised how to perform deep interpolation with heightened explainability.

In particular, the present inventors recognized that existing techniques for facilitating deep interpolation are opaque at least in part because such existing techniques train a deep learning neural network to directly estimate missing numerical elements. Accordingly, the present inventors realized that such opaqueness can be reduced by training a deep learning neural network to indirectly estimate, as described herein, such missing numerical elements. More specifically, when given a piece of electronic data that has a missing numerical element, such piece of electronic data can be fed as input to a deep learning neural network. If existing deep interpolation techniques were implemented, the deep learning neural network would produce as output an estimate of the missing numerical element; that is, the deep learning neural network would directly compute the missing numerical element. In stark contrast, however, when various embodiments described herein are implemented, the deep learning neural network can refrain from producing as output an estimate of the missing numerical element. Instead, the missing numerical element can be considered as having a defined set of available neighboring numerical elements in the piece of electronic data, and the deep learning neural network can produce as output a weight map corresponding to that defined set of available neighboring numerical elements (e.g., the deep learning neural network can compute a unique coefficient for each of the defined set of available neighboring numerical elements, and the unique coefficients can collectively be considered as the weight map). In various cases, the defined set of available neighboring numerical elements and the weight map can be combined (e.g., linearly or non-linearly), with the result of such combination being considered as an estimate of the missing numerical element. In various aspects, such weight map can be considered as indicating how much each of the defined set of available neighboring numerical elements influences the estimated value of the missing numerical element (e.g., a neighbor that has a high coefficient in the weight map can be considered as strongly influencing the value of the missing numerical element, whereas a neighbor that has a near-zero coefficient in the weight map can be considered as weakly influencing the value of the missing numerical element).

Thus, rather than training a deep learning neural network to estimate missing numerical elements directly, various embodiments described herein can involve training a deep learning neural network to estimate weight maps of missing numerical elements, and the values of the missing numerical elements can be estimated by linearly or non-linearly combining such weight maps with available neighbors of the missing numerical elements.

Note that implementation of such weight maps can be considered as increasing the explainability of deep interpolation. Indeed, as described herein, a weight map of a given missing numerical element can indicate how strongly or how weakly available neighbors affect the interpolated value of that missing numerical element. Accordingly, how reliable or how uncertain an interpolated value of the given missing numerical element is can be inferred based on the weight map. For example, suppose that the weight map indicates that certain neighbors that are expected to have low influence on the given missing numerical element instead have high influence on the given missing numerical element. In such case, it can be inferred that the estimated/interpolated value of the given missing numerical element that is obtained by such weight map is unreliable. Such interpretable/understandable meaning is not available with existing deep interpolation techniques, because such existing deep interpolation techniques directly estimate missing numerical elements rather than the herein-described weight maps that correspond to available neighbors of missing numerical elements.

Various embodiments described herein can be considered as a computerized tool (e.g., any suitable combination of computer-executable hardware or computer-executable software) that can facilitate explainable deep interpolation. In various aspects, such computerized tool can comprise an access component, an inference component, an interpolation component, or an execution component.

In various embodiments, there can be a data candidate. In various aspects, the data candidate can be any suitable piece of electronic data having any suitable format, size, or dimensionality. In other words, the data candidate can be one or more vectors, one or more matrices, one or more tensors, or any suitable combination thereof. As some non-limiting examples, the data candidate can be an image (e.g., a two-dimensional pixel array or a three-dimensional voxel array) or a timeseries (e.g., a set of scalars, vectors, matrices, or tensors indexed in time order).

In any case, the data candidate can have a set of available numerical elements and a set of missing numerical elements. In various instances, the set of available numerical elements can have any suitable number of available numerical elements, where an available numerical element can be considered as a scalar whose value is not missing from, corrupted in, or otherwise known to be incorrect in the data candidate. In contrast, the set of missing numerical elements can have any suitable number of missing numerical elements, where a missing numerical element can be considered as a scalar whose value is missing from, corrupted in, or otherwise known to be incorrect in the data candidate. In other words, the data candidate can be considered as being composed of a plurality of scalars arranged in any suitable fashion (e.g., arranged as one or more vectors, one or more matrices, or one or more tensors), where some of those plurality of scalars can be considered as available (e.g., not known to be incorrect, not filled with dummy/default values) and where others of those plurality of scalars can be considered as missing (e.g., known to be incorrect, filled with dummy/default values).

As a non-limiting example, suppose that the data candidate is a two-dimensional image. In such case, the data candidate can be considered as being made up of a plurality of pixels. In various aspects, any pixel of the image whose value is not corrupted or otherwise known to be incorrect can be considered as an available numerical element of the data candidate. On the other hand, any pixel of the image whose value is corrupted or otherwise known to be incorrect (e.g., dummy pixel values) can be considered as a missing numerical element of the data candidate.

In various embodiments, the set of missing numerical elements can respectively correspond to a set of interpolation neighborhood windows. That is, there can be a unique interpolation neighborhood window for each of the set of missing numerical elements. In various instances, an interpolation neighborhood window can be any suitable electronic data that specifies intra-data-candidate location indices (e.g., that specifies row numbers or column numbers of the data candidate), where such specified indices can collectively define or otherwise indicate any subset of the set of available numerical elements, and where such subset can be referred to as an interpolation neighborhood of a respective missing numerical element. In some cases, an interpolation neighborhood window of a missing numerical element can define an interpolation neighborhood that includes available numerical elements that are spatially near (e.g., adjacent to or otherwise within any suitable threshold distance of) the missing numerical element. However, in other cases, an interpolation neighborhood window can define an interpolation neighborhood that includes available numerical elements that are not spatially near the missing numerical element. In various aspects, different missing numerical elements can have the same or different interpolation neighborhood windows (and thus the same or different interpolation neighborhoods) as each other.

As a non-limiting example, suppose again that the data candidate is a two-dimensional image, where any pixel whose value is not corrupted or otherwise known to be incorrect can be considered as available, and where any pixel whose value is corrupted or otherwise known to be incorrect can be considered as missing. In such case, a missing pixel can be considered as having an interpolation neighborhood window, where the interpolation neighborhood window can circumscribe, encompass, or otherwise define any suitable subset of the available pixels. In some cases, an available pixel that is adjacent to or otherwise within any suitable threshold distance of the missing pixel can be considered as an interpolation neighbor of the missing pixel (e.g., the row number and column number of such available pixel can be specified in the interpolation neighborhood window of that missing pixel). In other cases, an available pixel that is not adjacent to or otherwise within any suitable threshold distance of the missing pixel can be considered as an interpolation neighbor of the missing pixel.

In any case, the data candidate can be composed of the set of available numerical elements and the set of missing numerical elements, and the set of missing numerical elements can respectively correspond to the set of interpolation neighborhood windows, where the set of interpolation neighborhood windows can be considered as defining which of the set of available numerical elements constitute or qualify as interpolation neighbors for which of the set of missing numerical elements.

In various aspects, it can be desired to interpolate (e.g., compute, estimate, approximate, or otherwise determine) values for the set of missing numerical elements. In various cases, the computerized tool as described herein can facilitate such interpolation based on the set of interpolation neighborhood windows.

In various embodiments, the access component of the computerized tool can electronically receive or otherwise electronically access the data candidate or the set of interpolation neighborhood windows. In some aspects, the access component can electronically retrieve the data candidate or the set of interpolation neighborhood windows from any suitable centralized or decentralized data structures (e.g., graph data structures, relational data structures, hybrid data structures), whether remote from or local to the access component. In any case, the access component can electronically obtain or access the data candidate or the set of interpolation neighborhood windows, such that other components of the computerized tool can electronically interact with (e.g., read, write, edit, copy, manipulate) the data candidate or the set of interpolation neighborhood windows.

In various embodiments, the inference component of the computerized tool can electronically store, maintain, control, or otherwise access a deep learning neural network. In various aspects, the deep learning neural network can exhibit any suitable internal architecture. For example, the deep learning neural network can include any suitable numbers of any suitable types of layers (e.g., input layer, one or more hidden layers, output layer, any of which can be convolutional layers, dense layers, non-linearity layers, pooling layers, batch normalization layers, or padding layers). As another example, the deep learning neural network can include any suitable numbers of neurons in various layers (e.g., different layers can have the same or different numbers of neurons as each other). As yet another example, the deep learning neural network can include any suitable activation functions (e.g., softmax, sigmoid, hyperbolic tangent, rectified linear unit) in various neurons (e.g., different neurons can have the same or different activation functions as each other). As still another example, the deep learning neural network can include any suitable interneuron connections or interlayer connections (e.g., forward connections, skip connections, recurrent connections).

In any case, the deep learning neural network can be configured, as described herein, to receive as input data candidates having missing numerical elements and to produce as output weight maps for those missing numerical elements. Accordingly, the inference component can electronically execute the deep learning neural network on the data candidate, thereby yielding a set of weight maps. More specifically, the inference component can feed the data candidate to an input layer of the deep learning neural network, the data candidate can complete a forward pass through one or more hidden layers of the deep learning neural network, and an output layer of the deep learning neural network can compute the set of weight maps based on activations generated by the one or more hidden layers.

In various aspects, the set of weight maps can respectively correspond to the set of missing numerical elements. That is, there can be a unique weight map for each of the set of missing numerical elements. Furthermore, for any given missing numerical element, a weight map that corresponds to that missing numerical element can be a collection of scalar coefficients that respectively correspond to the interpolation neighborhood defined by the interpolation neighborhood window of that given missing numerical element. In other words, the given missing numerical element can have any suitable number of interpolation neighbors (e.g., as defined by the location indices specified in the interpolation neighborhood window of the given missing numerical element), and the weight map corresponding to that given missing numerical element can include a unique scalar coefficient for each of those interpolation neighbors. In various cases, a scalar coefficient of a particular interpolation neighbor can be considered as indicating or otherwise representing how much or how little that particular interpolation neighbor influences the interpolated value of the given missing numerical element.

As a non-limiting example, suppose again that the data candidate is a two-dimensional image made up of available pixels and missing pixels, where each missing pixel has a respective interpolation neighborhood window and thus a respective interpolation neighborhood. In such case, the inference component can execute the deep learning neural network on such two-dimensional image, which can cause the deep learning neural network to produce as output a unique weight map for each missing pixel. Furthermore, suppose that a given missing pixel has x interpolation neighbors, for any suitable positive integer x. In such case, the weight map for that given missing pixel can be composed of x scalar coefficients: a unique scalar coefficient for each of the x interpolation neighbors of the given missing pixel.

In various embodiments, the interpolation component of the computerized tool can electronically generate a set of interpolated values, based on the set of interpolation neighborhood windows and the set of weight maps. In various aspects, the set of interpolated values can respectively correspond to the set of missing numerical elements. That is, there can be a unique interpolated value for each of the set of missing numerical elements. In various instances, the interpolation component can generate the set of interpolated values by linearly or non-linearly combining the interpolation neighborhoods defined by the set of interpolation neighborhood windows with the set of weight maps. More specifically, consider a given missing numerical element. As described above, such given missing numerical element can have a respective weight map and a respective interpolation neighborhood window, where such respective interpolation neighborhood window defines which available numerical elements qualify as interpolation neighbors of the given missing numerical element. In various cases, the interpolation component can linearly or non-linearly create a weighted combination of such interpolation neighbors according to the respective weight map, and such weighted combination can be considered as the interpolated value of the given missing numerical element.

As a non-limiting example, suppose again that the data candidate is a two-dimensional image made up of available pixels and missing pixels. As mentioned above, a given missing pixel can have an interpolation neighborhood window that indicates that x specific available pixels qualify as interpolation neighbors of the given missing pixel. Moreover, the given missing pixel can have a weight map comprising x scalar coefficients respectively corresponding to the x interpolation neighbors. In various instances, the interpolation component can linearly combine the x interpolation neighbors, respectively weighted according to the x scalar coefficients, and such combination can be considered as the interpolated value of the given missing pixel (e.g., a first interpolation neighbor of the given missing pixel can be multiplied by a first scalar coefficient of the weight map of the given missing pixel to yield a first product, an x-th interpolation neighbor of the given missing pixel can be multiplied by an x-th scalar coefficient of the weight map of the given missing pixel to yield an x-th product, and the sum of such x products can be considered as the interpolated value of the given missing pixel).

In various embodiments, the execution component of the computerized tool can electronically initiate any suitable electronic action based on the set of interpolated values. For example, in various aspects, the execution component can electronically transmit any of the set of interpolated values to any suitable computing device. As another example, in various instances, the execution component can electronically render any of the set of interpolated values on any suitable computer screen, display, or monitor. As yet another example, in various cases, the execution component can electronically transmit any of the set of weight maps to any suitable computing device. As still another example, in various aspects, the execution component can electronically render any of the set of weight maps on any suitable computer screen, display, or monitor. As even another example, in various instances, the execution component can generate an uncertainty score associated with the set of interpolated values, based on the set of weight maps (e.g., the execution component can store, maintain, control, or otherwise access a machine learning model that can be configured to receive as input the set of weight maps and to produce as output the uncertainty score).

To help cause the set of weight maps to be accurate, the deep learning neural network can first undergo any suitable type or paradigm of training (e.g., supervised training, unsupervised training, reinforcement learning). Accordingly, in various aspects, the access component can receive, retrieve, or otherwise access a training dataset, and the computerized tool can comprise a training component that can train the deep learning neural network on the training dataset.

In some instances, the training dataset can be an annotated training dataset. In such cases, the training dataset can include a set of training data candidates and a set of ground-truth annotations that respectively correspond to the set of training data candidates. In various aspects, a training data candidate can be any suitable electronic data having the same format, size, or dimensionality as the data candidate described above. Accordingly, a training data candidate can have the same number and arrangement of available numerical elements and the same number and arrangement of missing numerical elements as the data candidate described above. For example, suppose that the data candidate is a two-dimensional image having a available pixels and b missing pixels located in particular positions of the two-dimensional image, for any suitable positive integers a and b. In such case, each training data candidate can likewise be a two-dimensional image having a available pixels and b missing pixels located in those same particular intra-image positions.

Moreover, the missing numerical elements of any given training data candidate can have the same respective interpolation neighborhood windows as those of the data candidate discussed above. In other words, just as the set of interpolation neighborhood windows can be considered as indicating which available numerical elements of the data candidate qualify as interpolation neighbors of which missing numerical elements of the data candidate, those same interpolation neighborhood windows can be considered as indicating which available numerical elements of any given training data candidate qualify as interpolation neighbors of which missing numerical elements of that given training data candidate. For example, suppose again that the data candidate is a two-dimensional image, suppose that the two-dimensional image has a missing pixel at row i and column j for any suitable positive integers i and j, and suppose that the interpolation neighborhood window of such missing pixel indicates that whatever available pixel is located in row k and column l of the data candidate qualifies as an interpolation neighbor of that missing pixel, for any suitable positive integers k≠i and l≠j. In such case, for each training data candidate, the training data candidate can likewise be a two-dimensional image, the training data candidate can likewise have a missing pixel at row i and column j, and the training data candidate can likewise have an available pixel at row k and column l that can be considered as an interpolation neighbor of the missing pixel located at row i and column j.

In various aspects, a ground-truth annotation can be any suitable electronic data that indicates, represents, or otherwise conveys correct or accurate interpolated values that are known or otherwise deemed to correspond to the missing numerical elements of a respective training data candidate. For example, if a training data candidate is a two-dimensional image having a available pixels and b missing pixels, then a ground-truth annotation corresponding to that training data candidate can indicate b correct or accurate interpolated values that are known or otherwise deemed to respectively correspond to the b missing pixels of that training data candidate.

If the training dataset is annotated, then the training component can, in various aspects, perform supervised training on the deep learning neural network. Prior to the start of such supervised training, the training component can randomly initialize internal parameters (e.g., weights, biases, convolutional kernels) of the deep learning neural network.

In various aspects, the training component can select from the training dataset any suitable training data candidate and any suitable ground-truth annotation corresponding to such selected training data candidate. In various instances, the training component can execute the deep learning neural network on the selected training data candidate, thereby causing the deep learning neural network to produce some output. For example, the training component can feed the selected training data candidate to an input layer of the deep learning neural network, the selected training data candidate can complete a forward pass through one or more hidden layers of the deep learning neural network, and an output layer of the deep learning neural network can compute the output based on activations generated by the one or more hidden layers. In any case, the output can be considered as predicted or inferred weight maps that the deep learning neural network believes should correspond to the missing numerical elements of the selected training data candidate. Note that, in various cases, the dimensionality of the output can be controlled or otherwise determined by the number of neurons in the output layer (e.g., weight maps of desired sizes can be achieved by adding neurons to or removing neurons from the output layer).

In various aspects, the training component can utilize the set of interpolation neighborhood windows to respectively identify interpolation neighbors of the missing numerical elements of the selected training data candidate. In various instances, the training component can compute a set of interpolated values for the missing numerical elements of the selected training data candidate, by linearly or non-linearly combining the identified interpolation neighbors with the output produced by the deep learning neural network (e.g., with the inferred or predicted weight maps). In various cases, the training component can compute one or more errors or losses (e.g., mean absolute error (MAE), mean squared error (MSE), cross-entropy) between the set of interpolated values and the selected ground-truth annotation (e.g., the correct or accurate interpolated values that are known to correspond to the selected training data candidate). In various aspects, the training component can update the internal parameters of the deep learning neural network by performing backpropagation (e.g., stochastic gradient descent) driven by the one or more errors or losses.

In various instances, such supervised training procedure can be repeated for each training data candidate in the training dataset, with the result being that the internal parameters of the deep learning neural network can become iteratively optimized to accurately generate weight maps for missing numerical elements of inputted data candidates. In various cases, the training component can implement any suitable training batch sizes, any suitable training termination criteria, or any suitable error, loss, or objective functions.

Various embodiments described herein can be employed to use hardware or software to solve problems that are highly technical in nature (e.g., to facilitate explainable deep interpolation), that are not abstract and that cannot be performed as a set of mental acts by a human. Further, some of the processes performed can be performed by a specialized computer (e.g., a deep learning neural network having internal parameters such as convolutional kernels) for carrying out defined tasks related to explainable deep interpolation. For example, such defined tasks can include: accessing, by a device operatively coupled to a processor, a data candidate, wherein a numerical element of the data candidate is missing; generating, by the device and via execution of a deep learning neural network on the data candidate, a weight map for the missing numerical element; and computing, by the device, the missing numerical element by combining, according to the weight map, available interpolation neighbors of the missing numerical element.

Such defined tasks are not performed manually by humans. Indeed, neither the human mind nor a human with pen and paper can electronically access a data candidate (e.g., an image) having a missing numerical element (e.g., a missing pixel), electronically execute a deep learning neural network on the data candidate to generate a weight map (e.g., a vector, matrix, or tensor of scalar coefficients), and electronically compute an interpolated value for the missing numerical element by linearly or non-linearly combining neighbors of the missing numerical element according to the weight map. Indeed, a deep learning neural network is an inherently-computerized construct that cannot be implemented in any way by the human mind without computers. Accordingly, a computerized tool that can train or execute a deep learning neural network is likewise inherently-computerized and cannot be implemented in any sensible, practical, or reasonable way without computers.

Moreover, various embodiments described herein can integrate into a practical application various teachings relating to explainable deep interpolation. As described above, some existing techniques for performing interpolation do so analytically. Although such existing techniques are transparent (e.g., have easily interpretable inner workings), they exhibit limited performance and generalizability. As also described above, other existing techniques for performing interpolation do so with deep learning. Although such existing techniques exhibit high performance and broad generalizability, they are not transparent (e.g., they do not have easily interpretable inner workings).

Various embodiments described herein can address these technical problems. Specifically, various embodiments described herein can be considered as interpolation techniques that exhibit the high performance and generalizability of deep learning while, at the same time, exhibiting heightened transparency. In particular, various embodiments described herein can include training or otherwise configuring a deep learning neural network to receive as input a data candidate having a missing numerical element and to produce as output a weight map (e.g., a collection of scalar coefficients) respectively corresponding to available interpolation neighbors of the missing numerical element. In various aspects, an interpolated value of the missing numerical element can thus be obtained by combining, linearly or non-linearly, the available interpolation neighbors of the missing numerical element with the weight map.

Note that the weight map can be considered as indicating or otherwise representing how strongly or how weakly each of the available interpolation neighbors influences the interpolated value of the missing numerical element. Such indications or representations of neighbor influence can be considered as increasing the transparency or explainability of the interpolated value. For example, it may be the case that a specific available interpolation neighbor is expected by technicians to have a high influence on the missing numerical element. So, if the weight map contravenes this expectation by instead indicating that such specific available interpolation neighbor has little influence on the interpolated value, it can be concluded that the interpolated value has low reliability or high uncertainty.

Existing deep interpolation techniques are not amenable to such explainability/interpretability, since such existing deep interpolation techniques directly estimate an interpolated value without generating a neighbor-based weight map as described herein. In particular, an existing deep interpolation technique would feed a data candidate having a missing numerical element as input to a deep learning neural network, and the deep learning neural network would produce as output an interpolated value for such missing numerical element. Although the interpolated value would be based on activations generated by hidden layers of such deep learning neural network, such activations have no interpretable, understandable, or otherwise comprehensible meanings. Indeed, hidden layers of deep learning neural networks often produce hundreds of thousands or even millions of activations, and it is not clear in any way how such voluminous activations contribute to or otherwise affect the outputted interpolated value. Accordingly, technicians may have no way to check the interpolated value against expectations/intuitions that they may have. In stark contrast, when various embodiments described herein are implemented, a deep learning neural network can receive as input the data candidate having a missing numerical element and can produce as output a neighbor-based weight map, where the neighbor-based weight map can include a unique scalar coefficient for each of a defined set of interpolation neighbors of the missing numerical element. Then, an interpolated value for the missing numerical element can be computed by combining (linearly or non-linearly) the interpolation neighbors according to their respective scalar coefficients specified in the neighbor-based weight map. In various aspects, the neighbor-based weight map can be considered as an understandable intermediate result separating the inputted data candidate from the outputted interpolated value, where such result can be easily interpreted by technicians or can be easily compared against interpolation expectations/intuitions of technicians.

Accordingly, various embodiments described herein can be considered as improving the transparency or explainability of deep interpolation. That is, various embodiments described herein can ameliorate various disadvantages of existing techniques. Indeed, explainable artificial intelligence is a burgeoning area of research and development which seeks to reduce the black-box opaqueness that normally accompanies deep learning. As described herein, various embodiments devised by the present inventors can be considered as reducing such black-box opaqueness with respect to deep interpolation. Thus, various embodiments described herein certainly constitute a concrete and tangible technical improvement in the field of deep interpolation, and such embodiments clearly qualify as useful and practical applications of computers.

Furthermore, various embodiments described herein can control real-world tangible devices based on the disclosed teachings. For example, various embodiments described herein can electronically train or execute real-world deep learning neural networks on real-world data candidates (e.g., real-world images) and can electronically render results generated by such real-world deep learning neural networks on real-world computer displays.

It should be appreciated that the herein figures and description provide non-limiting examples of various embodiments and are not necessarily drawn to scale.

FIG. 1 illustrates a block diagram of an example, non-limiting system 100 that can facilitate explainable deep interpolation in accordance with one or more embodiments described herein. As shown, a deep interpolation system 102 can be electronically integrated, via any suitable wired or wireless electronic connections, with a data candidate 104.

In various embodiments, the data candidate 104 can be any suitable electronic data exhibiting any suitable format, size, or dimensionality. As a non-limiting example, the data candidate 104 can, in various aspects, be one or more vectors (e.g., some time-indexed data can be represented as one or more vectors). As another non-limiting example, the data candidate 104 can, in various instances, be one or more matrices (e.g., two-dimensional arrays of pixels can be represented as matrices). As yet another non-limiting example, the data candidate 104 can, in various cases, be one or more tensors (e.g., three-dimensional arrays of voxels can be represented as tensors). As still another non-limiting example, the data candidate 104 can be any suitable combination of vectors, matrices, or tensors.

In any case, as shown, the data candidate 104 can comprise a set of available numerical elements 106 and a set of missing numerical elements 108. In various aspects, the set of available numerical elements 106 can have any suitable cardinality (e.g., any suitable number of available numerical elements). Likewise, the set of missing numerical elements 108 can have any suitable cardinality (e.g., any suitable number of missing numerical elements). Moreover, in various instances, the set of missing numerical elements 108 can respectively correspond to a set of interpolation neighborhood windows 110. Various non-limiting aspects are described with respect to FIGS. 2-3.

Figure 2:
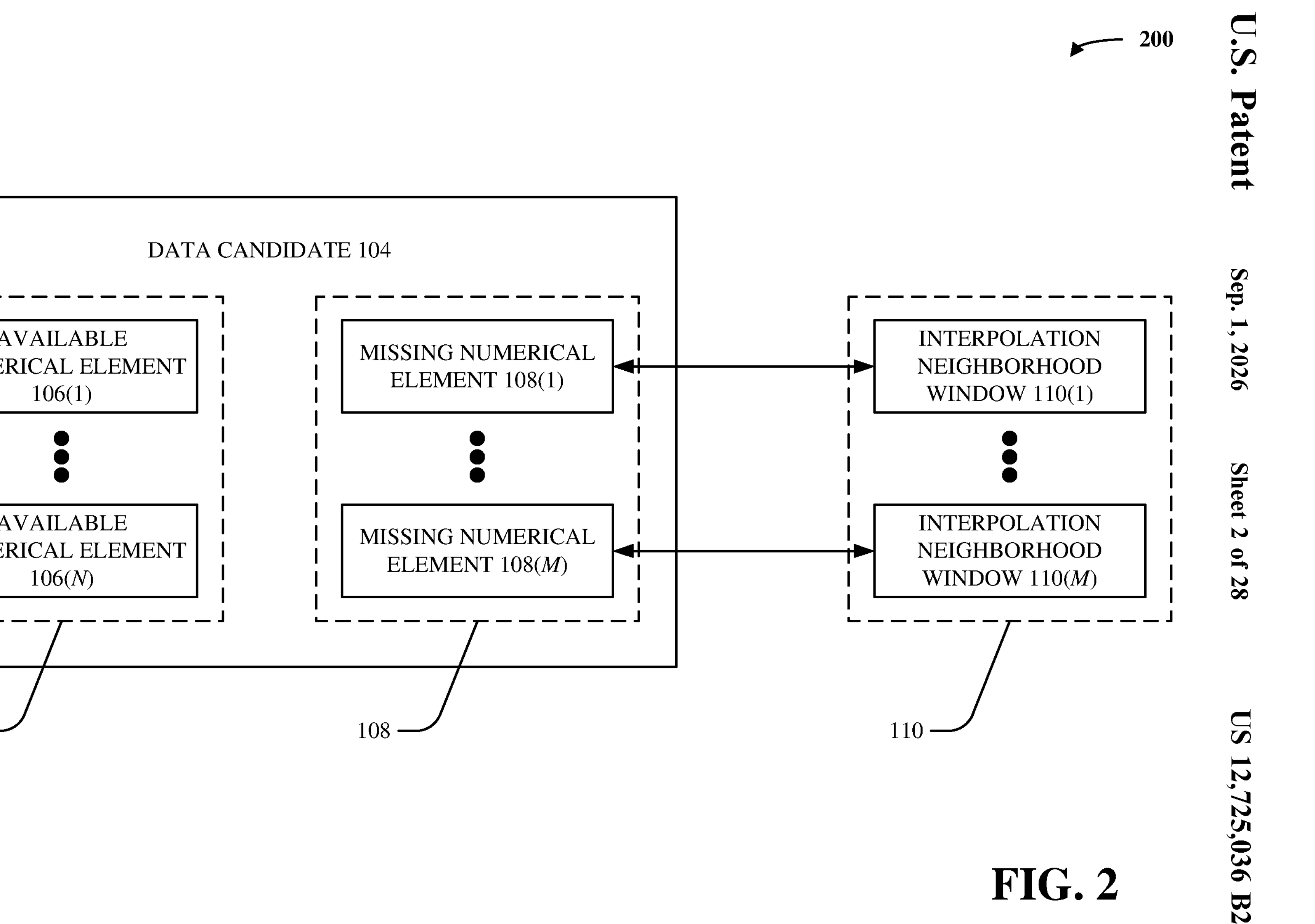
FIGS. 2-3 illustrate example, non-limiting block diagrams showing a data candidate with one or more missing numerical elements in accordance with one or more embodiments described herein.
Figure 3:
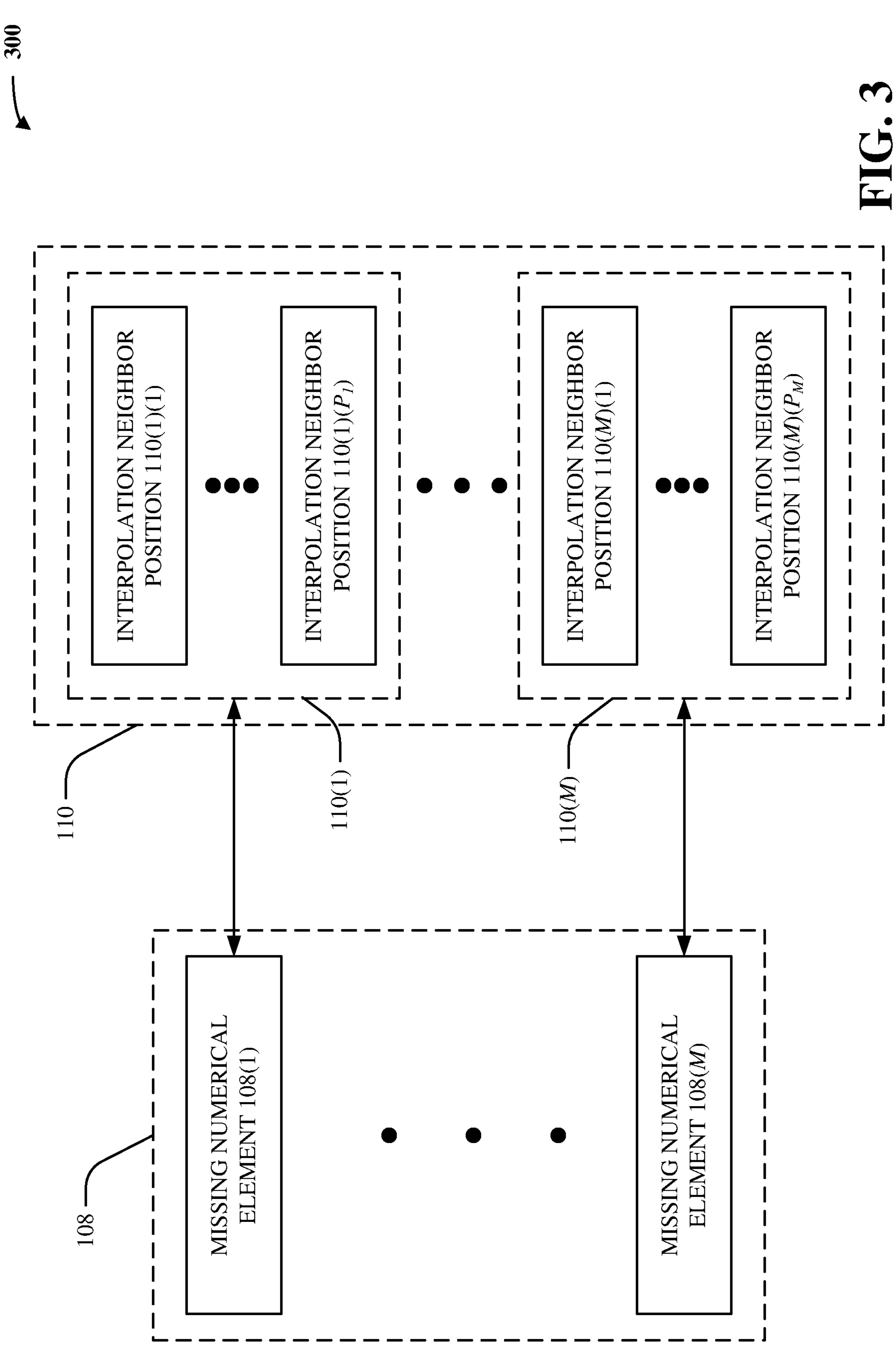

FIGS. 2-3 illustrate example, non-limiting block diagrams 200 and 300 showing a data candidate with one or more missing numerical elements in accordance with one or more embodiments described herein.

First, consider FIG. 2. As shown, the set of available numerical elements 106 can comprise n available numerical elements for any suitable positive integer n: an available numerical element 106(1) to an available numerical element 106(*n*). In various aspects, an available numerical element can be any suitable scalar that is specified in the data candidate 104 and whose value is not missing (e.g., whose value is not corrupted, whose value is not a dummy value, whose value is not omitted, whose value is not otherwise known to be incorrect). Moreover, although not explicitly shown in FIG. 2, an available numerical element can be considered as having a unique location or position within the data candidate 104, where such unique location or position can be delineated via location/position indices or coordinates (e.g., can be delineated via row number or column number). For example, the available numerical element 106(1) can be any suitable scalar that is not corrupted or otherwise known to be wrong, and the available numerical element 106(1) can be located at a first position (e.g., at a first row-column tuple) within the data candidate 104. As another example, the available numerical element 106(*n*) can be any suitable scalar that is not corrupted or otherwise known to be wrong, and the available numerical element 106(*n*) can be located at an n-th position (e.g., at an n-th row-column tuple) within the data candidate 104.

In various aspects, the set of missing numerical elements 108 can comprise m missing numerical elements for any suitable positive integer m: a missing numerical element 108(1) to a missing numerical element 108(*m*). In various instances, contrary to an available numerical element, a missing numerical element can be any suitable scalar that is specified in the data candidate 104 and whose value is missing (e.g., whose value is corrupted, whose value is a dummy value, whose value is omitted, whose value is otherwise known to be incorrect). However, like an available numerical element, and although not explicitly shown in FIG. 2, a missing numerical element can be considered as having a unique location or position within the data candidate 104, where such unique location or position can be delineated via location/position indices or coordinates (e.g., can be delineated via row number or column number). For example, the missing numerical element 108(1) can be any suitable scalar that is corrupted or otherwise known to be wrong, and the missing numerical element 108(1) can be located at an (n+1)-th position (e.g., at an (n+1)-th row-column tuple) within the data candidate 104. As another example, the missing numerical element 108(*m*) can be any suitable scalar that is corrupted or otherwise known to be wrong, and the missing numerical element 108(*m*) can be located at an (n+m)-th position (e.g., at an (n+m)-th row-column tuple) within the data candidate 104.

Accordingly, the data candidate 104 can be considered as being made up of n+m scalars located, positioned, or otherwise arranged in any suitable fashion or layout. That is, such n+m scalars can be arranged as one or more vectors, as one or more matrices, as one or more tensors, or any suitable combination thereof. In various cases, the set of missing numerical elements 108 can be interspersed with or among the set of available numerical elements 106. In other words, any given missing numerical element of the set of missing numerical elements 108 can be positioned adjacent to (e.g., in an adjacent row as, in an adjacent column as) any other missing numerical element in the set of missing numerical elements 108 or can be positioned adjacent to any of the set of available numerical elements 106. Likewise, any given available numerical element of the set of available numerical elements 106 can be positioned adjacent to any other available numerical element in the set of available numerical elements 106 or can be positioned adjacent to any of the set of missing numerical elements 108.

In various aspects, as shown, the set of interpolation neighborhood windows 110 can respectively correspond (e.g., in one-to-one fashion) to the set of missing numerical elements 108. Accordingly, since the set of missing numerical elements 108 can comprise m elements, the set of interpolation neighborhood windows 110 can comprise m windows: an interpolation neighborhood window 110(1) to an interpolation neighborhood window 110(*m*). In various aspects, an interpolation neighborhood window can be any suitable electronic data specifying or otherwise indicating one or more position/location indices (e.g., one or more row-column tuples), where such one or more position/location indices identify which of the set of available numerical elements 106 qualify as or otherwise constitute interpolation neighbors of a respective one of the set of missing numerical elements 108. For example, the interpolation neighborhood window 110(1) can correspond to the missing numerical element 108(1). Accordingly, the interpolation neighborhood window 110(1) can be considered as specifying one or more particular location/position indices, and whichever of the set available numerical elements 106 are located at such one or more particular location/position indices can be considered as interpolation neighbors of the missing numerical element 108(1). As another example, the interpolation neighborhood window 110(*m*) can correspond to the missing numerical element 108(*m*). Thus, the interpolation neighborhood window 110(*m*) can be considered as specifying one or more specific location/position indices, and whichever of the set available numerical elements 106 are located at such one or more specific location/position indices can be considered as interpolation neighbors of the missing numerical element 108(*m*). Various non-limiting aspects are further described with respect to FIG. 3.

Again, and as shown in FIG. 3, the interpolation neighborhood window 110(1) can correspond to the missing numerical element 108(1). Thus, the interpolation neighborhood window 110(1) can specify the intra-data-candidate locations/positions of whichever of the set of available numerical elements 106 qualify as interpolation neighbors of the missing numerical element 108(1). As a non-limiting example, and as shown, the interpolation neighborhood window 110(1) can specify $p_1$ unique intra-data-candidate locations (e.g., $p_1$ unique row-column tuples) for any suitable positive integer $p_1 \leq n$: an interpolation neighbor position 110(1)(1) to an interpolation neighbor position 110(1)($p_1$). In such case, the interpolation neighborhood window 110(1) can be considered as identifying $p_1$ unique or distinct available numerical elements from the set of available numerical elements 106, where such $p_1$ unique or distinct available numerical elements can be considered as interpolation neighbors of the missing numerical element 108(1). In other words, the interpolation neighbor position 110(1)(1) can be a first unique location (e.g., a first unique row-column tuple) within the data candidate 104, where one of the set of available numerical elements 106 is positioned at such first unique location, and where such one of the set of available numerical elements 106 can be considered as a first unique interpolation neighbor of the missing numerical element 108(1). Likewise, the interpolation neighbor position 110(1)($p_1$) can be a $p_1$-th unique location (e.g., a $p_1$-th unique row-column tuple) within the data candidate 104, where one of the set of available numerical elements 106 is positioned at such $p_1$-th unique location, and where such one of the set of available numerical elements 106 can be considered as a $p_1$-th unique interpolation neighbor of the missing numerical element 108(1).

Similarly, and as also shown in FIG. 3, the interpolation neighborhood window 110(*m*) can correspond to the missing numerical element 108(*m*). So, the interpolation neighborhood window 110(*m*) can specify the intra-data-candidate locations/positions of whichever of the set of available numerical elements 106 qualify as interpolation neighbors of the missing numerical element 108(*m*). As a non-limiting example, and as shown, the interpolation neighborhood window 110(*m*) can specify $p_m$ unique intra-data-candidate locations (e.g., $p_m$ unique row-column tuples) for any suitable positive integer $p_m \leq n$: an interpolation neighbor position 110(*m*)(1) to an interpolation neighbor position 110(*m*)($p_m$). In such case, the interpolation neighborhood window 110(*m*) can be considered as identifying $p_m$ unique or distinct available numerical elements from the set of available numerical elements 106, where such $p_m$ unique or distinct available numerical elements can be considered as interpolation neighbors of the missing numerical element 108(*m*). That is, the interpolation neighbor position 110(*m*)(1) can be a first unique location (e.g., a first unique row-column tuple) within the data candidate 104, where one of the set of available numerical elements 106 is positioned at such first unique location, and where such one of the set of available numerical elements 106 can be considered as a first unique interpolation neighbor of the missing numerical element 108(*m*). Likewise, the interpolation neighbor position 110(*m*)($p_m$) can be a $p_m$-th unique location (e.g., a $p_m$-th unique row-column tuple) within the data candidate 104, where one of the set of available numerical elements 106 is positioned at such $p_m$-th unique location, and where such one of the set of available numerical elements 106 can be considered as a $p_m$-th unique interpolation neighbor of the missing numerical element 108(*m*).

As shown in FIG. 3, different ones of the set of missing numerical elements 108 can have the same or different numbers of interpolation neighbors as each other (e.g., in some cases, $p_1$ can be equal to $p_m$; in other cases, $p_1$ can be not equal to $p_m$). Moreover, in various instances, different ones of the set of missing numerical elements 108 can have the same or different interpolation neighbors as each other (e.g., any given available numerical element can serve as an interpolation neighbor for one or more missing numerical elements).

In various aspects, the set of interpolation neighborhood windows 110 can be defined or otherwise established or created in any suitable fashion (e.g., can be stipulated via user-input provided by a technician overseeing or operating the deep interpolation system 102).

To clarify various aspects discussed above, consider the non-limiting, illustrative example presented in FIGS. 4-9.

FIGS. 4-9 illustrate example, non-limiting block diagrams 400, 500, 600, 700, 800, and 900 showing various interpolation neighborhood windows in accordance with one or more embodiments described herein.

Figure 4:
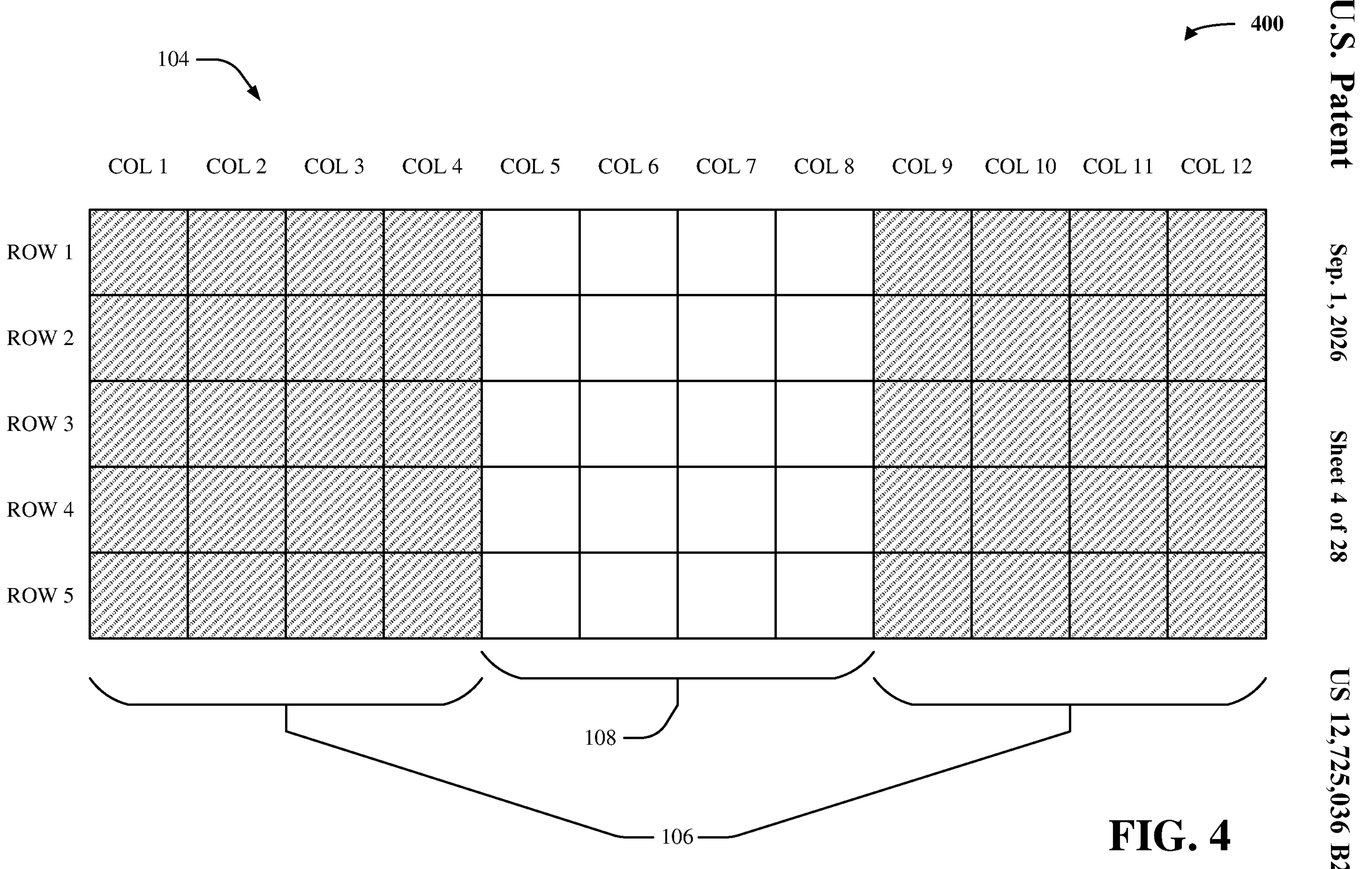
FIGS. 4-9 illustrate example, non-limiting block diagrams showing various interpolation neighborhood windows in accordance with one or more embodiments described herein.

First, consider FIG. 4. As shown, the data candidate 104 can, in various aspects, be a two-dimensional array of pixels (e.g., can be a matrix of pixels). In the non-limiting example illustrated in FIG. 4, the data candidate 104 can be composed of five rows and twelve columns of pixels. In various instances, each pixel of the data candidate 104 can be considered as having a unique position/location within the data candidate 104, where such unique position/location can be given by a row-column tuple (e.g., can be given by a row number and a column number). In the non-limiting example of FIG. 4, the pixels that are located from column 5 to column 8 can be missing (e.g., can be known to have corrupted, incorrect, omitted, or dummy pixel values). Accordingly, such pixels can be considered as the set of missing numerical elements 108 (e.g., in such case, m=20). In contrast, the remainder of the pixels (e.g., those pixels located from column 1 to column 4 and from column 9 to column 12) can be available (e.g., can be not known to have corrupted, incorrect, omitted, or dummy pixel values). Thus, such pixels can be considered as the set of available numerical elements 106 (e.g., in such case, n=40).

Figure 5:
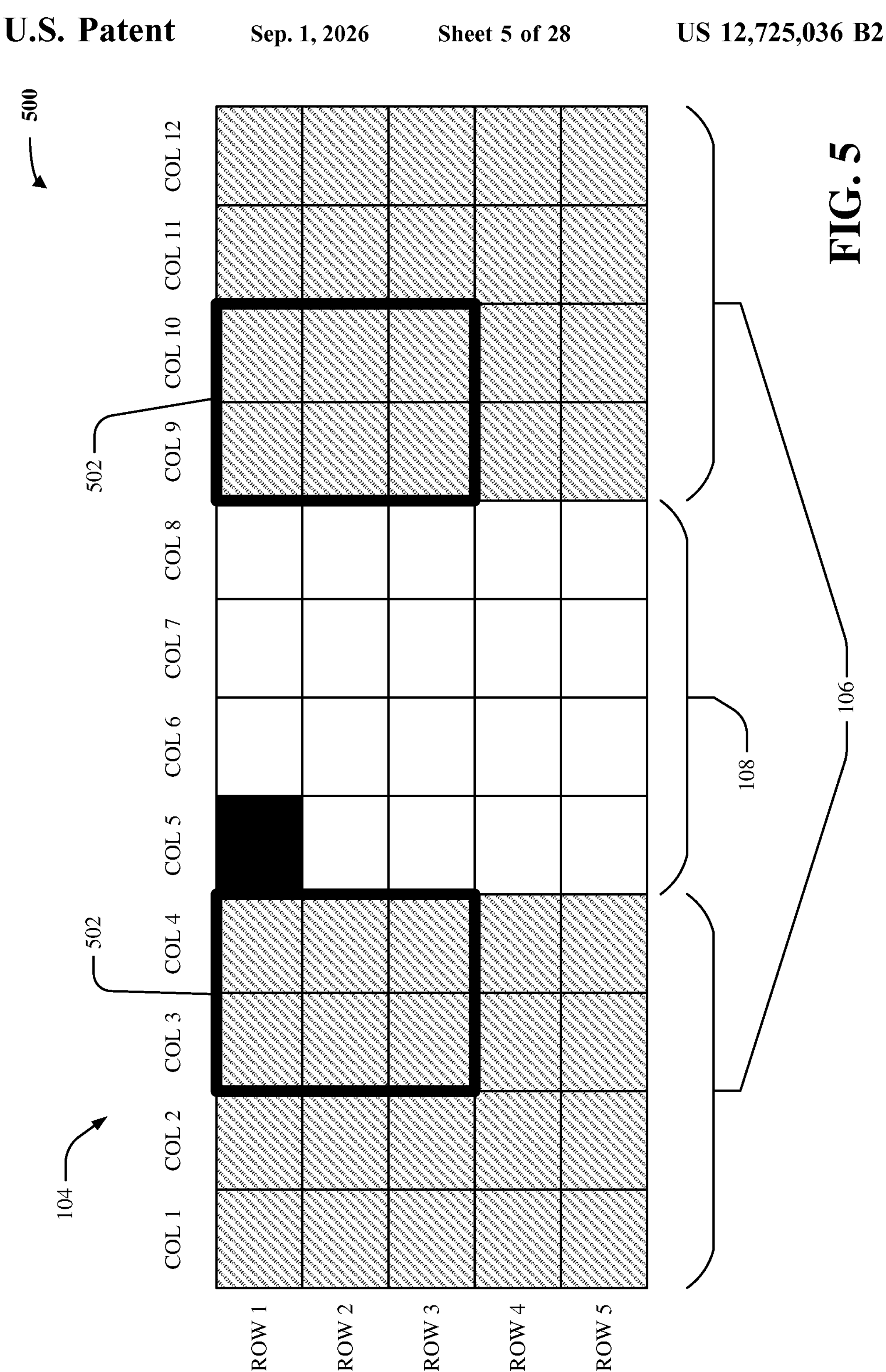

Now, consider FIG. 5. FIG. 5 illustrates a non-limiting example of an interpolation neighborhood window for the missing pixel located at row 1 and column 5 of the data candidate 104, which can be referred to as pixel (1,5). In particular, the pixel (1,5) can have an interpolation neighborhood window 502. As shown, the interpolation neighborhood window 502 can specify that the pixel (1,5) has as interpolation neighbors whatever available pixels of the data candidate 104 that are located in columns 3, 4, 9, and 10 from row 1 to row 3. In other words, the pixel (1,5) can have the following as interpolation neighbors: the pixel (1,3), the pixel (1,4), the pixel (1,9), the pixel (1,10), the pixel (2,3), the pixel (2,4), the pixel (2,9), the pixel (2,10), the pixel (3,3), the pixel (3,4), the pixel (3,9), and the pixel (3,10). Note that, as shown, an available pixel need not be adjacent to the pixel (1,5) in order to be deemed or otherwise considered as an interpolation neighbor of the pixel (1,5)

(e.g., the pixel (1,10) is not adjacent to the pixel (1,5), and yet the pixel (1,10) can nevertheless be an interpolation neighbor of the pixel (1,5)).

Figure 6:
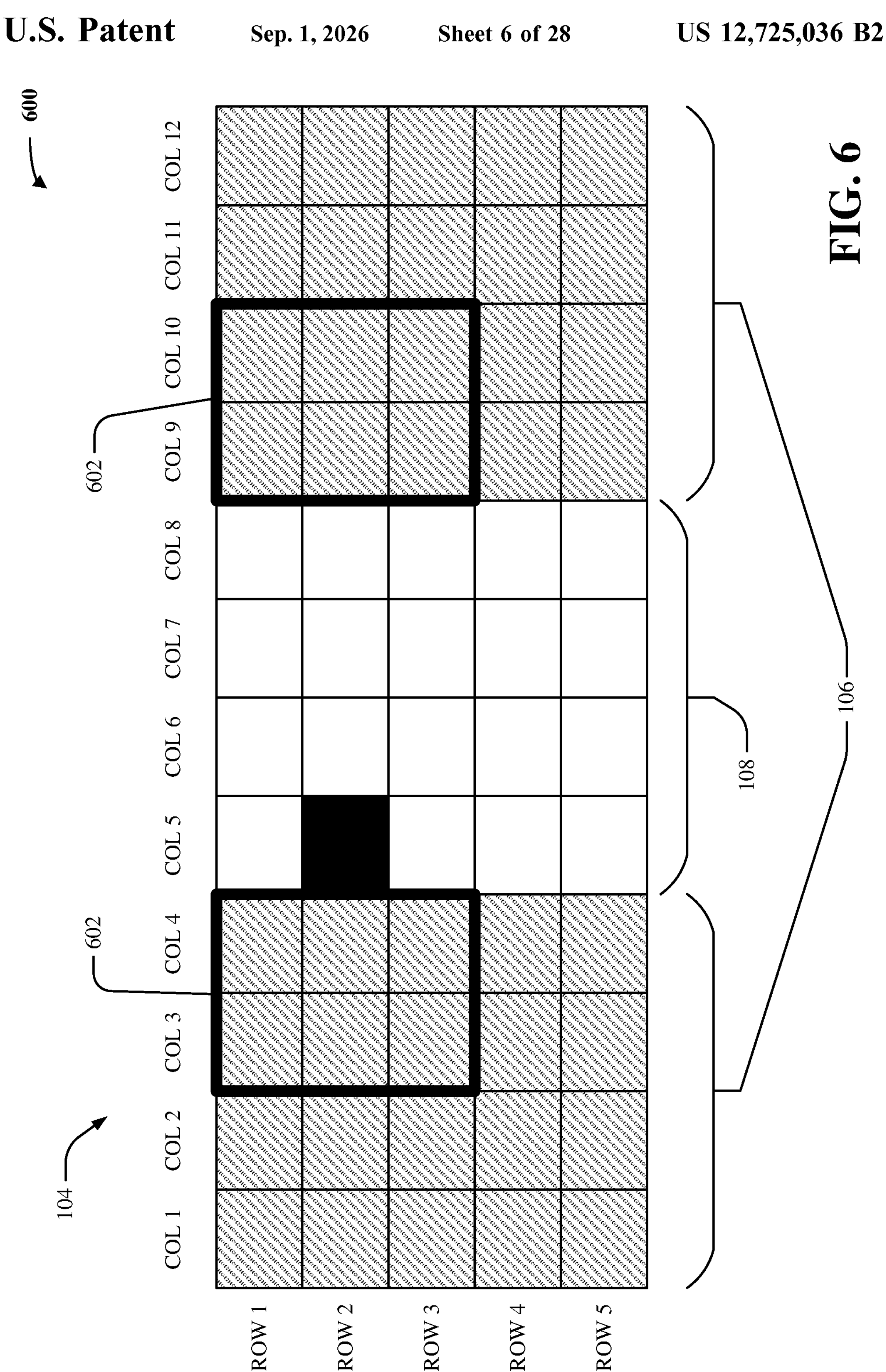

Now, consider FIG. 6. FIG. 6 illustrates a non-limiting example of an interpolation neighborhood window for the missing pixel located at row 2 and column 5 of the data candidate 104, which can be referred to as pixel (2,5). In particular, the pixel (2,5) can have an interpolation neighborhood window 602. As shown in this non-limiting example, the interpolation neighborhood window 602 can be identical to the interpolation neighborhood window 502. That is, the pixel (2,5) can, in various aspects, have the same interpolation neighbors as the pixel (1,5). Again, note that, as shown, an available pixel need not be adjacent to the pixel (2,5) in order to be deemed or otherwise considered as an interpolation neighbor of the pixel (2,5) (e.g., the pixel (3,9) is not adjacent to the pixel (2,5), and yet the pixel (3,9) can nevertheless be an interpolation neighbor of the pixel (2,5)).

Figure 7:
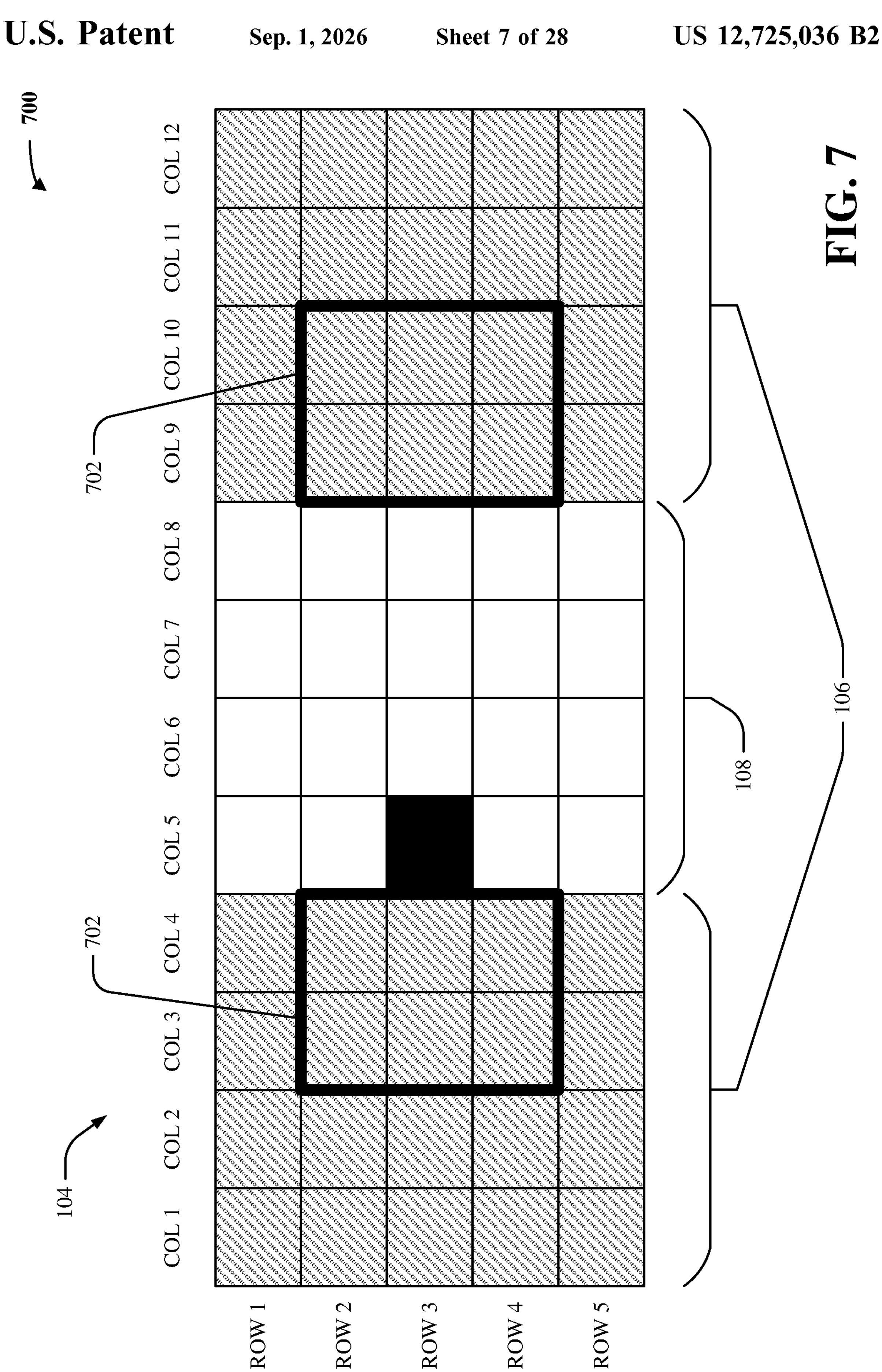

Now, consider FIG. 7. FIG. 7 illustrates a non-limiting example of an interpolation neighborhood window for the missing pixel located at row 3 and column 5 of the data candidate 104, which can be referred to as pixel (3,5). In particular, the pixel (3,5) can have an interpolation neighborhood window 702. As shown, the interpolation neighborhood window 702 can specify that the pixel (3,5) has as interpolation neighbors whatever available pixels of the data candidate 104 that are located in columns 3, 4, 9, and 10 from row 2 to row 4. In other words, the pixel (3,5) can have the following as interpolation neighbors: the pixel (2,3), the pixel (2,4), the pixel (2,9), the pixel (2,10), the pixel (3,3), the pixel (3,4), the pixel (3,9), the pixel (3,10), the pixel (4,3), the pixel (4,4), the pixel (4,9), and the pixel (4,10). Once more, note that, as shown, an available pixel need not be adjacent to the pixel (3,5) in order to be deemed or otherwise considered as an interpolation neighbor of the pixel (3,5) (e.g., the pixel (4,3) is not adjacent to the pixel (3,5), and yet the pixel (4,3) can nevertheless be an interpolation neighbor of the pixel (3,5)).

Figure 8:
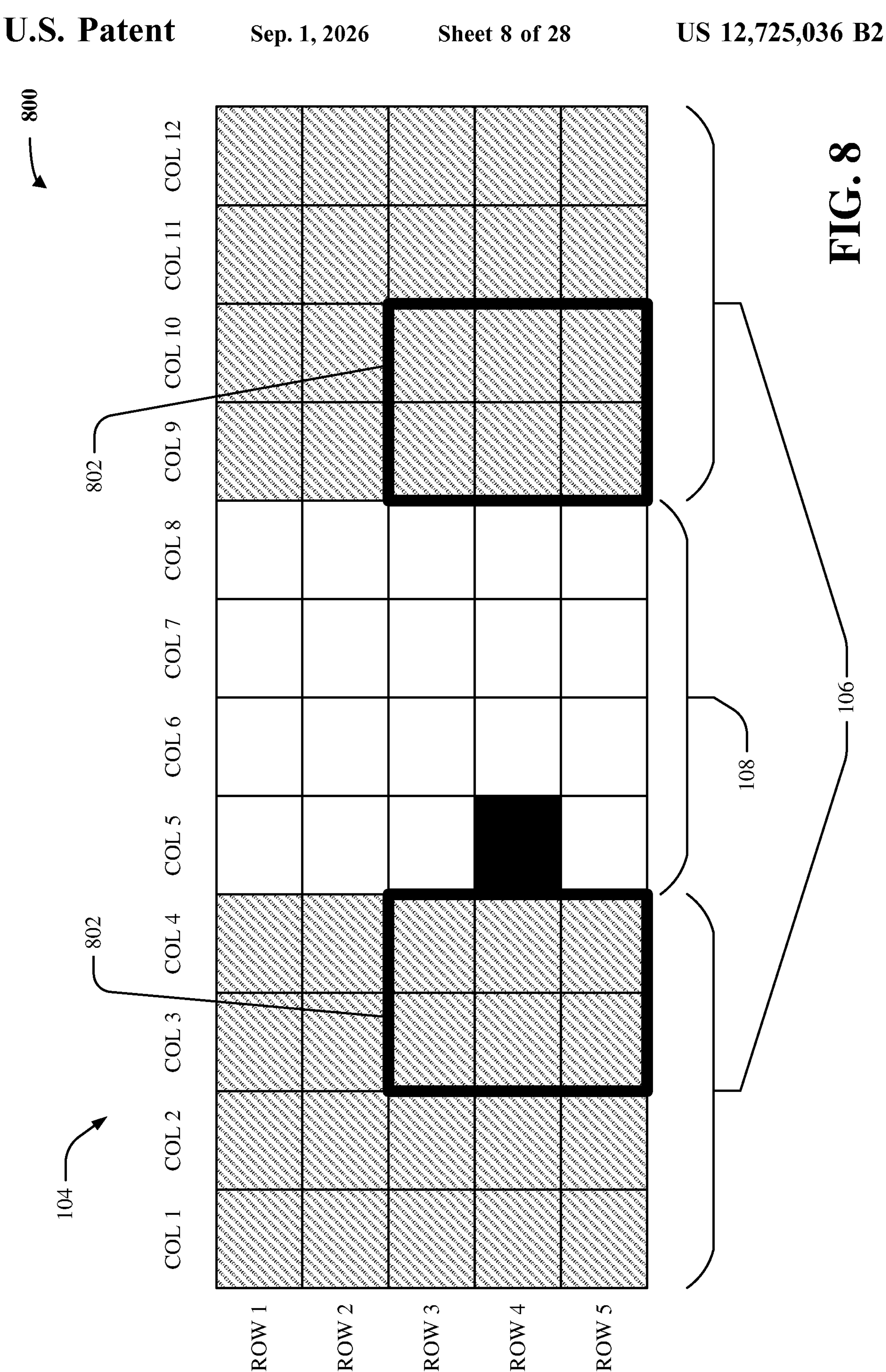

Now, consider FIG. 8. FIG. 8 illustrates a non-limiting example of an interpolation neighborhood window for the missing pixel located at row 4 and column 5 of the data candidate 104, which can be referred to as pixel (4,5). In particular, the pixel (4,5) can have an interpolation neighborhood window 802. As shown, the interpolation neighborhood window 802 can specify that the pixel (4,5) has as interpolation neighbors whatever available pixels of the data candidate 104 that are located in columns 3, 4, 9, and 10 from row 3 to row 5. In other words, the pixel (4,5) can have the following as interpolation neighbors: the pixel (3,3), the pixel (3,4), the pixel (3,9), the pixel (3,10), the pixel (4,3), the pixel (4,4), the pixel (4,9), the pixel (4,10), the pixel (5,3), the pixel (5,4), the pixel (5,9), and the pixel (5,10). Again, note that, as shown, an available pixel need not be adjacent to the pixel (4,5) in order to be deemed or otherwise considered as an interpolation neighbor of the pixel (4,5) (e.g., the pixel (3,10) is not adjacent to the pixel (4,5), and yet the pixel (3,10) can nevertheless be an interpolation neighbor of the pixel (4,5)).

Figure 9:
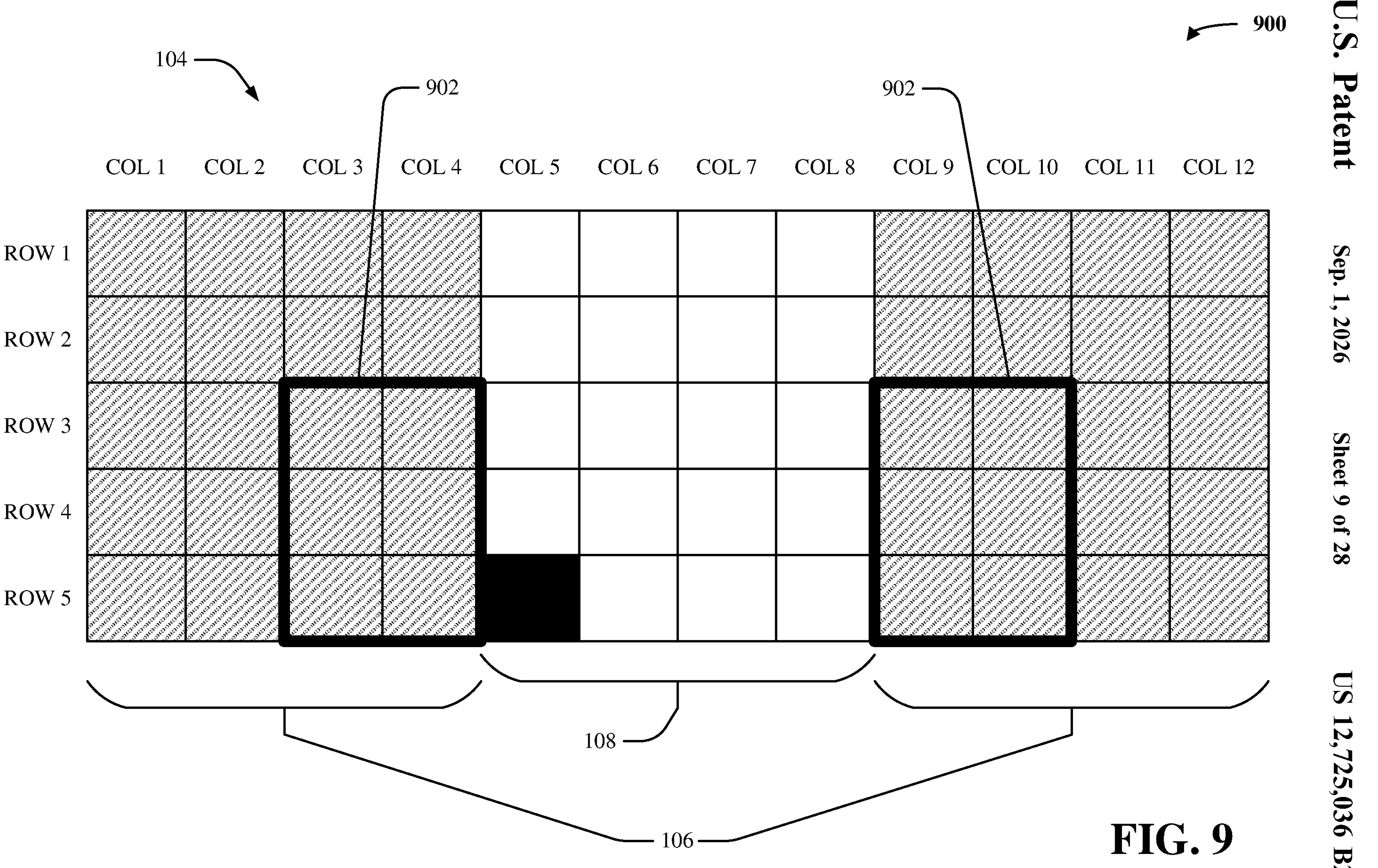

Now, consider FIG. 9. FIG. 9 illustrates a non-limiting example of an interpolation neighborhood window for the missing pixel located at row 5 and column 5 of the data candidate 104, which can be referred to as pixel (5,5). In particular, the pixel (5,5) can have an interpolation neighborhood window 902. As shown in this non-limiting example, the interpolation neighborhood window 902 can be identical to the interpolation neighborhood window 802. That is, the pixel (5,5) can, in various aspects, have the same interpolation neighbors as the pixel (4,5). Again, note that, as shown, an available pixel need not be adjacent to the pixel (5,5) in order to be deemed or otherwise considered as an interpolation neighbor of the pixel (5,5) (e.g., the pixel (3,3) is not adjacent to the pixel (5,5), and yet the pixel (3,3) can nevertheless be an interpolation neighbor of the pixel (5,5)).

Although FIGS. 5-9 depict the interpolation neighborhood windows 502, 602, 702, 802, and 902 as all having the same shape and size as each other (e.g., each being rectangularly shaped and indicating twelve interpolation neighbors), this is a mere non-limiting example for ease of explanation and illustration. In various aspects, different missing pixels can have the same or different numbers of interpolation neighbors as each other. Moreover, the interpolation neighborhood windows of different missing pixels can have the same or different shapes as each other.

In any case, the data candidate 104 can comprise the set of available numerical elements 106 and the set of missing numerical elements 108, and the set of missing numerical elements 108 can respectively correspond to the set of interpolation neighborhood windows 110.

Returning back to FIG. 1, it can be desired to compute, estimate, or otherwise determine interpolated values for the set of missing numerical elements 108. As described herein, the deep interpolation system 102 can facilitate such interpolation.

In various embodiments, the deep interpolation system 102 can comprise a processor 112 (e.g., computer processing unit, microprocessor) and a non-transitory computer-readable memory 114 that is operably or operatively or communicatively connected or coupled to the processor 112. The non-transitory computer-readable memory 114 can store computer-executable instructions which, upon execution by the processor 112, can cause the processor 112 or other components of the deep interpolation system 102 (e.g., access component 116, inference component 118, interpolation component 120, execution component 122) to perform one or more acts. In various embodiments, the non-transitory computer-readable memory 114 can store computer-executable components (e.g., access component 116, inference component 118, interpolation component 120, execution component 122), and the processor 112 can execute the computer-executable components.

In various embodiments, the deep interpolation system 102 can comprise an access component 116. In various aspects, the access component 116 can electronically receive or otherwise electronically access the data candidate 104 or the set of interpolation neighborhood windows 110. In various instances, the access component 116 can electronically retrieve the data candidate 104 or the set of interpolation neighborhood windows 110 from any suitable centralized or decentralized data structures (not shown) or from any suitable centralized or decentralized computing devices (not shown). In any case, the access component 116 can electronically obtain or access the data candidate 104 or the set of interpolation neighborhood windows 110, such that other components of the deep interpolation system 102 can electronically interact with the data candidate 104 or with the set of interpolation neighborhood windows 110.

In various embodiments, the deep interpolation system 102 can comprise an inference component 118. In various aspects, as described herein, the inference component 118 can generate, via deep learning, a set of weight maps respectively corresponding to the set of missing numerical elements 108.

In various embodiments, the deep interpolation system 102 can comprise an interpolation component 120. In various instances, as described herein, the interpolation component 120 can compute a set of interpolated values respectively corresponding to the set of missing numerical elements 108, based on the set of weight maps and the set of interpolation neighborhood windows 110.

In various embodiments, the deep interpolation system 102 can comprise an execution component 122. In various cases, as described herein, the execution component 122 can perform any suitable electronic actions based on the set of interpolated values or based on the set of weight maps (e.g., can render any of the set of interpolated values or any of the set of weight maps on any suitable graphical user-interface; can compute an uncertainty score for the set of interpolated numerical values based on the set of weight maps).

Figure 10:
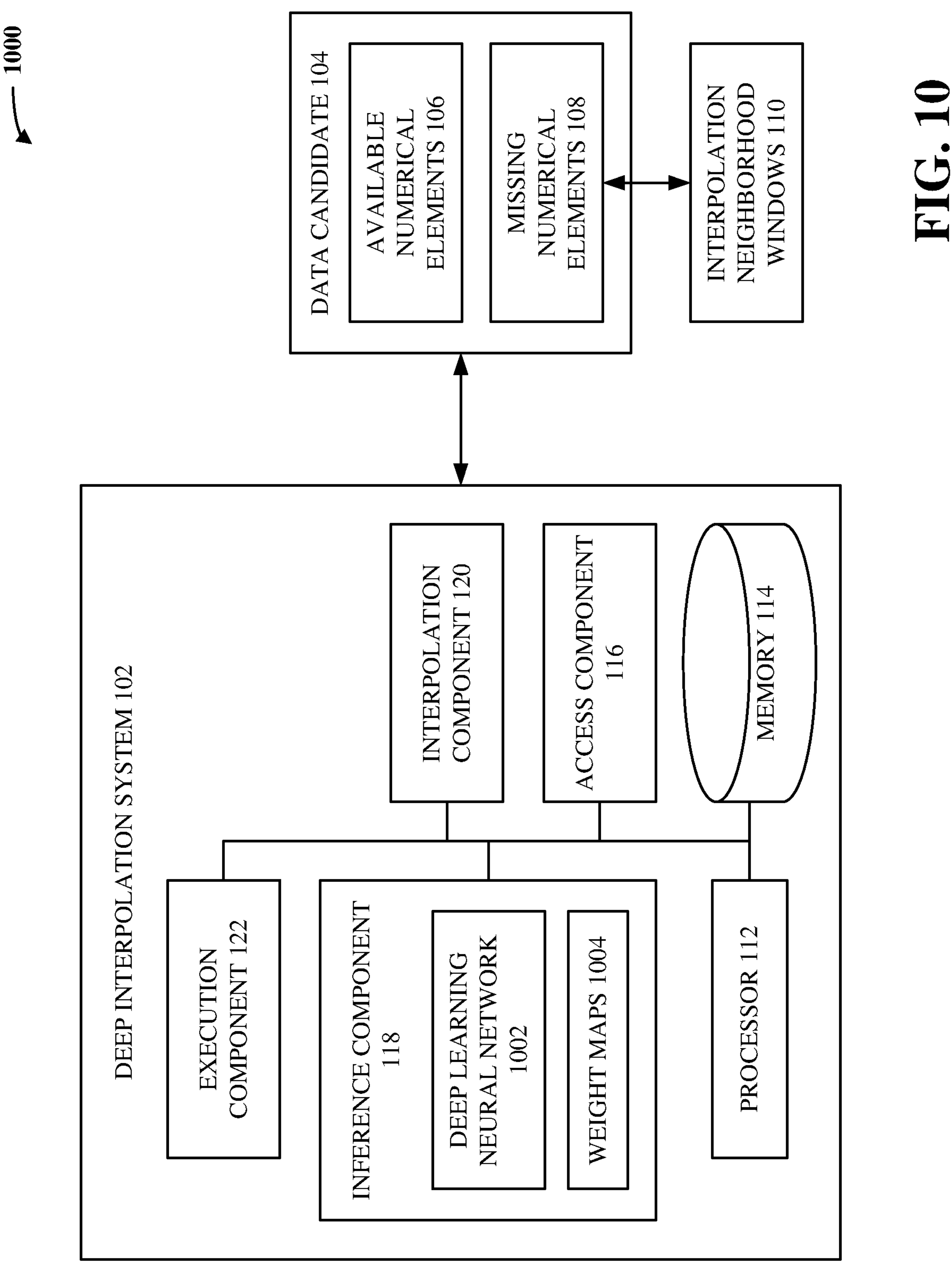
FIG. 10 illustrates a block diagram of an example, non-limiting system including a deep learning neural network and a set of weight maps that facilitates explainable deep interpolation in accordance with one or more embodiments described herein.

FIG. 10 illustrates a block diagram of an example, non-limiting system 1000 including a deep learning neural network and a set of weight maps that can facilitate explainable deep interpolation in accordance with one or more embodiments described herein. As shown, the system 1000 can, in some cases, comprise the same components as the system 100, and can further comprise a deep learning neural network 1002 and a set of weight maps 1004.

In various embodiments, the inference component 118 can electronically store, electronically maintain, electronically control, or otherwise electronically access the deep learning neural network 1002. In various aspects, the deep learning neural network 1002 can have or otherwise exhibit any suitable internal architecture. For instance, the deep learning neural network 1002 can have an input layer, one or more hidden layers, and an output layer. In various instances, any of such layers can be coupled together by any suitable interneuron connections or interlayer connections, such as forward connections, skip connections, or recurrent connections. Furthermore, in various cases, any of such layers can be any suitable types of neural network layers having any suitable learnable or trainable internal parameters. For example, any of such input layer, one or more hidden layers, or output layer can be convolutional layers, whose learnable or trainable parameters can be convolutional kernels. As another example, any of such input layer, one or more hidden layers, or output layer can be dense layers, whose learnable or trainable parameters can be weight matrices or bias values. As still another example, any of such input layer, one or more hidden layers, or output layer can be batch normalization layers, whose learnable or trainable parameters can be shift factors or scale factors. Further still, in various cases, any of such layers can be any suitable types of neural network layers having any suitable fixed or non-trainable internal parameters. For example, any of such input layer, one or more hidden layers, or output layer can be non-linearity layers, padding layers, pooling layers, or concatenation layers.

In various aspects, the inference component 118 can electronically execute the deep learning neural network 1002 on the data candidate 104, and such execution can cause the deep learning neural network 1002 to produce the set of weight maps 1004. Various non-limiting aspects are further described with respect to FIGS. 11-13.

Figure 11:
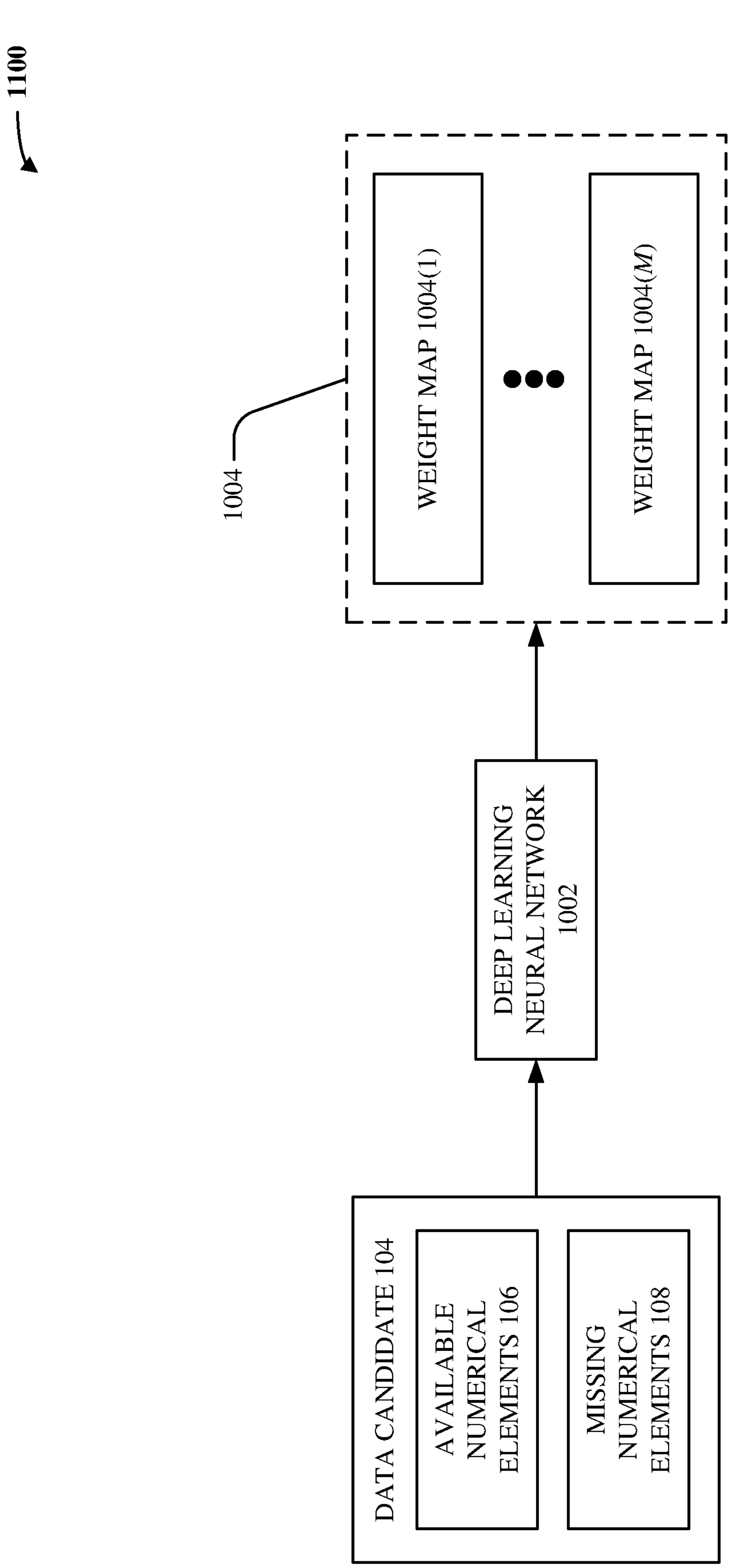
FIGS. 11-13 illustrate example, non-limiting block diagrams showing how a deep learning neural network can generate a set of weight maps in accordance with one or more embodiments described herein.
Figure 12:
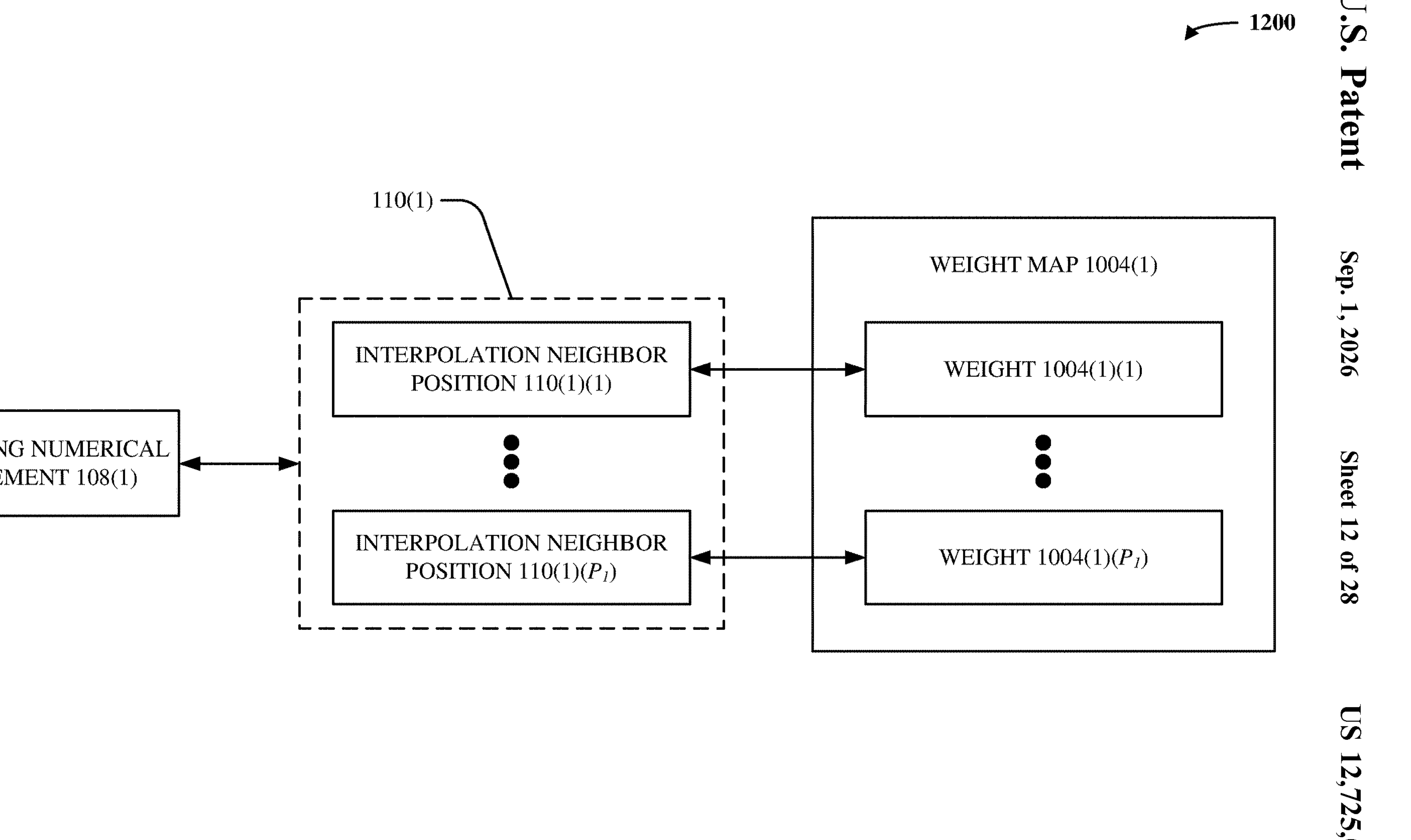
Figure 13:
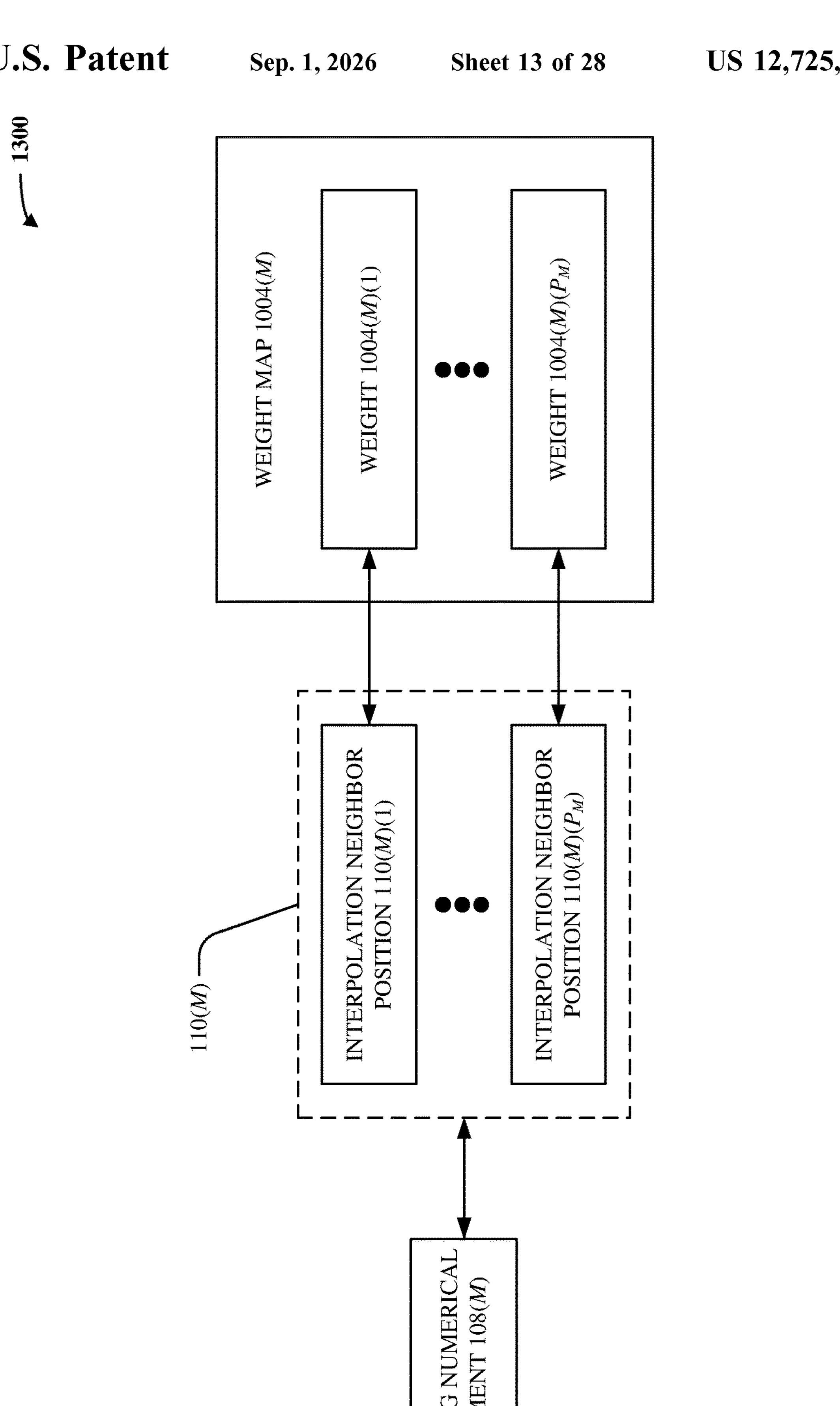

FIGS. 11-13 illustrate example, non-limiting block diagrams 1100, 1200, and 1300 showing how the deep learning neural network 1002 can generate the set of weight maps 1004 in accordance with one or more embodiments described herein.

First, consider FIG. 11. As shown, the inference component 118 can, in various aspects, feed the data candidate 104 as input to the deep learning neural network 1002. In response, the deep learning neural network 1002 can generate the set of weight maps 1004. More specifically, the inference component 118 can provide or otherwise pass the data candidate 104 to an input layer of the deep learning neural network 1002. In various instances, the data candidate 104 can complete a forward pass through one or more hidden layers of the deep learning neural network 1002. In various cases, an output layer of the deep learning neural network 1002 can compute or otherwise calculate the set of weight maps 1004, based on activation maps generated by the one or more hidden layers.

In any case, the set of weight maps 1004 can respectively correspond (e.g., in one-to-one fashion) to the set of missing numerical elements 108. Accordingly, because the set of missing numerical elements 108 can comprise m elements, the set of weight maps 1004 can comprise m weight maps: a weight map 1004(1) to a weight map 1004(*m*). In various aspects, a weight map can be any suitable set of weights (e.g., of scalar coefficients) that can respectively correspond (e.g., in one-to-one fashion) to the interpolation neighbors of a respective one of the set of missing numerical elements 108.

For example, the weight map 1004(1) can correspond to the missing numerical element 108(1). Accordingly, the weight map 1004(1) can have or otherwise include a unique scalar coefficient for each interpolation neighbor of the missing numerical element 108(1). A non-limiting example is shown in FIG. 12.

As described above, the missing numerical element 108(1) can correspond to the interpolation neighborhood window 110(1), and the interpolation neighborhood window 110(1) can specify a total of $p_1$ interpolation neighbor positions. In other words, the interpolation neighborhood window 110(1) can be considered as identifying a total of $p_1$ interpolation neighbors of the missing numerical element 108(1) (e.g., whichever of the set of available numerical elements 106 are located at the $p_1$ positions specified in the interpolation neighborhood window 110(1) can be considered as the $p_1$ interpolation neighbors of the missing numerical element 108(1)). In various aspects, because the weight map 1004(1) can correspond to the missing numerical element 108(1), the weight map 1004(1) can comprise a unique weight (e.g., a unique scalar coefficient) for each of the total of $p_1$ interpolation neighbors of the missing numerical element 108(1). That is, the weight map 1004(1) can comprise $p_1$ weights: a weight 1004(1)(1) to a weight 1004(1)($p_1$). In various aspects, the weight 1004(1)(1) can be any suitable scalar coefficient that can correspond to the interpolation neighbor position 110(1)(1) and thus to the first interpolation neighbor of the missing numerical element 108(1). In some cases, the weight 1004(1)(1) can be considered as indicating how much or how little influence the first interpolation neighbor of the missing numerical element 108(1) has (or should have) on the value of the missing numerical element 108(1). In various instances, the weight 1004(1)($p_1$) can be any suitable scalar coefficient that can correspond to the interpolation neighbor position 110(1)($p_1$) and thus to the $p_1$-th interpolation neighbor of the missing numerical element 108(1). As above, the weight 1004(1)($p_1$) can be considered as indicating how much or how little influence the $p_1$-th interpolation neighbor of the missing numerical element 108(1) has (or should have) on the value of the missing numerical element 108(1).

As another example, the weight map 1004(*m*) can correspond to the missing numerical element 108(*m*). So, the weight map 1004(*m*) can have or otherwise include a unique scalar coefficient for each interpolation neighbor of the missing numerical element 108(*m*). A non-limiting example is shown in FIG. 13.

As described above, the missing numerical element 108 (*m*) can correspond to the interpolation neighborhood window 110(*m*), and the interpolation neighborhood window 110(*m*) can specify a total of $p_m$ interpolation neighbor positions. That is, the interpolation neighborhood window 110(*m*) can be considered as identifying a total of $p_m$ interpolation neighbors of the missing numerical element 108(*m*) (e.g., whichever of the set of available numerical elements 106 are located at the $p_m$ positions specified in the interpolation neighborhood window 110(*m*) can be considered as the $p_m$ interpolation neighbors of the missing numerical element 108(*m*)). In various aspects, because the weight map 1004(*m*) can correspond to the missing numerical element 108(*m*), the weight map 1004(*m*) can comprise a unique weight (e.g., a unique scalar coefficient) for each of the total of $p_m$ interpolation neighbors of the missing numerical element 108(*m*). In other words, the weight map 1004(*m*) can comprise $p_m$ weights: a weight 1004(*m*)(1) to a weight 1004(*m*)($p_m$). In various aspects, the weight 1004(*m*) (1) can be any suitable scalar coefficient that can correspond to the interpolation neighbor position 110(*m*)(1) and thus to the first interpolation neighbor of the missing numerical element 108(*m*). In some cases, the weight 1004(*m*)(1) can be considered as indicating how much or how little influence the first interpolation neighbor of the missing numerical element 108(*m*) has (or should have) on the value of the missing numerical element 108(*m*). In various instances, the weight 1004(*m*)($p_m$) can be any suitable scalar coefficient that can correspond to the interpolation neighbor position 110(*m*)($p_m$) and thus to the $p_m$-th interpolation neighbor of the missing numerical element 108(*m*). As above, the weight 1004(*m*)($p_m$) can be considered as indicating how much or how little influence the $p_m$-th interpolation neighbor of the missing numerical element 108(*m*) has (or should have) on the value of the missing numerical element 108(*m*).

To clarify various aspects discussed above, consider the non-limiting, illustrative examples presented in FIGS. 14-18.

FIGS. 14-18 illustrate example, non-limiting block diagrams 1400, 1500, 1600, 1700, and 1800 showing various weight maps in accordance with one or more embodiments described herein. Indeed, as explained with respect to FIGS. 4-8, the data candidate 104 can, in some non-limiting examples, be a two-dimensional pixel array having five rows and twelve columns of pixels. In various cases, FIGS. 14-18 illustrate non-limiting weight maps that can correspond to various missing pixels of the data candidate 104 in such case.

Figure 14:
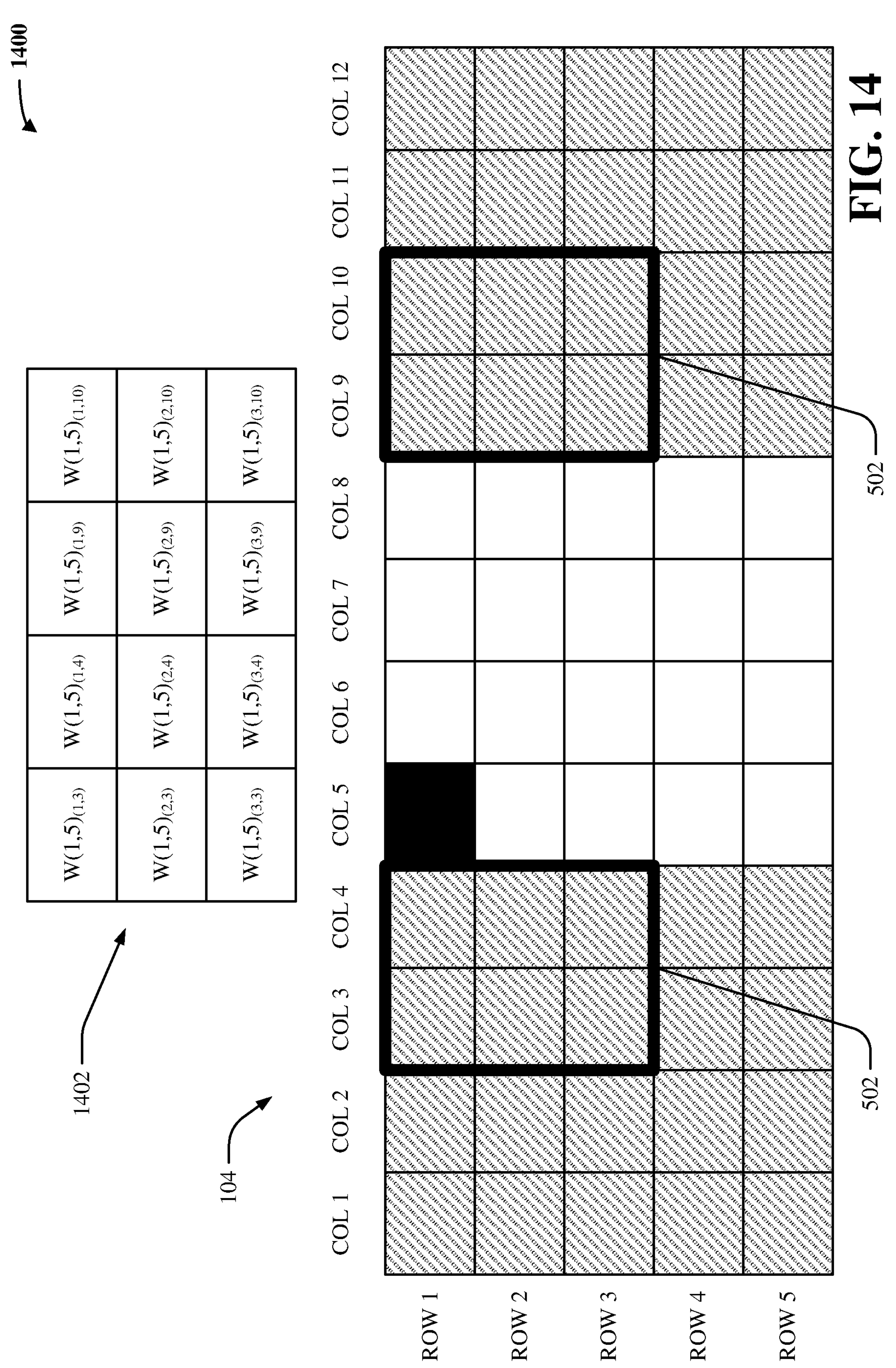
FIGS. 14-18 illustrate example, non-limiting block diagrams showing various weight maps in accordance with one or more embodiments described herein.

First, consider FIG. 14. As mentioned above, the pixel (1,5) can be missing in the data candidate 104, and the pixel (1,5) can have an interpolation neighborhood window 502 that identifies twelve unique interpolation neighbors of the pixel (1,5). As explained above, such twelve unique interpolation neighbors can be the pixel (1,3), the pixel (1,4), the pixel (1,9), the pixel (1,10), the pixel (2,3), the pixel (2,4), the pixel (2,9), the pixel (2,10), the pixel (3,3), the pixel (3,4), the pixel (3,9), and the pixel (3,10). In various aspects, upon being executed on the data candidate 104, the deep learning neural network 1002 can generate a weight map 1402 for the pixel (1,5), where the weight map 1402 can include a respective weight for each interpolation neighbor of the pixel (1,5).

Indeed, as shown in the non-limiting example of FIG. 14, the weight map 1402 can include: a unique or distinct weight $w(1,5)_{(1,3)}$ respectively corresponding to the pixel (1,3) that can indicate how much influence the pixel (1,3) has or should have with respect to the pixel (1,5); a unique or distinct weight $w(1,5)_{(2,3)}$ respectively corresponding to the pixel (2,3) that can indicate how much influence the pixel (2,3) has or should have with respect to the pixel (1,5); a unique or distinct weight $w(1,5)_{(3,3)}$ respectively corresponding to the pixel (3,3) that can indicate how much influence the pixel (3,3) has or should have with respect to the pixel (1,5); a unique or distinct weight $w(1,5)_{(1,4)}$ respectively corresponding to the pixel (1,4) that can indicate how much influence the pixel (1,4) has or should have with respect to the pixel (1,5); a unique or distinct weight $w(1,5)_{(2,4)}$ respectively corresponding to the pixel (2,4) that can indicate how much influence the pixel (2,4) has or should have with respect to the pixel (1,5); a unique or distinct weight $w(1,5)_{(3,4)}$ respectively corresponding to the pixel (3,4) that can indicate how much influence the pixel (3,4) has or should have with respect to the pixel (1,5); a unique or distinct weight $w(1,5)_{(1,9)}$ respectively corresponding to the pixel (1,9) that can indicate how much influence the pixel (1,9) has or should have with respect to the pixel (1,5); a unique or distinct weight $w(1,5)_{(2,9)}$ respectively corresponding to the pixel (2,9) that can indicate how much influence the pixel (2,9) has or should have with respect to the pixel (1,5); a unique or distinct weight $w(1,5)_{(3,9)}$ respectively corresponding to the pixel (3,9) that can indicate how much influence the pixel (3,9) has or should have with respect to the pixel (1,5); a unique or distinct weight $w(1,5)_{(1,10)}$ respectively corresponding to the pixel (1,10) that can indicate how much influence the pixel (1,10) has or should have with respect to the pixel (1,5); a unique or distinct weight $w(1,5)_{(2,10)}$ respectively corresponding to the pixel (2,10) that can indicate how much influence the pixel (2,10) has or should have with respect to the pixel (1,5); and a unique or distinct weight $w(1,5)_{(3,10)}$ respectively corresponding to the pixel (3,10) that can indicate how much influence the pixel (3,10) has or should have with respect to the pixel (1,5).

Figure 15:
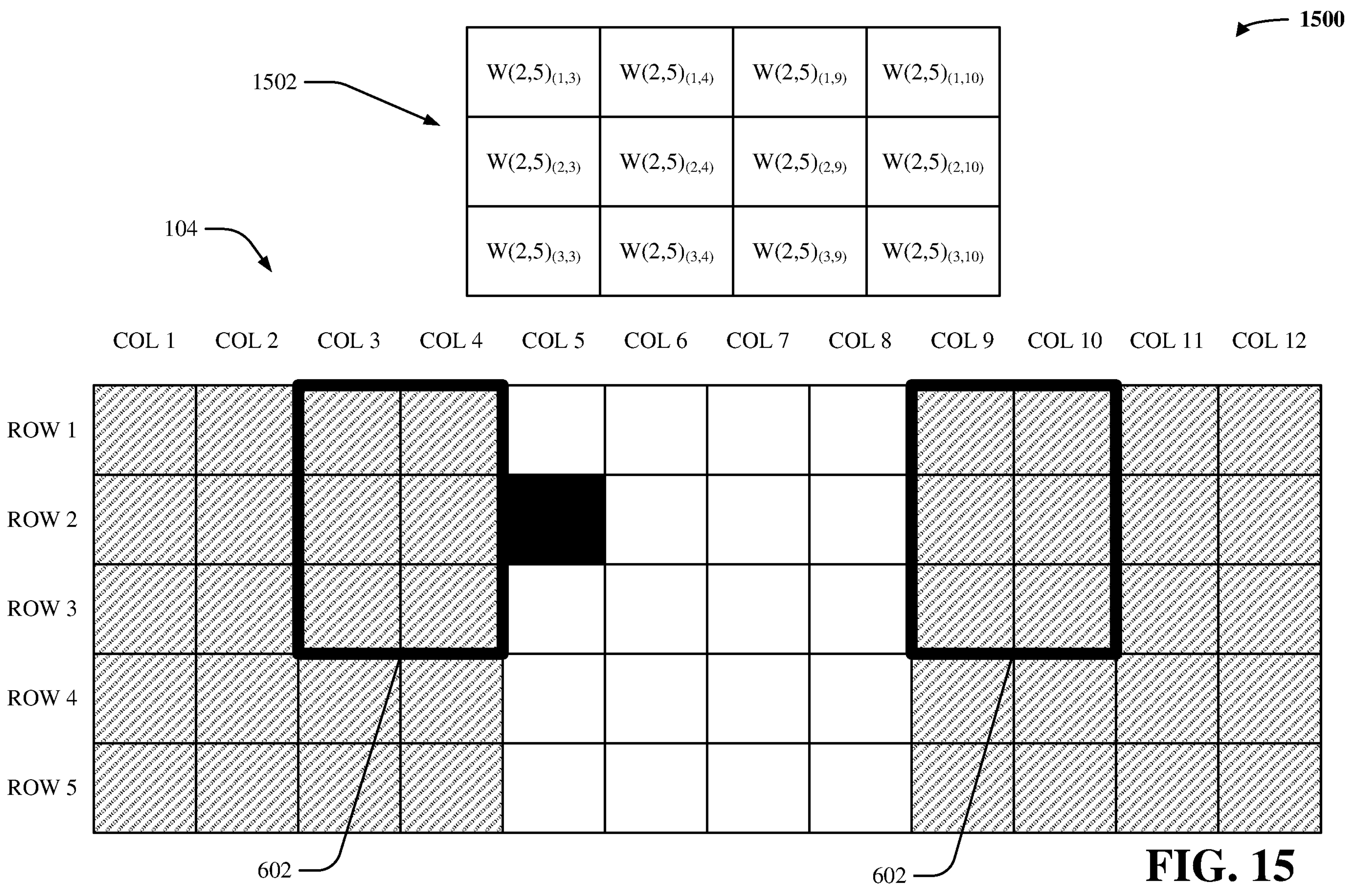

Next, consider FIG. 15. As mentioned above, the pixel (2,5) can be missing in the data candidate 104, and the pixel (2,5) can have an interpolation neighborhood window 602 that identifies twelve unique interpolation neighbors of the pixel (2,5). As explained above, such twelve unique interpolation neighbors can be the pixel (1,3), the pixel (1,4), the pixel (1,9), the pixel (1,10), the pixel (2,3), the pixel (2,4), the pixel (2,9), the pixel (2,10), the pixel (3,3), the pixel (3,4), the pixel (3,9), and the pixel (3,10). In various aspects, upon being executed on the data candidate 104, the deep learning neural network 1002 can generate a weight map 1502 for the pixel (2,5), where the weight map 1502 can include a respective weight for each interpolation neighbor of the pixel (2,5).

Indeed, as shown in the non-limiting example of FIG. 15, the weight map 1502 can include: a unique or distinct weight $w(2,5)_{(1,3)}$ respectively corresponding to the pixel (1,3) that can indicate how much influence the pixel (1,3) has or should have with respect to the pixel (2,5); a unique or distinct weight $w(2,5)_{(2,3)}$ respectively corresponding to the pixel (2,3) that can indicate how much influence the pixel (2,3) has or should have with respect to the pixel (2,5); a unique or distinct weight $w(2,5)_{(3,3)}$ respectively corresponding to the pixel (3,3) that can indicate how much influence the pixel (3,3) has or should have with respect to the pixel (2,5); a unique or distinct weight $w(2,5)_{(1,4)}$ respectively corresponding to the pixel (1,4) that can indicate how much influence the pixel (1,4) has or should have with respect to the pixel (2,5); a unique or distinct weight $w(2,5)_{(2,4)}$ respectively corresponding to the pixel (2,4) that can indicate how much influence the pixel (2,4) has or should have with respect to the pixel (2,5); a unique or distinct weight $w(2,5)_{(3,4)}$ respectively corresponding to the pixel (3,4) that can indicate how much influence the pixel (3,4) has or should have with respect to the pixel (2,5); a unique or distinct weight $w(2,5)_{(1,9)}$ respectively corresponding to the pixel (1,9) that can indicate how much influence the pixel (1,9) has or should have with respect to the pixel (2,5); a unique or distinct weight $w(2,5)_{(2,9)}$ respectively corresponding to the pixel (2,9) that can indicate how much influence the pixel (2,9) has or should have with respect to the pixel (2,5); a unique or distinct weight $w(2,5)_{(3,9)}$ respectively corresponding to the pixel (3,9) that can indicate how much influence the pixel (3,9) has or should have with respect to the pixel (2,5); a unique or distinct weight $w(2,5)_{(1,10)}$ respectively corresponding to the pixel (1,10) that can indicate how much influence the pixel (1,10) has or should have with respect to the pixel (2,5); a unique or distinct weight $w(2,5)_{(2,10)}$ respectively corresponding to the pixel (2,10) that can indicate how much influence the pixel (2,10) has or should have with respect to the pixel (2,5); and a unique or distinct weight $w(2,5)_{(3,10)}$ respectively corresponding to the pixel (3,10) that can indicate how much influence the pixel (3,10) has or should have with respect to the pixel (2,5).

Figure 16:
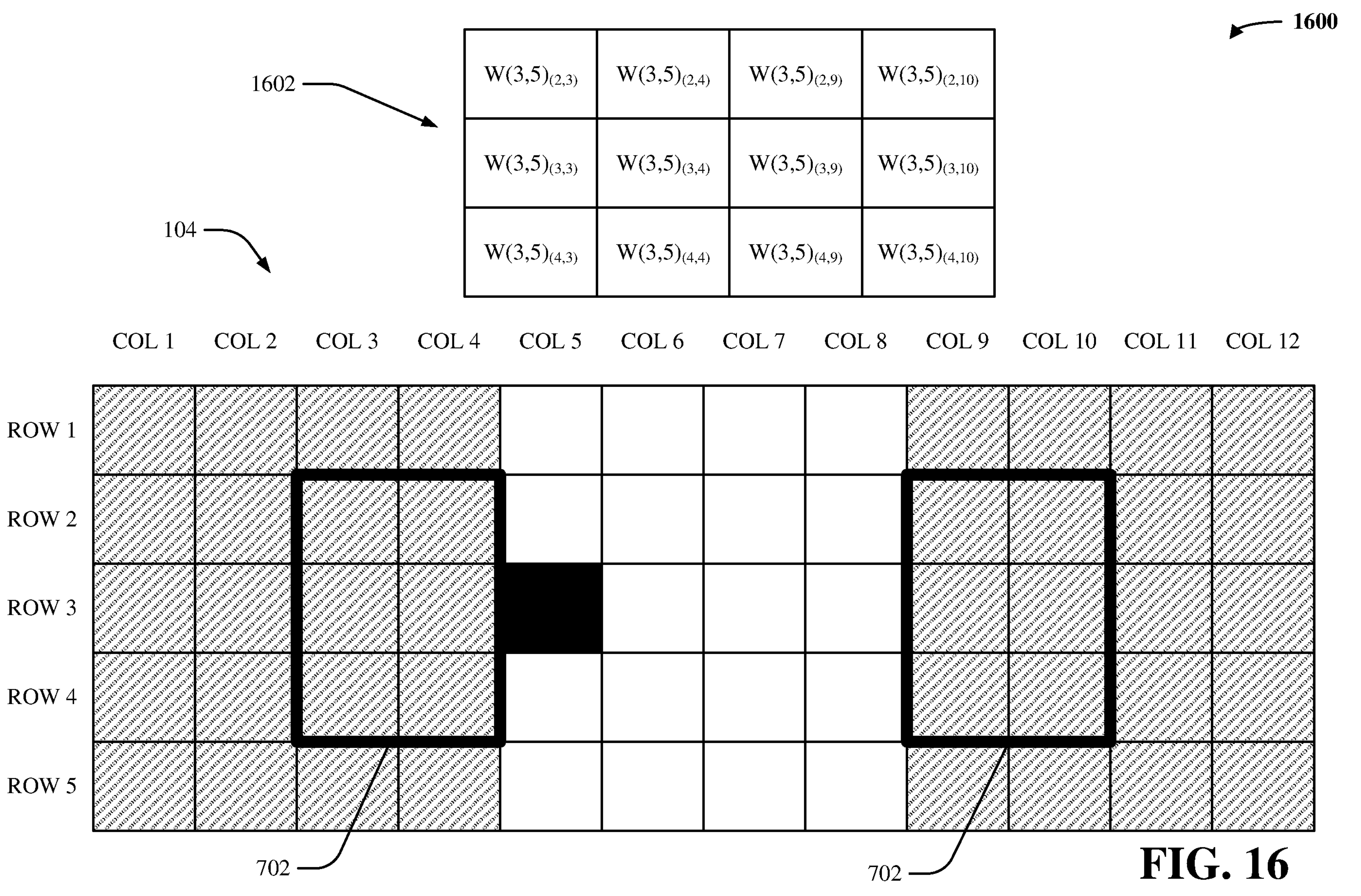

Now, consider FIG. 16. As mentioned above, the pixel (3,5) can be missing in the data candidate 104, and the pixel (3,5) can have an interpolation neighborhood window 702 that identifies twelve unique interpolation neighbors of the pixel (3,5). As explained above, such twelve unique interpolation neighbors can be the pixel (2,3), the pixel (2,4), the pixel (2,9), the pixel (2,10), the pixel (3,3), the pixel (3,4), the pixel (3,9), the pixel (3,10), the pixel (4,3), the pixel (4,4), the pixel (4,9), and the pixel (4,10). In various aspects, upon being executed on the data candidate 104, the deep learning neural network 1002 can generate a weight map 1602 for the pixel (3,5), where the weight map 1602 can include a respective weight for each interpolation neighbor of the pixel (3,5).

Indeed, as shown in the non-limiting example of FIG. 16, the weight map 1602 can include: a unique or distinct weight $w(3,5)_{(2,3)}$ respectively corresponding to the pixel (2,3) that can indicate how much influence the pixel (2,3) has or should have with respect to the pixel (3,5); a unique or distinct weight $w(3,5)_{(3,3)}$ respectively corresponding to the pixel (3,3) that can indicate how much influence the pixel (3,3) has or should have with respect to the pixel (3,5); a unique or distinct weight $w(3,5)_{(4,3)}$ respectively corresponding to the pixel (4,3) that can indicate how much influence the pixel (4,3) has or should have with respect to the pixel (3,5); a unique or distinct weight $w(3,5)_{(2,4)}$ respectively corresponding to the pixel (2,4) that can indicate how much influence the pixel (2,4) has or should have with respect to the pixel (3,5); a unique or distinct weight $w(3,5)_{(3,4)}$ respectively corresponding to the pixel (3,4) that can indicate how much influence the pixel (3,4) has or should have with respect to the pixel (3,5); a unique or distinct weight $w(3,5)_{(4,4)}$ respectively corresponding to the pixel (4,4) that can indicate how much influence the pixel (4,4) has or should have with respect to the pixel (3,5); a unique or distinct weight $w(3,5)_{(2,9)}$ respectively corresponding to the pixel (2,9) that can indicate how much influence the pixel (2,9) has or should have with respect to the pixel (3,5); a unique or distinct weight $w(3,5)_{(3,9)}$ respectively corresponding to the pixel (3,9) that can indicate how much influence the pixel (3,9) has or should have with respect to the pixel (3,5); a unique or distinct weight $w(3,5)_{(4,9)}$ respectively corresponding to the pixel (4,9) that can indicate how much influence the pixel (4,9) has or should have with respect to the pixel (3,5); a unique or distinct weight $w(3,5)_{(2,10)}$ respectively corresponding to the pixel (2,10) that can indicate how much influence the pixel (2,10) has or should have with respect to the pixel (3,5); a unique or distinct weight $w(3,5)_{(3,10)}$ respectively corresponding to the pixel (3,10) that can indicate how much influence the pixel (3,10) has or should have with respect to the pixel (3,5); and a unique or distinct weight $w(3,5)_{(4,10)}$ respectively corresponding to the pixel (4,10) that can indicate how much influence the pixel (4,10) has or should have with respect to the pixel (3,5).

Figure 17:
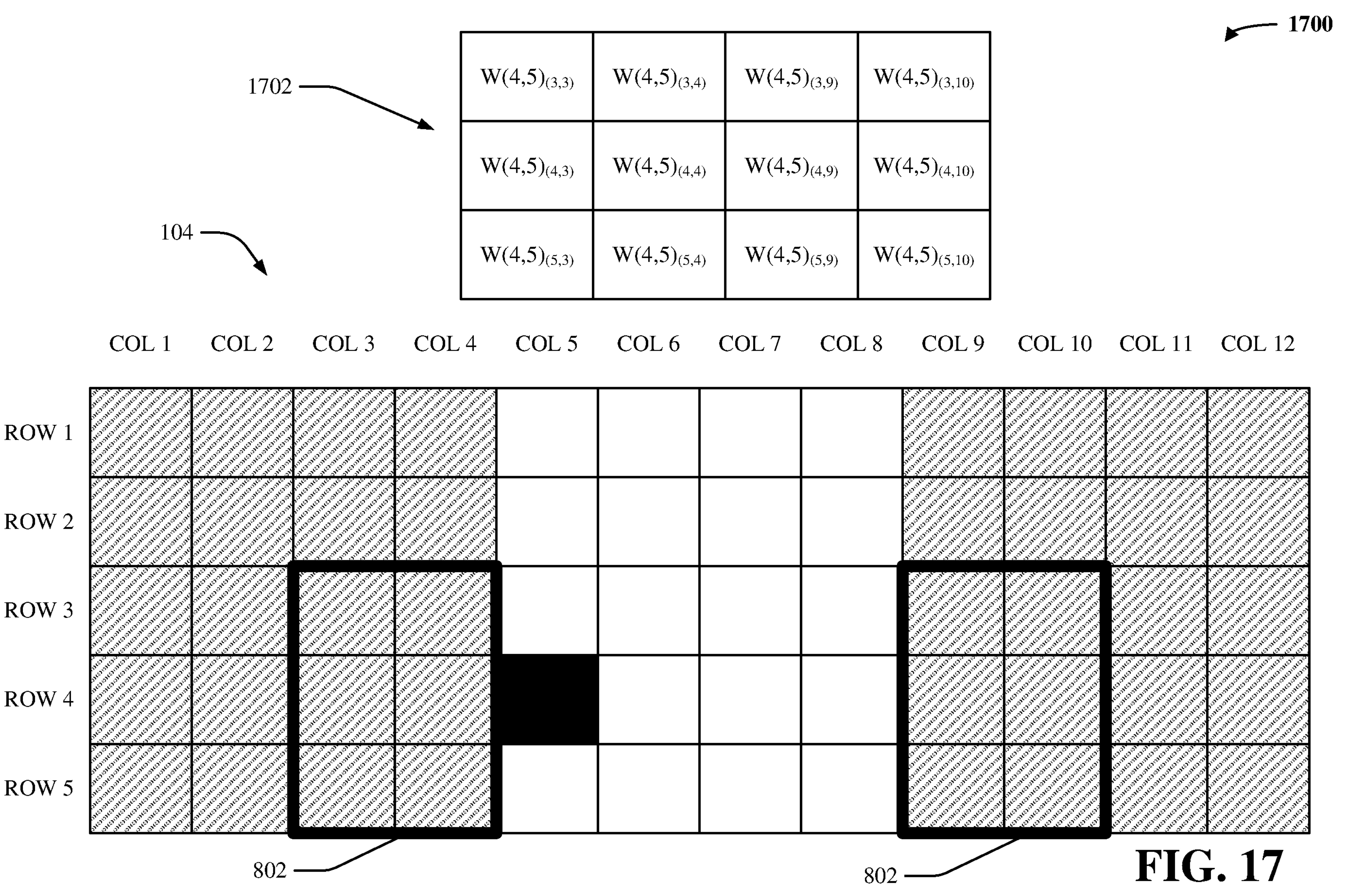

Next, consider FIG. 17. As mentioned above, the pixel (4,5) can be missing in the data candidate 104, and the pixel (4,5) can have an interpolation neighborhood window 802 that identifies twelve unique interpolation neighbors of the pixel (4,5). As explained above, such twelve unique interpolation neighbors can be the pixel (3,3), the pixel (3,4), the pixel (3,9), the pixel (3,10), the pixel (4,3), the pixel (4,4), the pixel (4,9), the pixel (4,10), the pixel (5,3), the pixel (5,4), the pixel (5,9), and the pixel (5,10). In various aspects, upon being executed on the data candidate 104, the deep learning neural network 1002 can generate a weight map 1702 for the pixel (4,5), where the weight map 1702 can include a respective weight for each interpolation neighbor of the pixel (4,5).

Indeed, as shown in the non-limiting example of FIG. 17, the weight map 1702 can include: a unique or distinct weight $w(4,5)_{(3,3)}$ respectively corresponding to the pixel (3,3) that can indicate how much influence the pixel (3,3) has or should have with respect to the pixel (4,5); a unique or distinct weight $w(4,5)_{(4,3)}$ respectively corresponding to the pixel (4,3) that can indicate how much influence the pixel (4,3) has or should have with respect to the pixel (4,5); a unique or distinct weight $w(4,5)_{(5,3)}$ respectively corresponding to the pixel (5,3) that can indicate how much influence the pixel (5,3) has or should have with respect to the pixel (4,5); a unique or distinct weight $w(4,5)_{(3,4)}$ respectively corresponding to the pixel (3,4) that can indicate how much influence the pixel (3,4) has or should have with respect to the pixel (4,5); a unique or distinct weight $w(4,5)_{(4,4)}$ respectively corresponding to the pixel (4,4) that can indicate how much influence the pixel (4,4) has or should have with respect to the pixel (4,5); a unique or distinct weight $w(4,5)_{(5,4)}$ respectively corresponding to the pixel (5,4) that can indicate how much influence the pixel (5,4) has or should have with respect to the pixel (4,5); a unique or distinct weight $w(4,5)_{(3,9)}$ respectively corresponding to the pixel (3,9) that can indicate how much influence the pixel (3,9) has or should have with respect to the pixel (4,5); a unique or distinct weight $w(4,5)_{(4,9)}$ respectively corresponding to the pixel (4,9) that can indicate how much influence the pixel (4,9) has or should have with respect to the pixel (4,5); a unique or distinct weight $w(4,5)_{(5,9)}$ respectively corresponding to the pixel (5,9) that can indicate how much influence the pixel (5,9) has or should have with respect to the pixel (4,5); a unique or distinct weight $w(4,5)_{(3,10)}$ respectively corresponding to the pixel (3,10) that can indicate how much influence the pixel (3,10) has or should have with respect to the pixel (4,5); a unique or distinct weight $w(4,5)_{(4,10)}$ respectively corresponding to the pixel (4,10) that can indicate how much influence the pixel (4,10) has or should have with respect to the pixel (4,5); and a unique or distinct weight $w(4,5)_{(5,10)}$ respectively corresponding to the pixel (5,10) that can indicate how much influence the pixel (5,10) has or should have with respect to the pixel (4,5).

Figure 18:
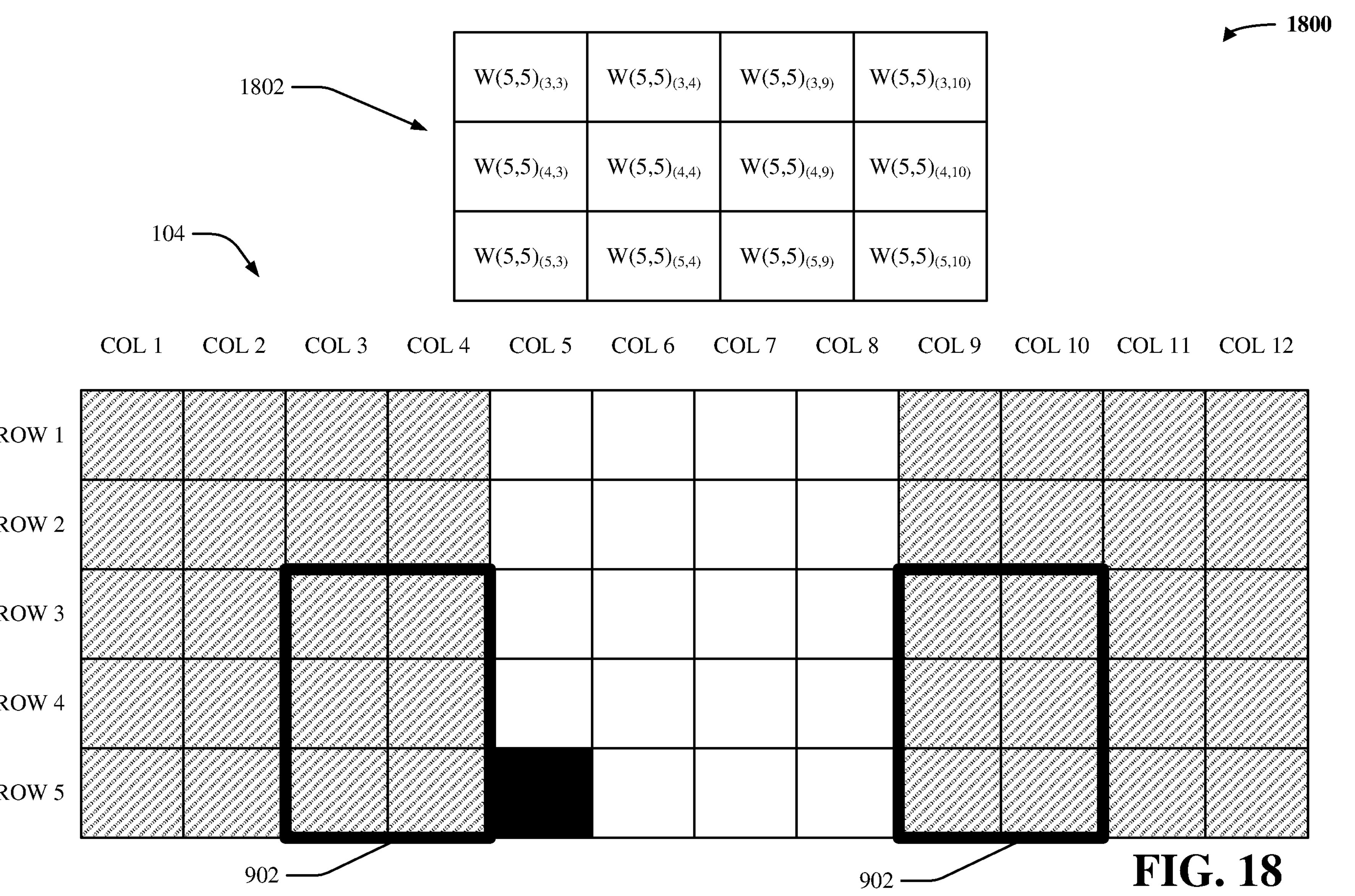

Now, consider FIG. 18. As mentioned above, the pixel (5,5) can be missing in the data candidate 104, and the pixel (5,5) can have an interpolation neighborhood window 902 that identifies twelve unique interpolation neighbors of the pixel (5,5). As explained above, such twelve unique interpolation neighbors can be the pixel (3,3), the pixel (3,4), the pixel (3,9), the pixel (3,10), the pixel (4,3), the pixel (4,4), the pixel (4,9), the pixel (4,10), the pixel (5,3), the pixel (5,4), the pixel (5,9), and the pixel (5,10). In various aspects, upon being executed on the data candidate 104, the deep learning neural network 1002 can generate a weight map 1802 for the pixel (5,5), where the weight map 1802 can include a respective weight for each interpolation neighbor of the pixel (5,5).

Indeed, as shown in the non-limiting example of FIG. 18, the weight map 1802 can include: a unique or distinct weight $w(5,5)_{(3,3)}$ respectively corresponding to the pixel (3,3) that can indicate how much influence the pixel (3,3) has or should have with respect to the pixel (5,5); a unique or distinct weight $w(5,5)_{(4,3)}$ respectively corresponding to the pixel (4,3) that can indicate how much influence the pixel (4,3) has or should have with respect to the pixel (5,5); a unique or distinct weight $w(5,5)_{(5,3)}$ respectively corresponding to the pixel (5,3) that can indicate how much influence the pixel (5,3) has or should have with respect to the pixel (5,5); a unique or distinct weight $w(5,5)_{(3,4)}$ respectively corresponding to the pixel (3,4) that can indicate how much influence the pixel (3,4) has or should have with respect to the pixel (5,5); a unique or distinct weight $w(5,5)_{(4,4)}$ respectively corresponding to the pixel (4,4) that can indicate how much influence the pixel (4,4) has or should have with respect to the pixel (5,5); a unique or distinct weight $w(5,5)_{(5,4)}$ respectively corresponding to the pixel (5,4) that can indicate how much influence the pixel (5,4) has or should have with respect to the pixel (5,5); a unique or distinct weight $w(5,5)_{(3,9)}$ respectively corresponding to the pixel (3,9) that can indicate how much influence the pixel (3,9) has or should have with respect to the pixel (5,5); a unique or distinct weight $w(5,5)_{(4,9)}$ respectively corresponding to the pixel (4,9) that can indicate how much influence the pixel (4,9) has or should have with respect to the pixel (5,5); a unique or distinct weight $w(5,5)_{(5,9)}$ respectively corresponding to the pixel (5,9) that can indicate how much influence the pixel (5,9) has or should have with respect to the pixel (5,5); a unique or distinct weight $w(5,5)_{(3,10)}$ respectively corresponding to the pixel (3,10) that can indicate how much influence the pixel (3,10) has or should have with respect to the pixel (5,5); a unique or distinct weight $w(5,5)_{(4,10)}$ respectively corresponding to the pixel (4,10) that can indicate how much influence the pixel (4,10) has or should have with respect to the pixel (5,5); and a unique or distinct weight $w(5,5)_{(5,10)}$ respectively corresponding to the pixel (5,10) that can indicate how much influence the pixel (5,10) has or should have with respect to the pixel (5,5).

In any case, the inference component 118 can generate the set of weight maps 1004 by executing the deep learning neural network 1002 on the data candidate 104.

Figure 19:
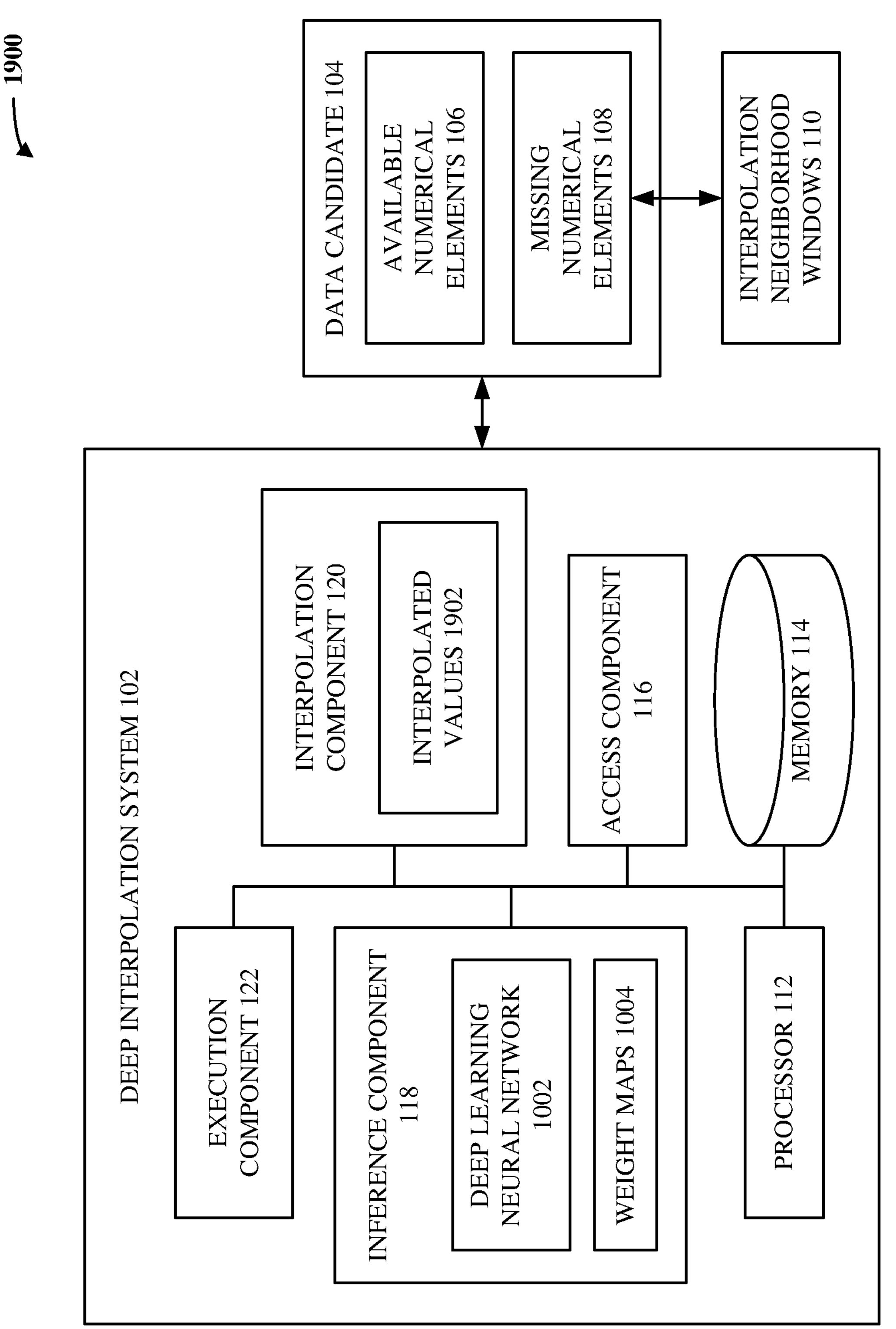
FIG. 19 illustrates a block diagram of an example, non-limiting system including a set of interpolated values that facilitates explainable deep interpolation in accordance with one or more embodiments described herein.

FIG. 19 illustrates a block diagram of an example, non-limiting system 1900 including a set of interpolated values that can facilitate explainable deep interpolation in accordance with one or more embodiments described herein. As shown, the system 1900 can, in various cases, comprise the same components as the system 1000, and can further comprise a set of interpolated values 1902.

In various embodiments, the interpolation component 120 can electronically generate the set of interpolated values 1902, based on the set of weight maps 1004 and the set of interpolation neighborhood windows 110. More specifically, the interpolation component 120 can linearly or non-linearly combine the interpolation neighbors indicated by the set of interpolation neighborhood windows 110 with the weight maps 1004, and the results of such combination can be considered as the set of interpolated values 1902. Various non-limiting aspects are described with respect to FIG. 20.

Figure 20:
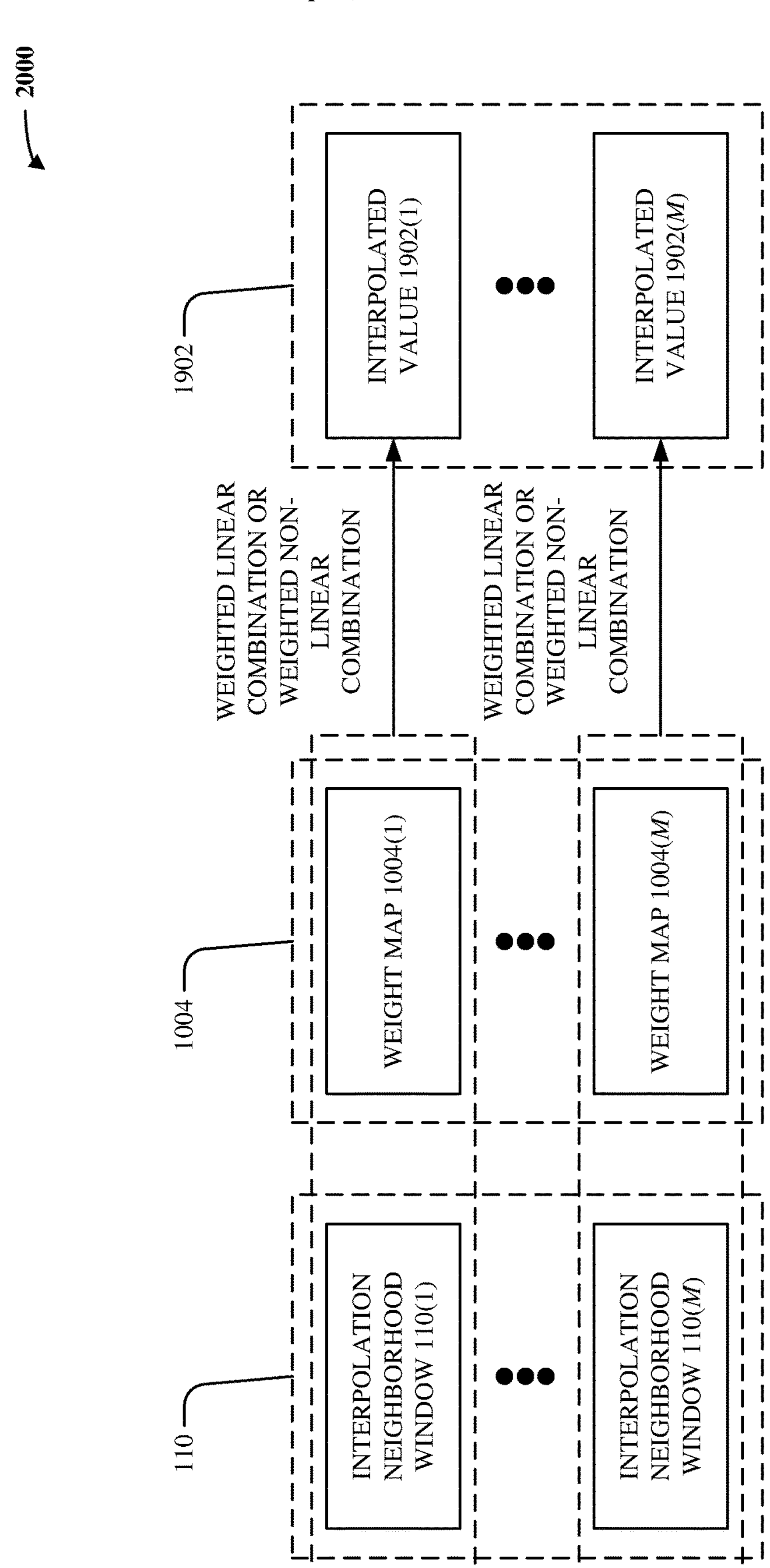
FIG. 20 illustrates an example, non-limiting block diagram showing how a set of interpolated values can be computed based on a set of interpolation neighborhood windows and a set of weight maps in accordance with one or more embodiments described herein.

FIG. 20 illustrates an example, non-limiting block diagram 2000 showing how the set of interpolated values 1902 can be computed based on the set of interpolation neighborhood windows 110 and the set of weight maps 1004 in accordance with one or more embodiments described herein.

In various aspects, as shown, the interpolation component 120 can generate, compute, or calculate the set of interpolated values 1902 by linearly or non-linearly combining the interpolation neighbors specified by the set of interpolation neighborhood windows 110 with the weight maps 1004.

For instance, consider the missing numerical element 108(1). As explained above, the interpolation neighbors of the missing numerical element 108(1) can be specified by the interpolation neighborhood window 110(1). As also explained above, the deep learning neural network 1002 can generate the weight map 1004(1), such that the weight map 1004(1) includes a unique weight for each interpolation neighbor specified by the interpolation neighborhood window 110(1). Accordingly, the interpolation component 120 can, in various aspects, created a weighted linear combination or a weighted non-linear combination of the interpolation neighbors specified by the interpolation neighborhood window 110(1), in accordance with the weight map 1004(1), and such weighted linear combination or such weighted non-linear combination can be considered as an interpolated value 1902(1). As a non-limiting example involving a linear combination, the interpolation component 120 can create a first product by multiplying the weight 1004(1)(1) by whichever of the set of available pixels 106 is located at the interpolation neighbor position 110(1)(1), the interpolation component 120 can create a $p_1$-th product by multiplying the weight 1004(1)($p_1$) by whichever of the set of available pixels 106 is located at the interpolation neighbor position 110(1)($p_1$), the interpolation component 120 can sum such $p_1$ products together, and such sum can be considered as the interpolated value 1902(1). In any case, the interpolated value 1902(1) can be considered as an estimated or approximated scalar value for the missing numerical element 108(1).

As another instance, consider the missing numerical element 108(*m*). As explained above, the interpolation neighbors of the missing numerical element 108(*m*) can be specified by the interpolation neighborhood window 110(*m*). As also explained above, the deep learning neural network 1002 can generate the weight map 1004(*m*), such that the weight map 1004(*m*) includes a unique weight for each interpolation neighbor specified by the interpolation neighborhood window 110(*m*). Accordingly, the interpolation component 120 can, in various aspects, created a weighted linear combination or a weighted non-linear combination of the interpolation neighbors specified by the interpolation neighborhood window 110(*m*), in accordance with the weight map 1004(*m*), and such weighted linear combination or such weighted non-linear combination can be considered as an interpolated value 1902(*m*). As a non-limiting example involving a linear combination, the interpolation component 120 can create a first product by multiplying the weight 1004($m$)(1) by whichever of the set of available pixels 106 is located at the interpolation neighbor position 110($m$)(1), the interpolation component 120 can create a $p_m$-th product by multiplying the weight 1004($m$)($p_m$) by whichever of the set of available pixels 106 is located at the interpolation neighbor position 110($m$)($p_m$), the interpolation component 120 can sum such $p_m$ products together, and such sum can be considered as the interpolated value 1902($m$). In any case, the interpolated value 1902($m$) can be considered as an estimated or approximated scalar value for the missing numerical element 108($m$).

In various aspects, the interpolated value 1902(1) to the interpolated value 1902($m$) can be collectively considered as the set of interpolated values 1902.

As a non-limiting example for purposes of further clarification, consider again FIG. 14. In various aspects, the interpolation component 120 can compute an interpolated value for the pixel (1,5) by: computing a first product by multiplying the weight $w(1,5)_{(1,3)}$ by the pixel (1,3); computing a second product by multiplying the weight $w(1,5)_{(2,3)}$ by the pixel (2,3); computing a third product by multiplying the weight $w(1,5)_{(3,3)}$ by the pixel (3,3); computing a fourth product by multiplying the weight $w(1,5)_{(1,4)}$ by the pixel (1,4); computing a fifth product by multiplying the weight $w(1,5)_{(2,4)}$ by the pixel (2,4); computing a sixth product by multiplying the weight $w(1,5)_{(3,4)}$ by the pixel (3,4); computing a seventh product by multiplying the weight $w(1,5)_{(1,9)}$ by the pixel (1,9); computing an eighth product by multiplying the weight $w(1,5)_{(2,9)}$ by the pixel (2,9); computing a ninth product by multiplying the weight $w(1,5)_{(3,9)}$ by the pixel (3,9); computing a tenth product by multiplying the weight $w(1,5)_{(1,10)}$ by the pixel (1,10); computing an eleventh product by multiplying the weight $w(1,5)_{(2,10)}$ by the pixel (2,10); computing a twelfth product by multiplying the weight $w(1,5)_{(3,10)}$ by the pixel (3,10); and summing such twelve products together. Such sum can be considered as the interpolated value of the pixel (1,5).

As another non-limiting example for purposes of further clarification, consider again FIG. 15. In various aspects, the interpolation component 120 can compute an interpolated value for the pixel (2,5) by: computing a first product by multiplying the weight $w(2,5)_{(1,3)}$ by the pixel (1,3); computing a second product by multiplying the weight $w(2,5)_{(2,3)}$ by the pixel (2,3); computing a third product by multiplying the weight $w(2,5)_{(3,3)}$ by the pixel (3,3); computing a fourth product by multiplying the weight $w(2,5)_{(1,4)}$ by the pixel (1,4); computing a fifth product by multiplying the weight $w(2,5)_{(2,4)}$ by the pixel (2,4); computing a sixth product by multiplying the weight $w(2,5)_{(3,4)}$ by the pixel (3,4); computing a seventh product by multiplying the weight $w(2,5)_{(1,9)}$ by the pixel (1,9); computing an eighth product by multiplying the weight $w(2,5)_{(2,9)}$ by the pixel (2,9); computing a ninth product by multiplying the weight $w(2,5)_{(3,9)}$ by the pixel (3,9); computing a tenth product by multiplying the weight $w(2,5)_{(1,10)}$ by the pixel (1,10); computing an eleventh product by multiplying the weight $w(2,5)_{(2,10)}$ by the pixel (2,10); computing a twelfth product by multiplying the weight $w(2,5)_{(3,10)}$ by the pixel (3,10); and summing such twelve products together. Such sum can be considered as the interpolated value of the pixel (2,5).

As another non-limiting example for purposes of further clarification, consider again FIG. 16. In various aspects, the interpolation component 120 can compute an interpolated value for the pixel (3,5) by: computing a first product by multiplying the weight $w(3,5)_{(2,3)}$ by the pixel (2,3); computing a second product by multiplying the weight $w(3,5)_{(3,3)}$ by the pixel (3,3); computing a third product by multiplying the weight $w(3,5)_{(4,3)}$ by the pixel (4,3); computing a fourth product by multiplying the weight $w(3,5)_{(2,4)}$ by the pixel (2,4); computing a fifth product by multiplying the weight $w(3,5)_{(3,4)}$ by the pixel (3,4); computing a sixth product by multiplying the weight $w(3,5)_{(4,4)}$ by the pixel (4,4); computing a seventh product by multiplying the weight $w(3,5)_{(2,9)}$ by the pixel (2,9); computing an eighth product by multiplying the weight $w(3,5)_{(3,9)}$ by the pixel (3,9); computing a ninth product by multiplying the weight $w(3,5)_{(4,9)}$ by the pixel (4,9); computing a tenth product by multiplying the weight $w(3,5)_{(2,10)}$ by the pixel (2,10); computing an eleventh product by multiplying the weight $w(3,5)_{(3,10)}$ by the pixel (3,10); computing a twelfth product by multiplying the weight $w(3,5)_{(4,10)}$ by the pixel (4,10); and summing such twelve products together. Such sum can be considered as the interpolated value of the pixel (3,5).

As yet another non-limiting example for purposes of further clarification, consider again FIG. 17. In various aspects, the interpolation component 120 can compute an interpolated value for the pixel (4,5) by: computing a first product by multiplying the weight $w(4,5)_{(3,3)}$ by the pixel (3,3); computing a second product by multiplying the weight $w(4,5)_{(4,3)}$ by the pixel (4,3); computing a third product by multiplying the weight $w(4,5)_{(5,3)}$ by the pixel (5,3); computing a fourth product by multiplying the weight $w(4,5)_{(3,4)}$ by the pixel (3,4); computing a fifth product by multiplying the weight $w(4,5)_{(4,4)}$ by the pixel (4,4); computing a sixth product by multiplying the weight $w(4,5)_{(5,4)}$ by the pixel (5,4); computing a seventh product by multiplying the weight $w(4,5)_{(3,9)}$ by the pixel (3,9); computing an eighth product by multiplying the weight $w(4,5)_{(4,9)}$ by the pixel (4,9); computing a ninth product by multiplying the weight $w(4,5)_{(5,9)}$ by the pixel (5,9); computing a tenth product by multiplying the weight $w(4,5)_{(3,10)}$ by the pixel (3,10); computing an eleventh product by multiplying the weight $w(4,5)_{(4,10)}$ by the pixel (4,10); computing a twelfth product by multiplying the weight $w(4,5)_{(5,10)}$ by the pixel (5,10); and summing such twelve products together. Such sum can be considered as the interpolated value of the pixel (4,5).

As still another non-limiting example for purposes of further clarification, consider again FIG. 18. In various aspects, the interpolation component 120 can compute an interpolated value for the pixel (5,5) by: computing a first product by multiplying the weight $w(5,5)_{(3,3)}$ by the pixel (3,3); computing a second product by multiplying the weight $w(5,5)_{(4,3)}$ by the pixel (4,3); computing a third product by multiplying the weight $w(5,5)_{(5,3)}$ by the pixel (5,3); computing a fourth product by multiplying the weight $w(5,5)_{(3,4)}$ by the pixel (3,4); computing a fifth product by multiplying the weight $w(5,5)_{(4,4)}$ by the pixel (4,4); computing a sixth product by multiplying the weight $w(5,5)_{(5,4)}$ by the pixel (5,4); computing a seventh product by multiplying the weight $w(5,5)_{(3,9)}$ by the pixel (3,9); computing an eighth product by multiplying the weight $w(5,5)_{(4,9)}$ by the pixel (4,9); computing a ninth product by multiplying the weight $w(5,5)_{(5,9)}$ by the pixel (5,9); computing a tenth product by multiplying the weight $w(5,5)_{(3,10)}$ by the pixel (3,10); computing an eleventh product by multiplying the weight $w(5,5)_{(4,10)}$ by the pixel (4,10); computing a twelfth product by multiplying the weight $w(5,5)_{(5,10)}$ by the pixel (5,10); and summing such twelve products together. Such sum can be considered as the interpolated value of the pixel (5,5).

In any case, the interpolation component 120 can generate the set of interpolated values 1902 by linearly or non-linearly combining the set of weight maps 1004 with the interpolation neighbors indicated by the set of interpolation neighborhood windows 110.

To help ensure that the set of weight maps 1004 are accurate, the deep learning neural network 1002 can first undergo training. Non-limiting example aspects of such training are described with respect to FIGS. 21-23.

Figure 21:
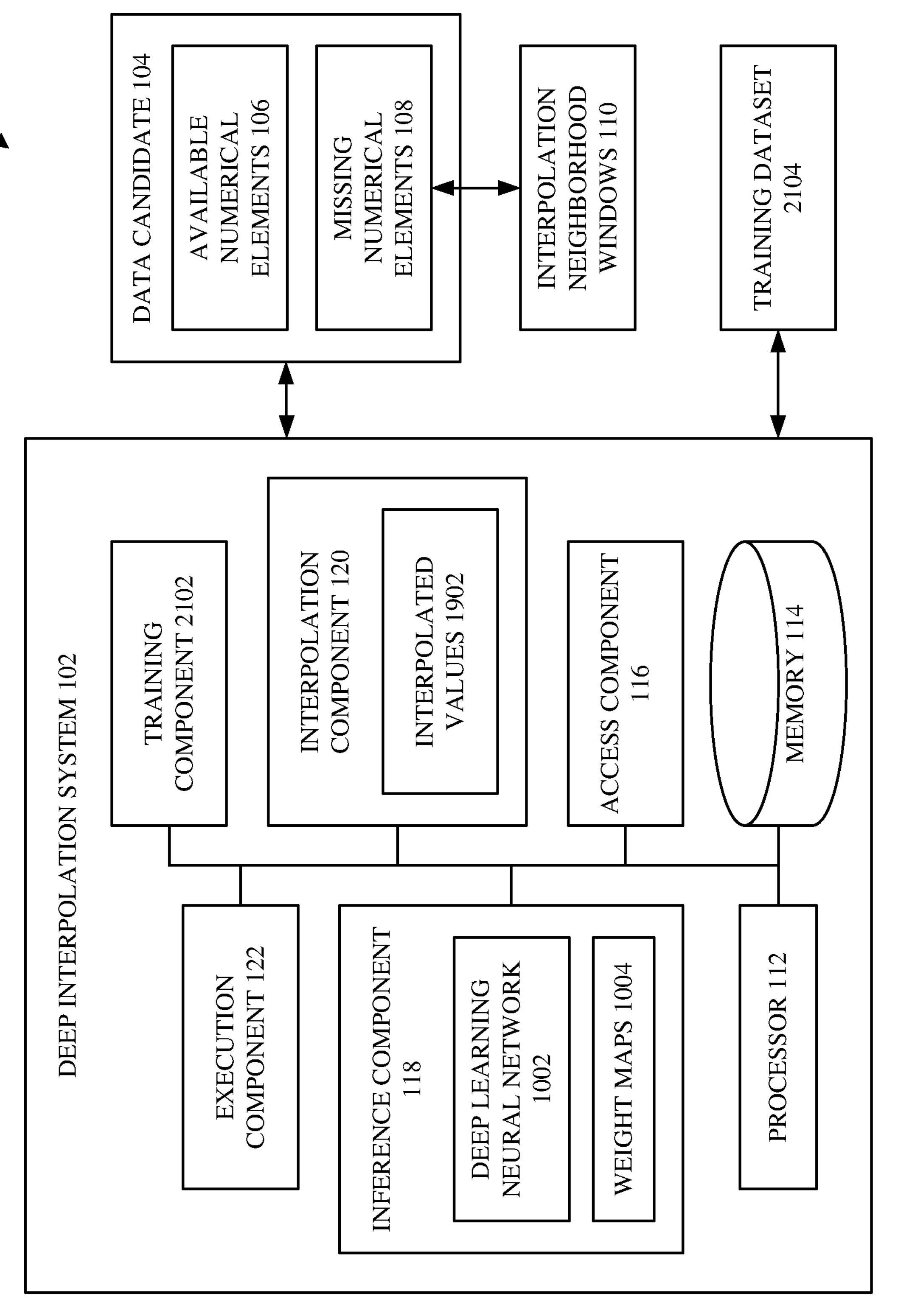
FIG. 21 illustrates a block diagram of an example, non-limiting system including a training component and a training dataset that facilitates explainable deep interpolation in accordance with one or more embodiments described herein.

FIG. 21 illustrates a block diagram 2100 of an example, non-limiting system 2100 including a training component and a training dataset that can facilitate explainable deep interpolation in accordance with one or more embodiments described herein. As shown, the system 2100 can, in some cases, comprise the same components as the system 1900, and can further comprise a training component 2102 or a training dataset 2104.

In various embodiments, the access component 116 can electronically receive, retrieve, obtain, or otherwise access, from any suitable source, the training dataset 2104. In various aspects, the training component 2102 can train the deep learning neural network 1002 based on the training dataset 2104. In some cases, the training dataset 2104 can be annotated, and so the training component 2102 can perform supervised training on the deep learning neural network 1002, as described with respect to FIGS. 22-23.

Figure 22:
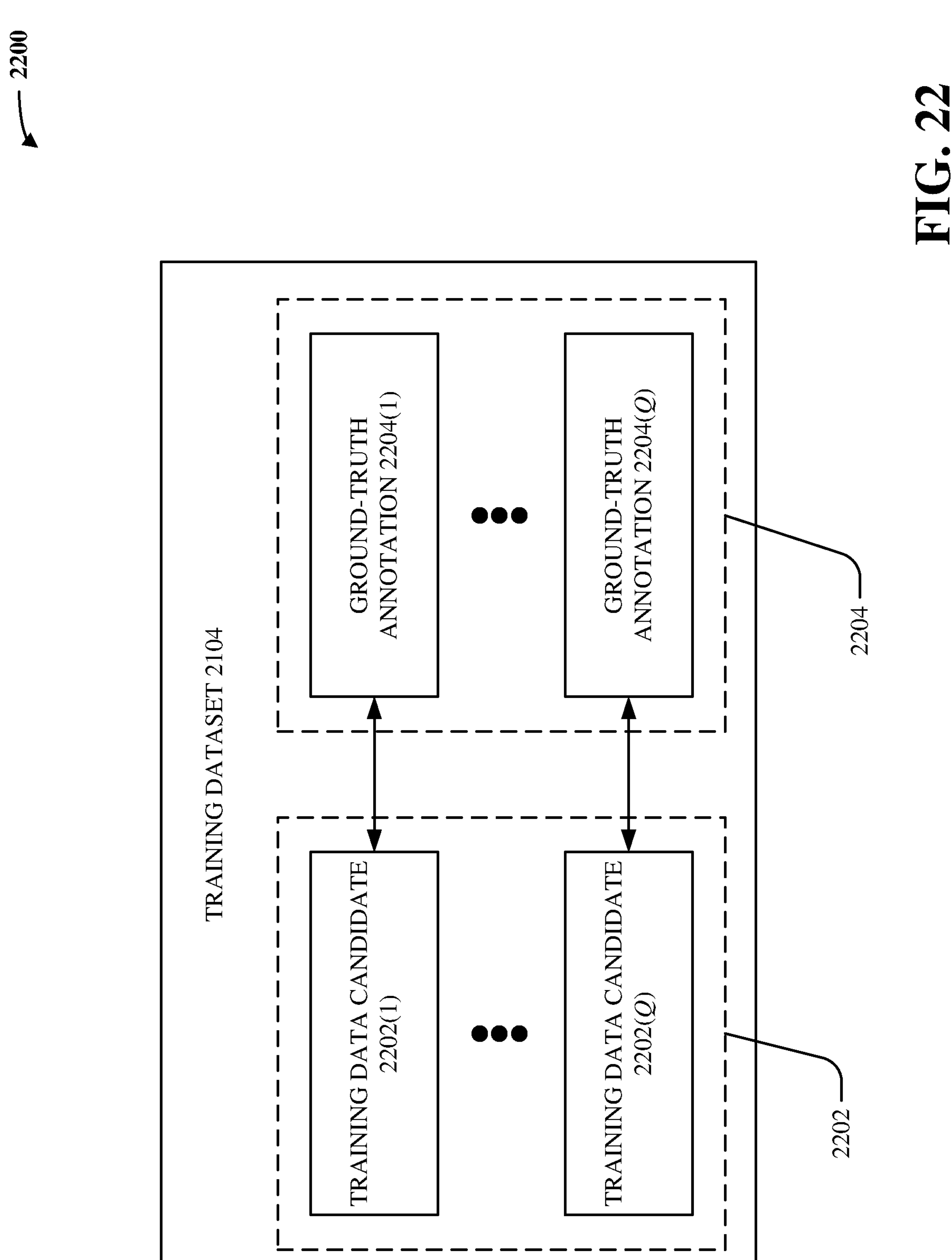
FIG. 22 illustrates an example, non-limiting block diagram of a training dataset in accordance with one or more embodiments described herein.

FIG. 22 illustrates an example, non-limiting block diagram 2200 of the training dataset 2104 in accordance with one or more embodiments described herein. As shown, the training dataset 2104 can, in various aspects, comprise a set of training data candidates 2202. In various instances, the set of training data candidates 2202 can comprise q training data candidates for any suitable positive integer q: a training data candidate 2202(1) to a training data candidate 2202($q$). In various cases, a training data candidate can be any suitable electronic data having the same format, size, or dimensionality as the data candidate 104. In other words, because the data candidate 104 can have n available numerical elements and m missing numerical elements, each of the set of training data candidates 2202 can likewise have n available numerical elements and m missing numerical elements. Furthermore, the available numerical elements and the missing numerical elements of any given training data candidate can have the same relative intra-data-candidate positions (e.g., can have the same row-column indices) as those of the data candidate 104. That is, if the data candidate 104 has a missing numerical element in row i and column j for any suitable positive integers i and j, then each of the set of training data candidates 2202 can likewise have a missing numerical element in row i and column j. Further still, the missing numerical elements of any given training data candidate can respectively correspond to the set of interpolation neighborhood windows 110, just like the set of missing numerical elements 108. For example, just as the interpolation neighborhood window 110(1) can correspond to the missing numerical element 108(1), the interpolation neighborhood window 110(1) can correspond to the first missing numerical element in each of the set of training data candidates 2202. Thus, for any given training data candidate, the interpolation neighborhood window 110(1) can be considered as indicating the $p_1$ available numerical elements of such given training data candidate that constitute interpolation neighbors of the first missing numerical element of such given training data candidate. As another example, just as the interpolation neighborhood window 110($m$) can correspond to the missing numerical element 108($m$), the interpolation neighborhood window 110($m$) can correspond to the m-th missing numerical element in each of the set of training data candidates 2202. Thus, for any given training data candidate, the interpolation neighborhood window 110($m$) can be considered as indicating the $p_m$ available numerical elements of such given training data candidate that constitute interpolation neighbors of the m-th missing numerical element of such given training data candidate.

As shown, the training dataset 2104 can, in various aspects, further comprise a set of ground-truth annotations 2204. In various aspects, the set of ground-truth annotations 2204 can respectively correspond to the set of training data candidates 2202. Thus, since the set of training data candidates 2202 can have q training data candidates, the set of ground-truth annotations 2204 can have q annotations: a ground-truth annotation 2204(1) to a ground-truth annotation 2204($q$). In various instances, each of the set of ground-truth annotations 2204 can be any suitable electronic data that represents correct or accurate values that are known or deemed to correspond to missing numerical elements of a respective one of the set of training data candidates 2202. As an example, the ground-truth annotation 2204(1) can correspond to the training data candidate 2202(1). Accordingly, the ground-truth annotation 2204(1) can be considered as indicating, conveying, or otherwise representing the m correct or accurate values that are known or deemed to correspond to the m missing numerical elements of the training data candidate 2202(1). As another example, the ground-truth annotation 2204($q$) can correspond to the training data candidate 2202($q$). Thus, the ground-truth annotation 2204($q$) can be considered as indicating, conveying, or otherwise representing the m correct or accurate values that are known or deemed to correspond to the m missing numerical elements of the training data candidate 2202($q$).

Figure 23:
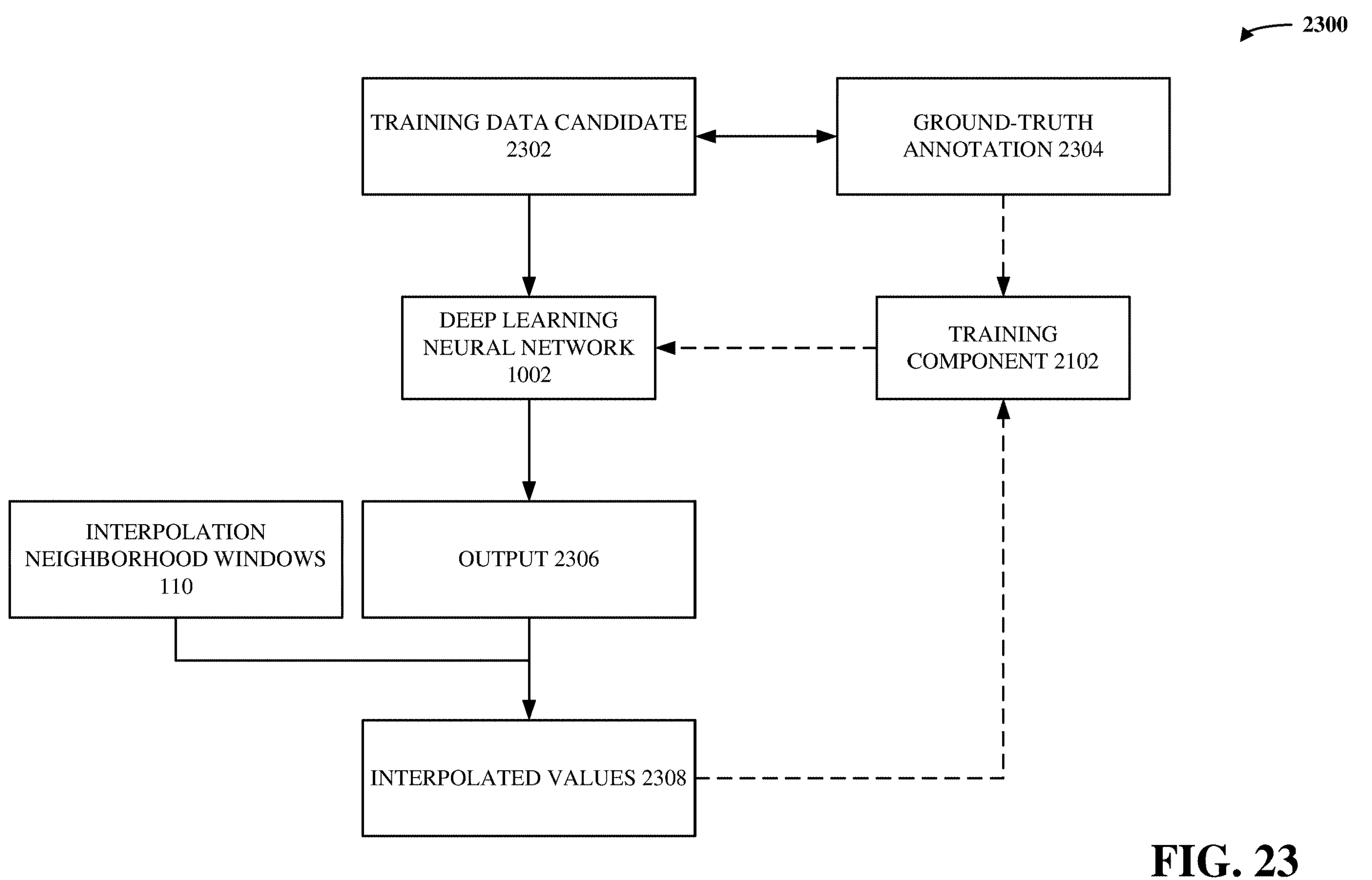
FIG. 23 illustrates an example, non-limiting block diagram showing how a deep learning neural network can be trained in accordance with one or more embodiments described herein.

Now, consider FIG. 23. As shown, FIG. 23 illustrates an example, non-limiting block diagram 2300 showing how the deep learning neural network 1002 can be trained on the training dataset 2104 in accordance with one or more embodiments described herein.

In various aspects, the training component 2102 can, prior to beginning training, initialize in any suitable fashion (e.g., random initialization) the trainable internal parameters of (e.g., convolutional kernels, weight matrices, bias values) of the deep learning neural network 1002.

In various instances, the training component 2102 can select from the training dataset 2104 a training data candidate 2302 and a ground-truth annotation 2304 that corresponds to the training data candidate 2302. In various cases, as shown, the training component 2102 can execute the deep learning neural network 1002 on the training data candidate 2302, thereby causing the deep learning neural network 1002 to produce an output 2306. More specifically, the training component 2102 can feed the training data candidate 2302 to an input layer of the deep learning neural network 1002, the training data candidate 2302 can complete a forward pass through one or more hidden layers of the deep learning neural network 1002, and an output layer of the deep learning neural network 1002 can compute the output 2306 based on activation maps generated by the one or more hidden layers.

Note that, as mentioned above, the dimensionality of the output 2306 can be controlled or otherwise determined by the number or neurons in the output layer of the deep learning neural network 1002 (e.g., a desired dimensionality of the output 2306 can be achieved by adding neurons to or removing neurons from the output layer of the deep learning neural network 1002).

In various aspects, the output 2306 can be considered as the m predicted or inferred weight maps which the deep learning neural network 1002 believes should respectively correspond to the m missing numerical elements in the training data candidate 2302.

As mentioned above, the set of interpolation neighborhood windows 110 can indicate or otherwise identify the various interpolation neighbors of the m missing numerical elements of the training data candidate 2302. Accordingly, in various instances, the training component 2102 can generate a set of interpolated values 2308 by linearly or non-linearly combining such interpolation neighbors with the output 2306 (e.g., with the predicted or inferred weight maps). In various cases, the set of interpolated values 2308 can be considered as indicating the inferred or predicted interpolation results for the m missing numerical elements of the training data candidate 2302. In stark contrast, the ground-truth annotation 2304 can be considered as indicating the correct or accurate values that are known or deemed to correspond to the m missing numerical elements of the training data candidate 2302. Accordingly, the training component 2102 can compute one or more errors or losses (e.g., MAE, MSE, cross-entropy) between the set of interpolated values 2308 and the ground-truth annotation 2304. In various instances, the training component 2102 can incrementally update, via backpropagation, the trainable internal parameters of the deep learning neural network 1002, based on such computed errors or losses.

In various cases, the training component 2102 can repeat such execution and update procedure for each training data candidate in the training dataset 2104. This can ultimately cause the trainable internal parameters of the deep learning neural network 1002 to become iteratively optimized for accurately generating weight maps for missing numerical elements of inputted data candidates. In various aspects, the training component 2102 can implement any suitable training batch sizes, any suitable training termination criteria, or any suitable error/loss functions.

In various embodiments, the execution component 122 can electronically perform, initiate, or otherwise facilitate any suitable electronic actions based on the set of interpolated values 1902 or the set of weight maps 1004.

As a non-limiting example, the execution component 122 can, in various aspects, electronically transmit any of the set of interpolated values 1902 or any of the set of weight maps 1004 to any suitable computing device (not shown).

As another non-limiting example, the execution component 122 can, in various instances, electronically render any of the set of interpolated values 1902 or any of the set of weight maps 1004 on any suitable computer screen, compute display, compute monitor, or graphical user-interface (not shown).

As even another non-limiting example, the execution component 122 can electronically store, electronically maintain, electronically control, or otherwise electronically access any suitable machine learning model, where such machine learning model can be configured to receive as input one or more of the set of weight maps 1004 and to produce as output an uncertainty score. In such case, the uncertainty score can be considered as indicating how reliable or how unreliable the set of interpolated values 1902 is. Furthermore, in such case, such machine learning model can be trained in supervised fashion (e.g., similar to as described above) or in any other suitable fashion as desired (e.g., via unsupervised training, via reinforcement learning).

Figure 24:
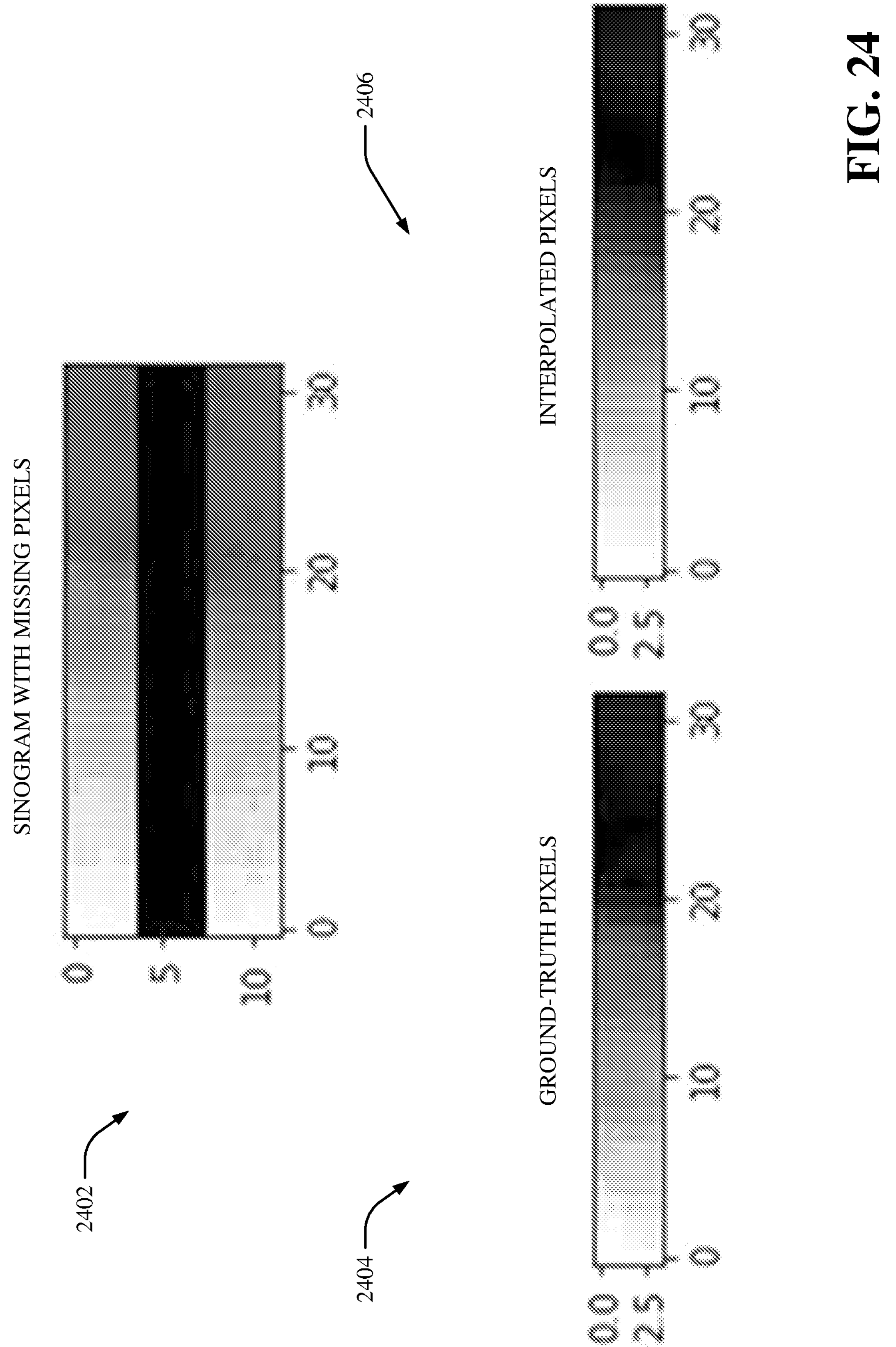
FIGS. 24-25 illustrate some example, non-limiting experimental results in accordance with one or more embodiments described herein.
Figure 25:
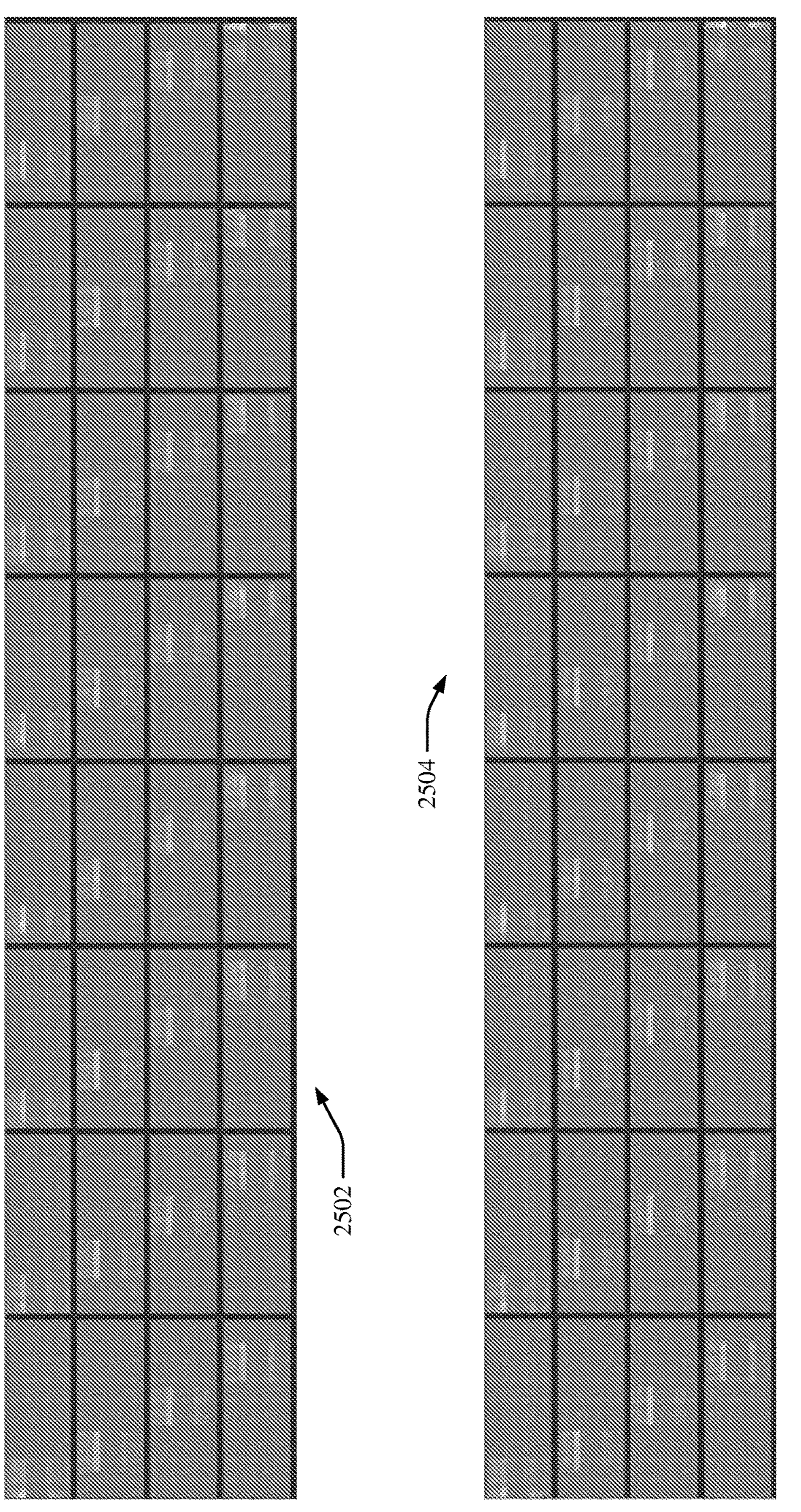

FIGS. 24-25 illustrate some example, non-limiting experimental results in accordance with one or more embodiments described herein.

In particular, the present inventors reduced to practice an example, non-limiting embodiment described herein. Such embodiment was configured to operate on sinograms. More specifically, such embodiment was configured to operate on a sinogram made up of twelve rows and thirty-two columns of pixels, where all pixels in rows 5-8 are missing, and where all remaining pixels are available. Accordingly, such a sinogram can be considered as having 128 missing pixels (e.g., 4 multiplied by 32) and 256 available pixels (e.g., 8 multiplied by 32). Moreover, each missing pixel was deemed to have an interpolation neighborhood window specifying rows 1-4 and rows 9-12 and specifying whichever eight columns were approximately centered about the missing pixel. Note that missing pixels in columns 1, 2, or 3 had the same interpolation neighborhood windows as any missing pixel in column 4. Symmetrically, note that missing pixels in columns 10, 11, or 12 had the same interpolation neighborhood windows as any missing pixel in column 9.

FIG. 24 illustrates a sinogram 2402 having 128 missing pixels as described above. Indeed, as can be seen, the middle portion (e.g., rows 5-8) of the sinogram 2402 are blank. FIG. 24 also illustrates a sinogram fragment 2404, where the sinogram fragment 2404 can be considered as indicating the 128 ground-truth values that are known or deemed to correctly or accurately fill in the 128 missing pixels of the sinogram 2402. In various aspects, the non-limiting embodiment that was reduced to practice was implemented on the sinogram 2402, thereby yielding an interpolated sinogram fragment 2406. In various aspects, the interpolated sinogram fragment 2406 can be considered as the 128 values that were indirectly predicted or inferred, by the non-limiting embodiment that was reduced to practice, to fill in the 128 missing pixels of the sinogram 2402. As can be seen, the interpolated sinogram fragment 2406 closely matches the sinogram fragment 2404. In other words, the non-limiting embodiment that was reduced to practice demonstrated high performance/accuracy.

Now, consider FIG. 25. FIG. 25 illustrates some of the various weight maps that were generated by the non-limiting embodiment that was reduced to practice, when such embodiment was implemented on the sinogram 2402. In particular, such embodiment generated one unique weight map for each of the 128 missing pixels of the sinogram 2402. Numeral 2502 shows the thirty-two weight maps (in order from left to right and top to bottom) that were generated for the thirty-two missing pixels in row 5 of the sinogram 2402. Similarly, numeral 2504 shows the thirty-two weight maps (in order from left to right and top to bottom) that were generated for the thirty-two missing pixels in row 8 of the sinogram 2402. Darker/grayer colors in FIG. 25 can be considered as indicating weights that are low (e.g., near zero). In contrast, lighter/whiter colors in FIG. 25 can be considered as indicating weights that are high (e.g., farther from zero). Accordingly, the weight maps illustrated in FIG. 25 can be considered as visually conveying which interpolation neighbors of any given missing pixel contributed more or contributed less to that given missing pixel's interpolated value (e.g., the interpolation neighbors corresponding to the lighter/whiter colors can be considered as having contributed more than the interpolation neighbors corresponding to darker/grayer colors). Such weight maps can allow technicians, operators, or other subject matter experts to judge the reliability of the interpolated values in situations where ground-truths are not available (e.g., if the weight maps indicate that unexpected interpolation neighbors are heavily influencing the interpolation results, such interpolation results can be regarded as unreliable). Such understandability/interpretability is not possible with existing deep interpolation techniques, because such existing deep interpolation techniques directly estimate missing pixels rather than estimating the herein-described weight maps for missing pixels. In other words, various embodiments described herein can facilitate deep interpolation with heightened transparency/explainability, as compared to existing deep interpolation techniques. Such embodiments certainly qualify as a technical improvement or otherwise as a useful and practical application of computers.

Although the herein disclosure mainly describes various embodiments of the execution component 122 as visually rendering any of the set of weight maps 1004 on any suitable electronic display, this is a mere non-limiting example for ease of explanation. Indeed, in some cases, the execution component 122 can, for any given one of the set of missing numerical elements 108, visually render whichever of the set of weight maps 1004 corresponds to such given missing numerical element. Such visualization can be considered as visually conveying how each of the interpolation neighbors of the given missing numerical element contribute to or otherwise influence the interpolated value of the given missing numerical element. However, in other cases, the execution component 122 can, for any given one of the set of available numerical elements 106 that is an interpolation neighbor for one or more of the set of missing numerical elements 108, visually render the weights (e.g., the scalar coefficients) that correspond to that given available numerical element. For example, suppose that a particular available numerical element is considered, according to the set of interpolation neighborhood windows 110, to be an interpolation neighbor for v unique missing numerical elements for any suitable positive integer v≤m. In such case, there can be v unique weight maps that respectively correspond to those v unique missing numerical elements, and each of such v unique weight maps can include one scalar coefficient that corresponds to the particular available numerical element. In other words, there can be a total of v unique scalar coefficients that respectively indicate how the particular available numerical element contributes to or otherwise influences the interpolated values of each of the v missing numerical elements. In various aspects, the execution component 122 can visually render such v unique scalar coefficients. Such visualization can be considered as visually conveying how the particular available numerical element affects the interpolated values of each of the v missing numerical elements for which the particular available numerical element is considered to be an interpolation neighbor.

FIG. 26 illustrates a flow diagram of an example, non-limiting computer-implemented method 2600 that can facilitate explainable deep interpolation in accordance with one or more embodiments described herein. In various cases, the deep interpolation system 102 can facilitate the computer-implemented method 2600.

In various embodiments, act 2602 can include accessing, by a device (e.g., via 116) operatively coupled to a processor, a data candidate (e.g., 104), wherein a set of numerical elements (e.g., 108) of the data candidate are missing.

In various aspects, act 2604 can include generating, by the device (e.g., via 118) and via execution of a deep learning neural network (e.g., 1002) on the data candidate, a set of weight maps (e.g., 1004) for the set of missing numerical elements.

In various instances, act 2606 can include computing, by the device (e.g., via 120), the set of missing numerical elements by respectively combining, according to the set of weight maps, available interpolation neighbors (e.g., as defined by 110) of the set of missing numerical elements.

Although not explicitly shown in FIG. 26, the set of missing numerical elements can be computed as respective linear combinations or as respective non-linear combination of the available interpolation neighbors weighted by the set of weight maps.

Although not explicitly shown in FIG. 26, the computer-implemented method 2600 can comprise: visually rendering, by the device (e.g., via 122), a first weight map of the set of weight maps that corresponds to a first missing numerical element of the set of missing numerical elements (e.g., which shows how the interpolated value of the first missing numerical element is influenced by the various interpolation neighbors of the first missing numerical element); or visually rendering, by the device (e.g., via 122), a plurality of weights specified in the set of weight maps that correspond to a first available interpolation neighbor of the available interpolation neighbors (e.g., which shows how the first interpolation neighbor influences the interpolated values of the various missing numerical elements to which the first interpolation neighbor corresponds).

Although not explicitly shown in FIG. 26, the computer-implemented method 2600 can comprise: accessing, by the device (e.g., via 116), a training dataset (e.g., 2104); and training, by the device (e.g., via 2102), the deep learning neural network to generate weight maps, based on the training dataset (e.g., as explained with respect to FIGS. 21-23).

Although not explicitly shown in FIG. 26, the data candidate can be a pixel array or a voxel array, and the set of missing numerical elements can be a set of missing pixels or a set of missing voxels.

Although not explicitly shown in FIG. 26, the data candidate can be a timeseries, and the set of missing numerical elements can be a set of missing time-indexed data points of the timeseries.

Although the herein disclosure mainly describes various embodiments as applying to a deep learning neural network (e.g., 1002), this is a mere non-limiting example. In various aspects, the herein-described teachings can be applied to any suitable machine learning models exhibiting any suitable artificial intelligence architectures (e.g., support vector machines, naïve Bayes, linear regression, logistic regression, decision trees, random forest).

Although the herein disclosure mainly describes various embodiments of the deep learning neural network 1002 as receiving the data candidate 104 as input, this is a mere non-limiting example for ease of explanation. In various aspects, the deep learning neural network 1002 can receive as input any other suitable electronic data in combination with the data candidate 104. As a non-limiting example, there can be any suitable number of gradient maps associated with the data candidate 104, and the deep learning neural network 1002 can be configured to receive as input both the data candidate 104 and such gradient maps (e.g., in such case, each training data candidate in the training dataset 2104 can likewise be associated with any suitable number of respective gradient maps).

Note that, in various embodiments and as mentioned above, the data candidate 104 can be an image that has missing pixels. In such case, the deep interpolation system 102 can be considered as performing explainable deep interpolation so as to facilitate image inpainting (e.g., so as to infer missing portions of a given image). In various aspects, such image inpainting can be highly useful in a medical or clinical context. For example, suppose that the deep interpolation system 102 is trained to generate neighbor-based weight maps for missing pixels in X-ray images of medical patients. In such case, such missing pixels can be interpolated by the deep interpolation system 102, without having to perform follow-up X-ray scans on the medical patients. In other words, the deep interpolation system 102 can, in such context, be considered as obtaining the missing X-ray pixels without exposing the medical patients to unnecessary radiation. This is a concrete, practical, and real-world application of deep interpolation. Furthermore, various embodiments described herein can be implemented to perform such image inpainting for any suitable types of medical images (e.g., for X-ray images, for magnetic resonance imaging (MRI) images, for ultrasound images, for positron emission tomography (PET) images).

In various instances, machine learning algorithms or models can be implemented in any suitable way to facilitate any suitable aspects described herein. To facilitate some of the above-described machine learning aspects of various embodiments, consider the following discussion of artificial intelligence (AI). Various embodiments described herein can employ artificial intelligence to facilitate automating one or more features or functionalities. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system or environment from a set of observations as captured via events or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events or data.

Such determinations can result in the construction of new events or actions from a set of observed events or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes or systems (e.g., support vector machines, neural networks, expert systems, Bayesian belief networks, fuzzy logic, data fusion engines, and so on) in connection with performing automatic or determined action in connection with the claimed subject matter. Thus, classification schemes or systems can be used to automatically learn and perform a number of functions, actions, or determinations.

A classifier can map an input attribute vector, $z=(z_1, z_2, z_3, z_4, z_n)$, to a confidence that the input belongs to a class, as by f(z)=confidence(class). Such classification can employ a probabilistic or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, or probabilistic classification models providing different patterns of independence, any of which can be employed. Classification as used herein also is inclusive of statistical regression that is utilized to develop models of priority.

The herein disclosure describes non-limiting examples. For ease of description or explanation, various portions of the herein disclosure utilize the term "each," "every," or "all" when discussing various examples. Such usages of the term "each," "every," or "all" are non-limiting. In other words, when the herein disclosure provides a description that is applied to "each," "every," or "all" of some particular object or component, it should be understood that this is a non-limiting example, and it should be further understood that, in various other examples, it can be the case that such description applies to fewer than "each," "every," or "all" of that particular object or component.

Figure 27:
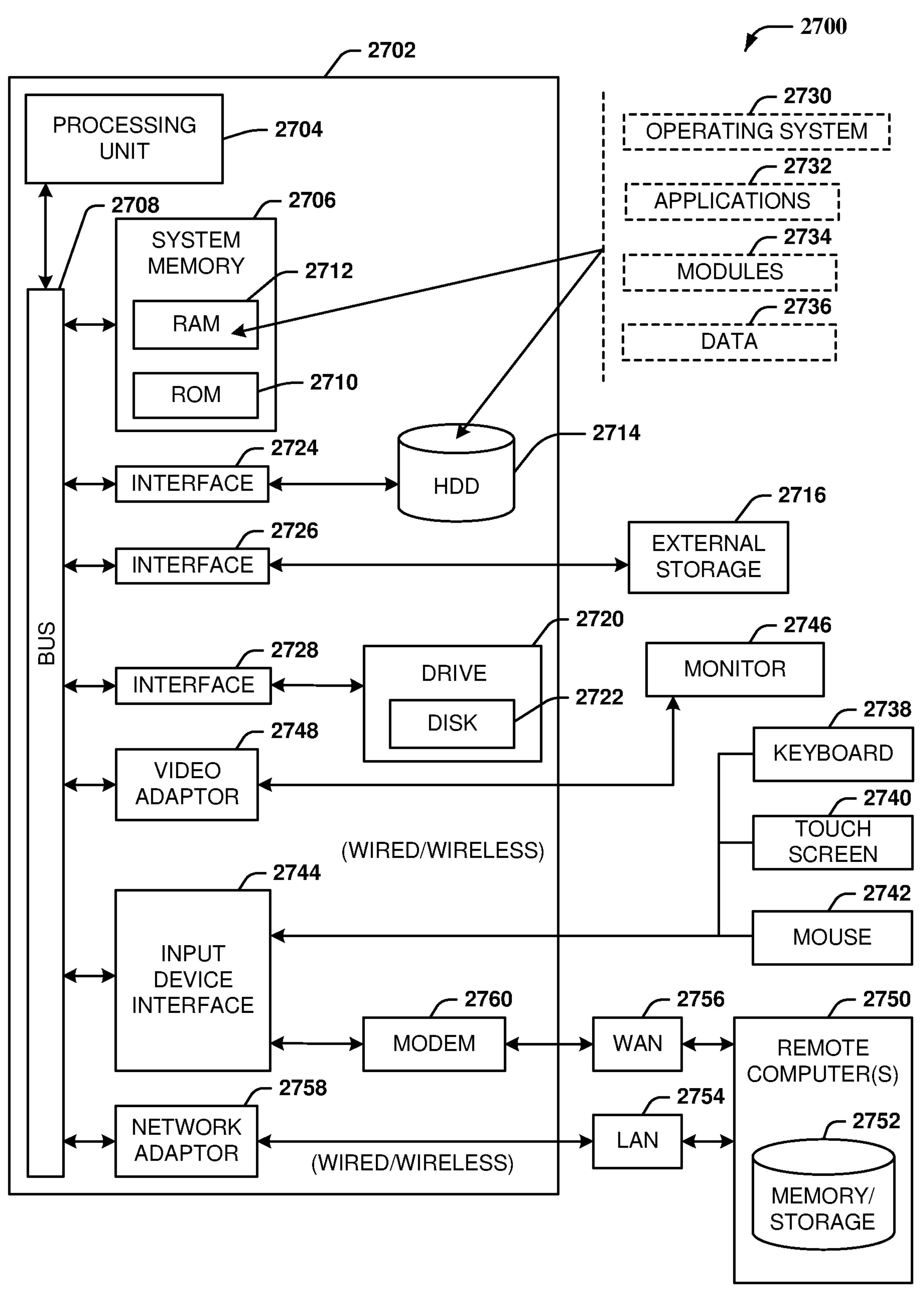
FIG. 27 illustrates a block diagram of an example, non-limiting operating environment in which one or more embodiments described herein can be facilitated.

In order to provide additional context for various embodiments described herein, FIG. 27 and the following discussion are intended to provide a brief, general description of a suitable computing environment 2700 in which the various embodiments of the embodiment described herein can be implemented. While the embodiments have been described above in the general context of computer-executable instructions that can run on one or more computers, those skilled in the art will recognize that the embodiments can be also implemented in combination with other program modules or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 27, the example environment 2700 for implementing various embodiments of the aspects described herein includes a computer 2702, the computer 2702 including a processing unit 2704, a system memory 2706 and a system bus 2708. The system bus 2708 couples system components including, but not limited to, the system memory 2706 to the processing unit 2704. The processing unit 2704 can be any of various commercially available processors. Dual microprocessors and other multi-processor architectures can also be employed as the processing unit 2704.

The system bus 2708 can be any of several types of bus structure that can further interconnect to a memory bus (with or without a memory controller), a peripheral bus, and a local bus using any of a variety of commercially available bus architectures. The system memory 2706 includes ROM 2710 and RAM 2712. A basic input/output system (BIOS) can be stored in a non-volatile memory such as ROM, erasable programmable read only memory (EPROM), EEPROM, which BIOS contains the basic routines that help to transfer information between elements within the computer 2702, such as during startup. The RAM 2712 can also include a high-speed RAM such as static RAM for caching data.

The computer 2702 further includes an internal hard disk drive (HDD) 2714 (e.g., EIDE, SATA), one or more external storage devices 2716 (e.g., a magnetic floppy disk drive (FDD) 2716, a memory stick or flash drive reader, a memory card reader, etc.) and a drive 2720, e.g., such as a solid state drive, an optical disk drive, which can read or write from a disk 2722, such as a CD-ROM disc, a DVD, a BD, etc. Alternatively, where a solid state drive is involved, disk 2722 would not be included, unless separate. While the internal HDD 2714 is illustrated as located within the computer 2702, the internal HDD 2714 can also be configured for external use in a suitable chassis (not shown). Additionally, while not shown in environment 2700, a solid state drive (SSD) could be used in addition to, or in place of, an HDD 2714. The HDD 2714, external storage device(s) 2716 and drive 2720 can be connected to the system bus 2708 by an HDD interface 2724, an external storage interface 2726 and a drive interface 2728, respectively. The interface 2724 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2702, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2712, including an operating system 2730, one or more application programs 2732, other program modules 2734 and program data 2736. All or portions of the operating system, applications, modules, or data can also be cached in the RAM 2712. The systems and methods described herein can be implemented utilizing various commercially available operating systems or combinations of operating systems.

Computer 2702 can optionally comprise emulation technologies. For example, a hypervisor (not shown) or other intermediary can emulate a hardware environment for operating system 2730, and the emulated hardware can optionally be different from the hardware illustrated in FIG. 27. In such an embodiment, operating system 2730 can comprise one virtual machine (VM) of multiple VMs hosted at computer 2702. Furthermore, operating system 2730 can provide runtime environments, such as the Java runtime environment or the .NET framework, for applications 2732. Runtime environments are consistent execution environments that allow applications 2732 to run on any operating system that includes the runtime environment. Similarly, operating system 2730 can support containers, and applications 2732 can be in the form of containers, which are lightweight, standalone, executable packages of software that include, e.g., code, runtime, system tools, system libraries and settings for an application.

Further, computer 2702 can be enable with a security module, such as a trusted processing module (TPM). For instance with a TPM, boot components hash next in time boot components, and wait for a match of results to secured values, before loading a next boot component. This process can take place at any layer in the code execution stack of computer 2702, e.g., applied at the application execution level or at the operating system (OS) kernel level, thereby enabling security at any level of code execution.

A user can enter commands and information into the computer 2702 through one or more wired/wireless input devices, e.g., a keyboard 2738, a touch screen 2740, and a pointing device, such as a mouse 2742. Other input devices (not shown) can include a microphone, an infrared (IR) remote control, a radio frequency (RF) remote control, or other remote control, a joystick, a virtual reality controller or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2704 through an input device interface 2744 that can be coupled to the system bus 2708, but can be connected by other interfaces, such as a parallel port, an IEEE 1394 serial port, a game port, a USB port, an IR interface, a BLUETOOTH® interface, etc.

A monitor 2746 or other type of display device can be also connected to the system bus 2708 via an interface, such as a video adapter 2748. In addition to the monitor 2746, a computer typically includes other peripheral output devices (not shown), such as speakers, printers, etc.

The computer 2702 can operate in a networked environment using logical connections via wired or wireless communications to one or more remote computers, such as a remote computer(s) 2750. The remote computer(s) 2750 can be a workstation, a server computer, a router, a personal computer, portable computer, microprocessor-based entertainment appliance, a peer device or other common network node, and typically includes many or all of the elements described relative to the computer 2702, although, for purposes of brevity, only a memory/storage device 2752 is illustrated. The logical connections depicted include wired/wireless connectivity to a local area network (LAN) 2754 or larger networks, e.g., a wide area network (WAN) 2756. Such LAN and WAN networking environments are commonplace in offices and companies, and facilitate enterprise-wide computer networks, such as intranets, all of which can connect to a global communications network, e.g., the Internet.

When used in a LAN networking environment, the computer 2702 can be connected to the local network 2754 through a wired or wireless communication network interface or adapter 2758. The adapter 2758 can facilitate wired or wireless communication to the LAN 2754, which can also include a wireless access point (AP) disposed thereon for communicating with the adapter 2758 in a wireless mode.

When used in a WAN networking environment, the computer 2702 can include a modem 2760 or can be connected to a communications server on the WAN 2756 via other means for establishing communications over the WAN 2756, such as by way of the Internet. The modem 2760, which can be internal or external and a wired or wireless device, can be connected to the system bus 2708 via the input device interface 2744. In a networked environment, program modules depicted relative to the computer 2702 or portions thereof, can be stored in the remote memory/storage device 2752. It will be appreciated that the network connections shown are example and other means of establishing a communications link between the computers can be used.

When used in either a LAN or WAN networking environment, the computer 2702 can access cloud storage systems or other network-based storage systems in addition to, or in place of, external storage devices 2716 as described above, such as but not limited to a network virtual machine providing one or more aspects of storage or processing of information. Generally, a connection between the computer 2702 and a cloud storage system can be established over a LAN 2754 or WAN 2756 e.g., by the adapter 2758 or modem 2760, respectively. Upon connecting the computer 2702 to an associated cloud storage system, the external storage interface 2726 can, with the aid of the adapter 2758 or modem 2760, manage storage provided by the cloud storage system as it would other types of external storage. For instance, the external storage interface 2726 can be configured to provide access to cloud storage sources as if those sources were physically connected to the computer 2702.

The computer 2702 can be operable to communicate with any wireless devices or entities operatively disposed in wireless communication, e.g., a printer, scanner, desktop or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 28 is a schematic block diagram of a sample computing environment 2800 with which the disclosed subject matter can interact. The sample computing environment 2800 includes one or more client(s) 2810. The client(s) 2810 can be hardware or software (e.g., threads, processes, computing devices). The sample computing environment 2800 also includes one or more server(s) 2830. The server(s) 2830 can also be hardware or software (e.g., threads, processes, computing devices). The servers 2830 can house threads to perform transformations by employing one or more embodiments as described herein, for example. One possible communication between a client 2810 and a server 2830 can be in the form of a data packet adapted to be transmitted between two or more computer processes. The sample computing environment 2800 includes a communication framework 2850 that can be employed to facilitate communications between the client(s) 2810 and the server(s) 2830. The client(s) 2810 are operably connected to one or more client data store(s) 2820 that can be employed to store information local to the client(s) 2810. Similarly, the server (s) 2830 are operably connected to one or more server data store(s) 2840 that can be employed to store information local to the servers 2830.

The present invention may be a system, a method, an apparatus or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations or block diagrams of methods, apparatus (systems), and computer program products according to embodiments of the invention. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus, or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system, or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. As used herein, the term "and/or" is intended to have the same meaning as "or." Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter disclosed herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:

a processor that executes computer-executable instructions stored in a non-transitory computer-readable memory, wherein execution of the computer-executable instructions causes the processor to:

access a two-dimensional pixel array, wherein the two-dimensional pixel array contains a set of missing pixels and a set of available pixels, wherein each missing pixel is known to be inaccurate, wherein each available pixel is not known to be inaccurate, wherein the set of missing pixels is contiguous, and wherein the set of available pixels is physically separated, by the set of missing pixels, into a first contiguous subset and a second contiguous subset that are non-adjoining, the first contiguous subset being physically upward of or physically leftward of the set of missing pixels, and the second contiguous subset being physically downward of or physically rightward of the set of missing pixels;

feed to an input layer of a deep learning neural network the two-dimensional pixel array, wherein the two-dimensional pixel array completes a forward pass through one or more hidden layers of the deep learning neural network, wherein an output layer of the deep learning neural network computes, based on hidden activations produced by the one or more hidden layers during such forward pass, a set of weight maps respectively corresponding to the set of missing pixels, wherein each of the set of weight maps specifies a respective scalar weight for each member of a respective interpolation neighborhood of a respective one of the set of missing pixels, the respective interpolation neighborhood having a shape that is non-contiguous such that at least a first one of its members belongs to the first contiguous subset of the set of available pixels, such that at least a second one of its members belongs to the second contiguous subset of the set of available pixels, and such that none of its members belong to the set of missing pixels; and inpaint each of the set of missing pixels based on combining its respective interpolation neighborhood members according to a respective one of the set of weight maps.

2. The system of claim 1, wherein the combining is linear.

3. The system of claim 1, wherein the combining is non-linear.

4. The system of claim 1, wherein execution of the computer-executable instructions further causes the processor:

visually render a first weight map of the set of weight maps that corresponds to a first missing pixel of the set of missing pixels.

5. The system of claim 1, wherein execution of the computer-executable instructions further causes the processor to:

train the deep learning neural network to generate weight maps, based on a training dataset that comprises training pixel arrays respectively corresponding to ground-truth inpainted values.

6. The system of claim 1, wherein execution of the computer-executable instructions further causes the processor to:

visually render a plurality of weights specified in the set of weight maps that correspond to a first available pixel in the set of available pixels.

7. The system of claim 1, wherein the two-dimensional pixel array is a sinogram.

8. A computer-implemented method, comprising:

accessing, by a device operatively coupled to a processor, a two-dimensional pixel array, wherein the two-dimensional pixel array contains a set of missing pixels and a set of available pixels, wherein each missing pixel is known to be inaccurate, wherein each available pixel is not known to be inaccurate, wherein the set of missing pixels is contiguous, and wherein the set of available pixels is physically separated, by the set of missing pixels, into a first contiguous subset and a second contiguous subset that are non-adjoining, the first contiguous subset being physically upward of or physically leftward of the set of missing pixels, and the second contiguous subset being physically downward of or physically rightward of the set of missing pixels;

feeding, by the device, to an input layer of a deep learning neural network the two-dimensional pixel array, wherein the two-dimensional pixel array completes a forward pass through one or more hidden layers of the deep learning neural network, wherein an output layer of the deep learning neural network computes, based on hidden activations produced by the one or more hidden layers during such forward pass, a set of weight maps respectively corresponding to the set of missing pixels, wherein each of the set of weight maps specifies a respective scalar weight for each member of a respective interpolation neighborhood of a respective one of the set of missing pixels, the respective interpolation neighborhood having a shape that is non-contiguous such that at least a first one of its members belongs to the first contiguous subset of the set of available pixels, such that at least a second one of its members belongs to the second contiguous subset of the set of available pixels, and such that none of its members belong to the set of missing pixels; and inpainting, by the device, each of the set of missing pixels based on combining its respective interpolation neighborhood members according to a respective one of the set of weight maps.

9. The computer-implemented method of claim 8, wherein the combining is linear.

10. The computer-implemented method of claim 8, wherein the combining is non-linear.

11. The computer-implemented method of claim 8, further comprising:

visually rendering, by the device, a first weight map of the set of weight maps that corresponds to a first missing pixel of the set of missing pixels.

12. The computer-implemented method of claim 8, further comprising:

training, by the device, the deep learning neural network to generate weight maps, based on a training dataset that comprises training pixel arrays respectively corresponding to ground-truth inpainted values.

13. The computer-implemented method of claim 8, further comprising:

visually rendering, by the device, a plurality of weights specified in the set of weight maps that correspond to a first available pixel of the set of available pixels.

14. The computer-implemented method of claim 8, wherein the two-dimensional pixel array is a sinogram.

15. A computer program product for facilitating explainable deep interpolation, the computer program product comprising a non-transitory computer-readable memory having program instructions embodied therewith, the program instructions executable by a processor to cause the processor to:

access a two-dimensional pixel array, wherein the two-dimensional pixel array contains a set of missing pixels and a set of available pixels, wherein each missing pixel is known to be inaccurate, wherein each available pixel is not known to be inaccurate, wherein the set of missing pixels is contiguous, and wherein the set of available pixels is physically separated, by the set of missing pixels, into a first contiguous subset and a second contiguous subset that are non-adjoining, the first contiguous subset being physically upward of or physically leftward of the set of missing pixels, and the second contiguous subset being physically downward of or physically rightward of the set of missing pixels;

feed to an input layer of a deep learning neural network the two-dimensional pixel array, wherein the two-dimensional pixel array completes a forward pass through one or more hidden layers of the deep learning neural network, wherein an output layer of the deep learning neural network computes, based on hidden activations produced by the one or more hidden layers during such forward pass, a set of weight maps respectively corresponding to the set of missing pixels, wherein each of the set of weight maps specifies a respective scalar weight for each member of a respective interpolation neighborhood of a respective one of the set of missing pixels, the respective interpolation neighborhood having a shape that is non-contiguous such that at least a first one of its members belongs to the first contiguous subset of the set of available pixels, such that at least a second one of its members belongs to the second contiguous subset of the set of available pixels, and such that none of its members belong to the set of missing pixels; and inpaint each of the set of missing pixels based on combining its respective interpolation neighborhood members according to a respective one of the set of weight maps.

16. The computer program product of claim 15, wherein the combining is linear.

17. The computer program product of claim 15, wherein the combining is non-linear.

18. The computer program product of claim 15, wherein the program instructions are further executable to cause the processor to:

visually render a first weight map of the set of weight maps that corresponds to a first missing pixel of the set of missing pixels.

19. The computer program product of claim 15, wherein the program instructions are further executable to cause the processor to:

train the deep learning neural network to generate weight maps, based on a training dataset that comprises training pixel arrays respectively corresponding to ground-truth inpainted values.

20. The computer program product of claim 15, wherein the two-dimensional pixel array is a sinogram.

* * * * *